United States Patent
Gellens

(10) Patent No.: US 10,057,750 B2
(45) Date of Patent: Aug. 21, 2018

(54) VEHICLE-INITIATED EMERGENCY CALLS

(71) Applicant: QUALCOMM Incorporated, San Diego, CA (US)

(72) Inventor: Randall Coleman Gellens, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/807,663

(22) Filed: Jul. 23, 2015

(65) Prior Publication Data

US 2016/0029197 A1 Jan. 28, 2016

Related U.S. Application Data

(60) Provisional application No. 62/028,234, filed on Jul. 23, 2014, provisional application No. 62/068,590, filed on Oct. 24, 2014.

(51) Int. Cl.
| | |
|---|---|
| *H04W 4/90* | (2018.01) |
| *H04W 76/50* | (2018.01) |
| *H04L 29/06* | (2006.01) |
| *H04M 7/00* | (2006.01) |
| *H04Q 9/00* | (2006.01) |
| *G05D 1/00* | (2006.01) |
| *H04M 3/51* | (2006.01) |
| *H04W 8/24* | (2009.01) |
| *H04W 4/04* | (2009.01) |

(52) U.S. Cl.
CPC ............ *H04W 4/90* (2018.02); *G05D 1/0011* (2013.01); *H04L 65/1003* (2013.01); *H04L 65/1006* (2013.01); *H04M 3/5116* (2013.01); *H04M 7/0024* (2013.01); *H04Q 9/00* (2013.01); *H04W 8/24* (2013.01); *H04W 76/50* (2018.02); *H04M 2207/18* (2013.01); *H04M 2242/30* (2013.01); *H04W 4/046* (2013.01)

(58) Field of Classification Search
CPC .......... H04W 12/66; H04W 4/00; H04W 4/22
USPC .................................. 455/404–419
See application file for complete search history.

(56) References Cited

U.S. PATENT DOCUMENTS

| | | | |
|---|---|---|---|
| 8,265,022 B2 * | 9/2012 | Hans ................... | H04M 3/5116 370/329 |
| 8,787,869 B2 * | 7/2014 | Watson ................... | H04W 4/22 455/404.1 |
| 9,426,293 B1 * | 8/2016 | Oakes, III ............. | H04M 3/523 |
| 2007/0032219 A1 | 2/2007 | Rudolf et al. | |
| 2010/0202368 A1 * | 8/2010 | Hans ................... | H04M 3/5116 370/329 |

(Continued)

OTHER PUBLICATIONS

ISA/EPO, International Search Report and Written Opinion of the International Searching Authority, Int'l. App. No. PCT/US2015/041817, dated Oct. 5, 2015, European Patent Office, Rijswijk, NL, 10 pgs.

*Primary Examiner* — Michael T Vu

(74) *Attorney, Agent, or Firm* — Holland & Hart LLP

(57) ABSTRACT

Methods, systems, and apparatuses are described for asserting support for telematics capabilities in a vehicle emergency call system. In some aspects, a method for wireless communication in the vehicle emergency call system may include transmitting a set of telematics capabilities from a first endpoint in the vehicle emergency call system to a second endpoint in the vehicle emergency call system over a communication session signaling protocol.

26 Claims, 78 Drawing Sheets

(56) References Cited

U.S. PATENT DOCUMENTS

| | | | |
|---|---|---|---|
| 2011/0306329 A1* | 12/2011 | Das | G08B 25/016 |
| | | | 455/416 |
| 2014/0094210 A1 | 4/2014 | Gellens et al. | |
| 2015/0109965 A1* | 4/2015 | Ayyalasomayajula | H04W 4/22 |
| | | | 370/259 |
| 2015/0111517 A1* | 4/2015 | Kowalewski | H04W 4/22 |
| | | | 455/404.1 |

* cited by examiner 505-a: INVITE sip:user2@server2.com SIP/2.0

510-a:
Via: SIP/2.0/UDP alpha.server1.com;branch=d8eX5lB924ckopxd Max-Forwards: 60
To: user2 <sip:user2@server2.com>
From: user1 <sip:user1@server1.com>;tag=7603758658
Call-ID: b73a2d11c54873@alpha.server1.com
CSeq: 832634 INVITE
Contact: <sip:user1@alpha.server1.com>
Content-Type: multipart/mixed boundary="-----NextPart-----"
Content-Length: 142

515-a:
-----NextPart-----
v=0
o=user1 28905433261 23 IN IP4 192.168.3.4
s=session
c=IN IP4 192.168.3.4
t=0 0
m=audio 49170 RTP/AVP 0
a=sendrecv 520-a:
-----NextPart-----
Status = 6 (airbag + crash)
Cargo = 3
MSID= IMEI 001234567890123
Latitude = 41.3857
Longitude=2.1699
Velocity = 78
Direction = 23
Checksum
-----NextPart-----

550-a

FIG. 5B 505-b: INVITE sips:psap@example.gov SIP/2.0

510-b:
Via: SIPS/2.0/TLS pc33.rosebud.example.com; branch=z9hG4bK74bf9
Request-URI: urn:service:sos.eCall.automatic
To: urn:service:sos.eCall.automatic } 525
Accept-Contact: *;sip.service="urn:service:sos*"
From: Alice <sips:alice@rosebud.example.com>; tag=9fxced76sl
Call-ID: 3848276298220188511@rosebud.example.com
Call-Info: cid:1234567890@rosebud.example.com; purpose=emergencyCall.eCallData } 530
Geolocation: <cid:target123@rosebud.example.com>
Accept: application/sdp, application/pidf+xml,
  application/emergencyCall-eCallData+xml,
  application/emergencyCall-CallMetaData+xml
CSeq: 31862 INVITE
Contact: <sips:alice@rosebud.example.com>
Content-Type: multipart/mixed; boundary=boundary1
Content-Length: ...

515-b:
--boundary1
Content-Type: application/sdp
...SDP

--boundary1
Content-Type: application/pidf+xml
Content-ID: target123@rosebud.example.com
...PIDF-LO 520-b:
--boundary1—
Content-Type: application/emergencyCall-eCallData.msd+xml
Content-ID: 1234567890@rosebud.example.com } 535
...eCall MSD data object --boundary1--

550-b

FIG. 5C 905-a { SIP/2.0 200 OK 910-a {
Via: SIP/2.0/UDP site4.server2.com;branch=z9hG4bK3423677;received=192.0.2.3
Via: SIP/2.0/UDP site3.server1.com;branch=z9hG4bK77e2htyfr323.1;received=192.0.2.2
Via: SIP/2.0/UDP alpha.server1.com;branch= d8eX5lB924ckopxd;received=192.168.3.4
To: user2 <sip:user2@server2.com>;tag=a6c85cf
From: user1 <sip:user1@server1.com>;tag=7603758658
Call-ID: b73a2d11c54873@alpha.server1.com
CSeq: 832634 INVITE
Contact: <sip:user2@192.4.6.1>
Content-Type: multipart/mixed boundary="-----NextPart-----"
Content-Length: 131

915-a {
-----NextPart-----
v=0
o=user1 28905433261 23 IN IP4 192.168.3.4
s=session
c=IN IP4 192.4.6.1
t=0 0
m=audio 49170 RTP/AVP 0
a=sendrecv 920-a {
-----NextPart-----
TLM/1.0 ACK
Status = 17 (emergency services notified, voice confirmation pending)
-----NextPart-----

⤹ 950-a

FIG. 9B 905-b { SIP/2.0 200 OK 910-b {
Via: SIP/2.0/UDP site4.server2.com;branch=z9hG4bK3423677;received=192.0.2.3
Via: SIP/2.0/UDP site3.server1.com;branch=z9hG4bK77e2htyfr323.1;received=192.0.2.2
Via: SIP/2.0/UDP alpha.server1.com;branch= d8eX5lB924ckopxd;received=192.168.3.4
To: user2 <sip:user2@server2.com>;tag=a6c85cf
From: user1 <sip:user1@server1.com>;tag=7603758658
Call-ID: b73a2d11c54873@alpha.server1.com
CSeq: 832634 INVITE
Contact: <sip:user2@192.4.6.1>
Content-Type: multipart/mixed boundary="-----=_NextPart_000_0002_01BFC036"
Content-Length: 131

915-b {
-----=_NextPart_000_0002_01BFC036
v=0
o=user1 28905433261 23 IN IP4 192.168.3.4
s=session
c=IN IP4 192.4.6.1
t=0 0
m=audio 49170 RTP/AVP 0
a=sendrecv 920-b {
-----=_NextPart_000_0002_01BFC036
TLM/1.0 ACK
Status = 17 (emergency services notified, voice confirmation pending)
Action = 21 (turn off ignition, turn off fuel pump, unlock doors, play recording 1)
-----=_NextPart_000_0002_01BFC036

↙ 950-b

FIG. 9C 905-c { SIP/2.0 200 OK 910-c {
    Via: SIPS/2.0/TLS pc33.rosebud.example.com;
      branch=z9hG4bK74bf9; received=192.0.2.3
    To: urn:service:sos.eCall.automatic; tag=a6c85cf
    From: Alice <sip:alice@rosebud.example.com>; tag=9fxced76sl
    Call-ID: 3848276298220188511@rosebud.example.com
    CSeq: 31862 INVITE
    925 {
      P-eCallMetaData: ack=yes;
        ref=<1234567890@rosebud.example.com> } 930
        local-cmd=msg.static; static-msg-id=l1; } 935
        local-cmd=action.GetNoticed; } 940
        nw-cmd=send.eCallData.AltSet1 } 945
    Contact: <sips:psap@example.gov>
    Content-Type: application/sdp
    Content-Length: ...
}

950-c

FIG. 9D 905-d { SIP/2.0 200 OK 910-d {
    Via: SIPS/2.0/TLS pc33.rosebud.example.com;
        branch=z9hG4bK74bf9; received=192.0.2.3
    To: urn:service:sos.eCall.automatic; tag=a6c85cf
    From: Alice <sip:alice@rosebud.example.com>;
    tag=9fxced76sl
    Call-ID: 3848276298220188511@rosebud.example.com 925-a {
    CSeq: 31862 INVITE
    P-eCallMetaData: ack=yes;          } 930
      ref=<1234567890@rosebud.example.com>  } 955
      local-cmd=msg.dynamic;             } 960
      dynamic-msg-ref=<cid:5432154321@example.gov>;  } 940
      local-cmd=action.GetNoticed;       } 945
      nw-cmd=send.eCallData.AltSet1

Contact: <sips:psap@example.gov>
    Content-Type: multipart/mixed; boundary=xyzxyz
    Content-Length: ...

915-d {
    --xyzxyz
    Content-Type: application/sdp 920-d {
    --xyzxyz
    Content-Type: audio/3gpp           } 965
    Content-ID: 5432154321@example.gov
    ...*dynamic media*

--xyzxyz 950-d

FIG. 9E 905-e { SIP/2.0 200 OK 910-e {
Via: SIPS/2.0/TLS pc33.rosebud.example.com;
   branch=z9hG4bK74bf9; received=192.0.2.3
To: urn:service:sos.eCall.automatic; tag=a6c85cf
From: Alice <sip:alice@rosebud.example.com> ;tag=9fxced76sl
Call-ID: 3848276298220188511@rosebud.example.com
Call-Info: cid:9876543210@example.gov; purpose=EmergencyCall-
telematicsMetaData           } 970
CSeq: 31862 INVITE
Contact: <sips:psap@example.gov>
Content-Type: multipart/mixed; boundary=xyzxyz
Content-Length: ...

915-e {
--xyzxyz
Content-Type: application/sdp
   ...SDP 920-e { 975 {
--xyzxyz
Content-Type: application/EmergencyCall-telematicsMetaData+xml
Content-ID: 9876543210@example.gov <?xml version="1.0" encoding="UTF-8"?>
<telematicsMetaData
   xmlns="urn:3gpp:params:xml:ns:eCall"
   xmlns:dm="urn:3gpp:params:xml:ns:eCall:metadata"
   <ack rec=yes ref="1234567890@rosebud.example.com"/>  } 930-a
   <local-cmd cmd=msg.static msg-id="11"/>         } 935-a
   <local-cmd cmd=msg.dynamic type="audio/3gpp">    } 955-a
      <media> *dynamic media* </media>         } 965-a
   </local-cmd>
   <local-cmd cmd=action.GetNoticed/>           } 940-a
   <network-cmd cmd=send id=eCallData.AltSet1/>    } 945-a
</telematicsMetaData>

--xyzxyz--

950-e

FIG. 9F 2505-a: INVITE sips:psap@example.gov SIP/2.0

2510-a:
Via: SIPS/2.0/TLS pc33.rosebud.example.com; branch=z9hG4bK74bf9
Request-URI: urn:service:sos.eCall.automatic
To: urn:service:sos.eCall.automatic
Accept-Contact: *;sip.service="urn:service:sos*"
From: Alice <sips:alice@rosebud.example.com>; tag=9fxced76sl
Call-ID: 3848276298220188511@rosebud.example.com
Call-Info: cid:1234567890@rosebud.example.com; purpose=emergencyCall.eCallData
Geolocation: <cid:target123@rosebud.example.com>
Accept: application/sdp, application/pidf+xml,
   application/emergencyCall-eCallData+xml,
   application/emergencyCall-CallMetaData+xml
CSeq: 31862 INVITE
Contact: <sips:alice@rosebud.example.com>
Content-Type: multipart/mixed; boundary=boundary1
Content-Length: ...

2515-a:
--boundary1
Content-Type: application/sdp
...SDP

--boundary1
Content-Type: application/pidf+xml
Content-ID: target123@rosebud.example.com
...PIDF-LO 2520-a:
--boundary1--
Content-Type: application/emergencyCallData.eCall.msd+xml
Content-ID: 1234567890@rosebud.example.com
...eCall MSD data object 2525-a:
--boundary1--
Content-Type: application/emergencyCallData.eCall.capabilities+xml
Content-ID: 9876543210@atlanda.example.com
...Capabilities data object
} 2530

```
                <capabilities>
    2535-a-1 {      <request action="msg-static"
                        msgid="25"
                    />

2535-a-2 {      <request action="msg-custom"
                        supported-data-type="text"
                    />

2535-a-3 {      <request action="play-audio"
                        supported-mime="audio/3gpp; audio/3gpp2; audio/amr; audio/evrc"
                    />

2530-a {
    2535-a-4 {      <request action="lights-flash"
                        supported-lights="interior; exterior-front; exterior-rear"
                        supported-duration="5; 15; 60; indefinite"
                    />

2535-a-5 {      <request action="send-data"
                        supported-datatypes="eCall.MSD; AltSet1; AltSet2"
                    />

2535-a-6 {      <request action="enable-camera"
                        supported-cameras="backup; blind-spot; interior"
                        supported-tx-format="video/H.264; video/3gpp; video/3gpp2"
                    />
                </capabilities>
```

FIG. 25C

```
INVITE urn:service:sos.vehicle.automatic SIP/2.0

To: urn:service:sos.vehicle.automatic
From: <sip:+13145551111@example.com>;tag=9fxced76sl
Call-ID: 3848276298220188511@atlanta.example.com
Geolocation: <cid:target123@example.com>
Geolocation-Routing: no
Call-Info: cid:1234567890@atlanta.example.com;
              purpose=EmergencyCallData.VEDS
Accept: application/sdp, application/pidf+xml
CSeq: 31862 INVITE
Content-Type: multipart/mixed; boundary=boundary1
Content-Length: ...

--boundary1

Content-Type: application/sdp

...Session Description Protocol (SDP) goes here

--boundary1

Content-Type: application/pidf+xml
Content-ID: <target123@atlanta.example.com>
<?xml version="1.0" encoding="UTF-8"?>
<presence
       xmlns="urn:ietf:params:xml:ns:pidf"
       xmlns:dm="urn:ietf:params:xml:ns:pidf:data-model"
       xmlns:gp="urn:ietf:params:xml:ns:pidf:geopriv10"
       xmlns:dyn="urn:ietf:params:xml:ns:pidf:geopriv10:dynamic"
       xmlns:gml="http://www.opengis.net/gml"
       xmlns:gs="http://www.opengis.net/pidflo/1.0"
       entity="sip:+13145551111@example.com">
       <dm:device id="123">
              <gp:geopriv>
                     <gp:location-info>
                            <gml:Point srsName="urn:ogc:def:crs:EPSG::4326">
                                   <gml:pos>-34.407 150.883</gml:pos>
                            </gml:Point>
                            <dyn:Dynamic>
                                   <dyn:heading>278</dyn:heading>
                                   <dyn:direction><dyn:direction>
                            </dyn:Dynamic>
                     </gp:location-info>
                     <gp:usage-rules/>
                     <method>gps</method>
              </gp:geopriv>
              <timestamp>2012-04-5T10:18:29Z</timestamp>
              <dm:deviceID>1M8GDM9A_KP042788</dm:deviceID>
       </dm:device>
</presence>

--boundary1

Content-Type: application/EmergencyCallData.VEDS+xml
Content-ID: 1234567890@atlanta.example.com ...VEDS data object goes here --boundary1--
```

MIME media type name: application
MIME subtype name: EmergencyCallData.VEDS+xml
Mandatory parameters: none
Optional parameters: charset
Indicates the character encoding of enclosed XML.

Encoding considerations: Uses XML, which can employ 8-bit characters, depending on the character encoding used. See Section 3.2 of RFC 3023 [RFC3023].

Security considerations: This content type is designed to carry vehicle crash data during an emergency call. This data may contain personal information including vehicle VIN, location, direction, etc. Appropriate precautions need to be taken to limit unauthorized access, inappropriate disclosure to third parties, and eavesdropping of this information. Please refer to Section 7 and Section 8 of [I-D.ietf-ecrit-additional-data] for more information.

Interoperability considerations: None
Published specification: [VEDS]
Applications which use this media type: Emergency Services
Additional information: None
Magic Number: None
File Extension: .xml
Macintosh file type code: 'TEXT'
Person and email address for further information: Hannes Tschofenig, Hannes.Tschofenig@gmx.net
Intended usage: LIMITED USE

The 'ack' element may have the following attributes:

Name: ref
Usage: Preferred
Type: anyURI
Description: References the Content-ID of the body part that contained the data
object or control object being acknowledged.
Example: <ack received="yes" ref="1234567890@atlanta.example.com"/>

Name: rec
Usage: Preferred
Type: Boolean
Description: Indicates if the referenced object was successfully received or not.
Example: <ack received="yes" ref="1234567890@atlanta.example.com"/>

The 'ack' element may have the following child elements:

Name: ActionResult
Usage: Optional
Description: An 'ActionResult' element indicates the result of an action (other than a 'send-data' action). It may have the following attributes:

Name: action
Usage: Preferred
Type: token
Description: Contains the value of the 'action' attribute of the 'request' element Name: success
Usage: Preferred
Type: Boolean
Description: Indicates if the action was successfully accomplished Name: reason
Usage: Conditional
Type: token
Description: Used when 'success' is "False", this attribute contains a reason code for a failure. A registry for reason codes is defined in Section 13.8.3.

Name: details
Usage: optional
Type: string
Description: Contains further explanation of the circumstances of a success or failure. The contents are implementation-specific and human-readable.
Example: <ActionResult action="msg-dynamic" success="true"/>

Example: <ActionResult action="lamp" success="false" reason="unable" details="The requested lamp is inoperable"/>

The 'capabilities' element may have the following child elements:

Name: request
Usage: Mandatory
Description: The 'capabilities' element contains a <request> child element per
action supported by the vehicle. Because support for a 'send-data' action is
PREFERRED, a <request> child element with a "send-data" 'action'
attribute is also PREFERRED. The 'supporteddatatype'attribute is
PREFERRED in this <request> element and may include all eCall data
blocks supported by the IVS. Currently, only the 'eCall.MSD' datatype is
defined. All other actions are OPTIONAL. If the "play-audio" action is
supported, a <request> child element with a "play-audio" 'action' attribute
is sent, with a 'supported-mime' attribute set to all MIME content types
supported by the vehicle. If the "msg-static" action is supported, a
<request> child element with a "msg-static" 'action' attribute is sent, with a
'msgid' attribute set to the highest supported static message supported by
the vehicle.
Examples: <request action="play-audio" supported-mime="audio/3gpp; audio/
3gpp2; audio/amr; audio/evrc"/> <request action="send-data" supported-
datatype="eCall.MSD" /> <request action="send-data"
supported-datatype="eCall.MSD; VEDS; ecall.type2" /> <request
action="msg-dynamic"/> <request action="msg.static" msgid="17" />

The 'request' element may have the following attributes:

Name: action
Usage: Preferred
Type: token
Description: Identifies the action that the vehicle is requested to perform. An
    IANA registry is established in Section 13.8.1 to contain the allowed
    values.
Example: action="send-data"

Name: msgid
Usage: Conditional
Type: int
Description: Used with a "msg-static" action. Indicates the identifier of the
    static message to be displayed and/or spoken for the vehicle occupants.
    A document established an IANA registry for messages and their IDs
Example: msgid="3"

Name: persistance
Usage: Optional
Type: duration
Description: Specifies how long to carry on the specified action, for example, how
    long to continue honking or flashing. If absent, the default is indefinitely.
Example: persistance="PT1H"

Name: datatype
Usage: Conditional
Type: token
Description: Used with a "send-data" action. Specifies the data block that the
IVS is requested to transmit, using the same identifier as in the    'purpose'
attribute set in a Call-Info header field to point to the data block.   Permitted
values are contained in the 'Emergency Call Data Types' IANA    registry
established in [additional-data-draft].
Example: datatype="eCall.MSD"

Name: ref
Usage: Conditional
Type: URI
Description: Used with a "play-audio" action. References the audio media to
    be played. A CID is used to reference an audio body part contained in the
    same SIP message. An external URL (e.g., HTTP) is used to reference
    external content. Note that external references might not be accessible by
    the vehicle due to a variety of transient or permanent conditions.
Example: ref=cid:5432154321@example.gov

Name: supported-mime
Usage: Conditional
Type: token
Description: Used with a 'play-audio' action in a 'request' element that is a child of a 'capability' element, this attribute lists all MIME content types/subtypes that the vehicle can render. Multiple values are separated with a semicolon.
Example: supported-mime="audio/3gpp; audio/3gpp2; audio/amr; audio/evrc"

Name: supported-datatype
Usage: Conditional
Type: token
Description: Used with a 'send-data' action in a 'request' element that is a child of a 'capability' element, this attribute lists all data blocks that the vehicle can transmit, using the same identifier as in the 'purpose' attribute in a Call-Info header field to point to the data block. Permitted values are containedin the 'Emergency Call Data Types' IANA registry established in [additional-data-draft]. Multiple values are separated with a semicolon.
Example: supported-datatype="eCall.MSD; VEDS; eCall.foo"

Name: lamp-ID
Usage: Conditional
Type: token
Description: Used with a 'lamp' action, indicates which lamps the action affects. A document creates a registry of lamp-ID tokens
Example: lamp-ID="hazard"

Name: lamp-action
Usage: Conditional
Type: enumeration
Description: Used with a 'lamp' action, indicates if the lamp should be illuminated, turned off, or flashed. Permitted values are 'on', 'off', and 'flash'.
Example: lamp-action="flash"

The 'request' element may have the following child elements:

Name: text
Usage: Conditional
Type: string
Description: Used within a <request action="msg-dynamic"> element to contain the text to be displayed and/or spoken (via text-tospeech) for the vehicle occupants.
Example: <text>Emergency authorities are aware of your incident and location. Due to a multi-vehicle incident in your area, no one is able to speak with you right now. Please remain calm. We will assist you soon.</text>

'media' element ; attribute: mime="audio/3gpp" (specifies MIME type and subtype of media) 'text' element (contains dynamic text to be displayed or spoken) 'media' element (contains dynamic audio to be played) 'ack' element ; attribute: rec="yes"ref=1234567890@atlanta.example.com <request action="msg-dynamic" <text>Local emergency authorities are aware of your incident and location. Due to a large multi-vehicle incident in your area, operators are unable to speak with you right now. Please remain calm. We will call you back soon.</text> </request>

<request action="flash-lights" duration="indefinite" /> <request action="send-data" datatype="eCall.MSD" />

<capabilities> ... </capabilities> Contains a <request> element per supported action <request action="play-audio" supported-mime="all-mime-types" /> Example: <request action="play-audio" supportedmime="audio/3gpp; audio/3gpp2; audio/amr; audio/evrc"/> <requestaction="send-data" supported-datatype="all-datatypes" /> Example: <request action="send-data" supported-datatype="eCall.MSD; VEDS; eCall.type2" /> Highest supported static message listed in"msg.static" action: Example: <request action="msg.static" msgid="17"/>

List of supported cameras

Acknowledge data object receipt Indicates received (yes/no) and references Content-ID of data object <ack received=yes ref="1234567890@atlanta.example.com"/>

Play and/or display static (pre-defined) message References (predefined) ID of message to play and/or display <request action="msgstatic" msgid="17"/>

Play/display dynamic text Contains text to be displayed and/or spoken in 'text' child element Play dynamic audio References Content-ID of media in SIP body or media contained in-line <request action="play-audio" ref="cid:5432154321@example.gov"/>
<request action="play-audio"> <media mime="audio/evrc"> ... </media>
</request> Flash lights, honk horn, etc. Send data (eCall 'AltSet1')
<request action="send-data" datatype="eCall.MSD" />

```
INVITE urn:service:sos.ecall.automatic SIP/2.0
To: urn:service:sos.ecall.automatic
From: <sip:+13145551111@example.com>;tag=9fxced76sl
Call-ID: 3848276298220188511@atlanta.example.com
Geolocation: <cid:target123@example.com>
Geolocation-Routing: no
Call-Info: cid:1234567890@atlanta.example.com;
        purpose=emergencyCallData.eCall.MSD
Accept: application/sdp, application/pidf+xml
CSeq: 31862 INVITE
Recv-Info: emergencyCallData.eCall
Content-Type: multipart/mixed; boundary=boundary1
Content-Length: ...

--boundary1

Content-Type: application/sdp

...Session Description Protocol (SDP) goes here

--boundary1

Content-Type: application/emergencyCallData.eCall.MSD+xml
Content-ID: 1234567890@atlanta.example.com ...eCall MSD data object goes here --boundary1—
```

FIG. 57

```
<?xml version="1.0" ?>
<xs:schema xmlns:xs="http://www.w3.org/2001/XMLSchema"
        xmlns:tns="http://example.com/ct-required"
        xmlns:xmime="http://www.w3.org/2005/05/xmlmime"
        targetNamespace="http://example.com/ct-required">

<xs:import namespace="http://www.w3.org/2005/05/xmlmime"
            schemaLocation="http://www.w3.org/2005/05/xmlmime"/>

</xs:schema>
```

MIME media type name: application

MIME subtype name: emergencyCallData.eCall.MSD+xml

Mandatory parameters: none

Optional parameters: charset

Indicates the character encoding of the XML content.

Encoding considerations: Uses XML, which can employ 8-bit characters, depending on the character encoding used. See Section 3.2 of RFC 3023 [RFC3023].

Security considerations: This content type is designed to carry vehicle and incident-related data during an emergency call. This data contains personal information including vehicle VIN, location, direction, etc. Appropriate precautions may be taken to limit unauthorized access, inappropriate disclosure to third parties, and eavesdropping of this information. In general, it is permissible for the data to be unprotected while briefly in transit within the Mobile Network Operator (MNO); the MNO is trusted to not permit the data to be accessed by third parties. Sections 7 and Section 8 of [I-D.ietf-ecrit-additional-data] contain more discussion.

Interoperability considerations: None

Published specification: Annex C of EN 15722 [msd]

Applications which use this media type: Pan-European eCall compliant systems

Additional information: None

Magic Number: None

File Extension: .xml

Macintosh file type code: 'TEXT'

FIG. 59

MIME media type name: application

MIME subtype name: emergencyCallData.eCall.control+xml

Mandatory parameters: none

Optional parameters: charset

Indicates the character encoding of the XML content.

Encoding considerations: Uses XML, which can employ 8-bit characters, depending on the character encoding used. See Section 3.2 of RFC 3023 [RFC3023].

Security considerations: This content type carries metadata and control information and requests, primarily from a Public Safety Answering Point (PSAP) to an In-Vehicle System (IVS) during an emergency call, and also capabilities from the IVS to the PSAP. Metadata (such as an acknowledgment that data sent by the IVS to the PSAP was successfully received) has limited privacy and security implications. Control information (such as requests from the PSAP that the vehicle perform an action) has some privacy and important security implications. The privacy concern arises from the ability to request the vehicle to transmit a data set, which as described in Section 13.2, may contain personal information. The security implication is the ability to request the vehicle to perform an action. It is important that control information originate only from a PSAP or other emergency services provider, and not from an impostor. The first safeguard for this is the security of the cellular network over which the emergency call was placed. In particular, when the IVS initiates an eCall over a cellular network, the MNO routes the call to a PSAP. (Calls placed using other means, such as Wi-Fi or over-the-top services, do not carry the same degree of trust.) Calls received by the IVS, such as a call-back from a PSAP, also do not carry the same degree of trust, since the current mechanisms are not ideal for verifying that such a call is indeed from a PSAP in response to an emergency call placed by the IVS. A further safeguard, and one applicable regardless of which end initiated the call and the means of the call, is for the PSAP or emergency service provider to sign the body part using a certificate issued by a known emergency services certificate authority and for which the IVS can verify the root certificate. Sections 7 and Section 8 of [I-D.ietf-ecrit-additional-data] contain more discussion.

Interoperability considerations: None

Published specification: Annex C of EN 15722 [msd]

Applications which use this media type: Pan-European eCall compliant systems

Additional information: None

Magic Number: None

File Extension: .xml

Macintosh file type code: 'TEXT'

Intended usage: LIMITED USE

URI: urn:ietf:params:xml:ns:eCall

Registrant Contact: IETF, ECRIT working group, <ecrit@ietf.org>, as delegated by the IESG <iesg@ietf.org>.

XML:

```
BEGIN
<?xml version="1.0"?>
<!DOCTYPE html PUBLIC "-//W3C//DTD XHTML Basic 1.0//EN"
  "http://www.w3.org/TR/xhtml-basic/xhtml-basic10.dtd">
<html xmlns="http://www.w3.org/1999/xhtml">
<head>
  <meta http-equiv="content-type"
        content="text/html;charset=iso-8859-1"/>
  <title>Namespace for eCall Data</title>
</head>
<body>
  <h1>Namespace for eCall Data
        </h1>
<p>See [A document].</p>
</body>
</html>
END
```

URI: urn:ietf:params:xml:ns:eCall:control

Registrant Contact: IETF, ECRIT working group, <ecrit@ietf.org>, as delegated by the
　　　IESG <iesg@ietf.org>.

XML:

```
BEGIN
<?xml version="1.0"?>
<!DOCTYPE html PUBLIC "-//W3C//DTD XHTML Basic 1.0//EN"
   "http://www.w3.org/TR/xhtml-basic/xhtml-basic10.dtd">
<html xmlns="http://www.w3.org/1999/xhtml">
<head>
  <meta http-equiv="content-type"
        content="text/html;charset=iso-8859-1"/>
  <title>Namespace for eCall Data:
        Control Block</title>
</head>
<body>
   <h1>Namespace for eCall Data
        </h1>
   <h2>Control Block</h2>
<p>See [A document].</p>
</body>
</html>
END
```

| ID | Message |
|---|---|
| 1 | Emergency authorities are aware of your incident and location. No one is free to speak with you right now. We will help you as soon as possible |

FIG. 64

| ID | Description |
|---|---|
| unsupported | The 'action' is not supported. |
| unable | The 'action' could not be accomplished. |
| data-unsupported | The data item referenced in a 'send-data' request is not supported. |

FIG. 65

| Name | Description |
|---|---|
| Head | The main lamps used to light the road ahead |
| Interior | Interior lamp, often at the top center |
| Fog-front | Front fog lamps |
| Fog-rear | Rear fog lamps |
| Brake | Brake indicator lamps |
| Position-front | Front position/parking/standing lamps |
| Position-rear | Rear position/parking/standing lamps |
| Turn-left | Left turn/directional lamps |
| Turn-right | Right turn/directional lamps |
| Hazard | Hazard/four-way lamps |

FIG. 66

VEHICLE-INITIATED EMERGENCY CALLS

CROSS REFERENCES

The present application claims priority benefit to U.S. Provisional Patent Application No. 62/028,234, entitled "Asserting Support for Telematics Capabilities in Vehicle Emergency Call Systems," by Gellens, filed Jul. 23, 2014, and to U.S. Provisional Patent Application No. 62/068,590, entitled "Vehicle-Initiated Emergency Calls" by Gellens, filed Oct. 24, 2014, both of which are hereby incorporated by reference in their entireties for all purposes; with each of the foregoing applications being assigned to the assignee hereof.

BACKGROUND

The present disclosure relates to vehicle emergency call systems, and more particularly to asserting support for telematics capabilities in vehicle emergency call systems. In some vehicle emergency call systems, telematics data (e.g., sensor readings and other data) may be transmitted from an intelligent vehicle terminal to a central service for processing. For example, a terminal associated with a vehicle experiencing a collision may transmit location and airbag deployment data over a wireless communication system to a public safety answering point (PSAP) in connection with a request for emergency services. In some systems, the data may be transmitted to a third-party service center, which may then convey some or all of the data to a PSAP.

The present disclosure also relates to metadata associated with the telematics data (sometimes referred to as "control data"), which a PSAP may further provide back to the vehicle terminal. For example, the PSAP may send an acknowledgement that the telematics data was satisfactorily received. The metadata may also include requests for the vehicle terminal to perform one or more actions, such as sending or resending certain telematics data, unlocking the vehicle doors, flashing the lights of the vehicle, and so forth. Because of the wide ranging functionality of different vehicles, however, the PSAP may not be aware of what types of actions that the vehicle terminal is and is not capable of performing. As such, the PSAP may send many requests or send a single request many times to a vehicle terminal, not knowing whether the vehicle terminal can actually perform the requested action(s). In other cases, the PSAP may never send a certain type of request because it is unaware that the vehicle terminal can perform a certain action.

SUMMARY

The described features generally relate to one or more improved systems, methods, and/or apparatuses for asserting support for telematics capabilities in vehicle emergency call systems. A first endpoint, such as an emergency call in-vehicle system (IVS) of a vehicle terminal, may transmit its telematics capabilities to a second endpoint, such as an emergency call answering point, over a wireless communication system. The telematics capabilities may include all or a subset of actions that the first endpoint is capable of performing—for example, if the first endpoint is an IVS, the capabilities may include sending additional data to the answering point and/or actuating external vehicle systems (e.g., flashing the vehicle's lights, honking the horn, and so forth).

In some instances, the telematics capabilities may be transmitted in a format that corresponds with (e.g., is substantially identical to) the format by which requests are to be transmitted. For example, the capabilities may be formatted as an Extensible Markup Language (XML) element, with one or more child XML elements corresponding to each available action. In one instance, once the answering point receives the telematics capabilities from the IVS, the answering point may send one or more requests to the IVS in the appropriate format—e.g., using one of the child XML elements corresponding to the action as a root XML element in a request data structure. In various examples, the IVS may transmit the telematics capabilities to the answering point together with an invitation and set of data in establishing an emergency call with the answering point, or the IVS may transmit the telematics capabilities to the answering point after the emergency call is established (or during call establishment) in response to a request from the answering point to transmit the capabilities.

A method for wireless communication in a vehicle emergency call system is described, with the method including transmitting a set of telematics capabilities from a first endpoint in the vehicle emergency call system to a second endpoint in the vehicle emergency call system over a communication session signaling protocol.

An apparatus for wireless communication in a vehicle emergency call system is described, with the apparatus including means for transmitting a set of telematics capabilities from a first endpoint in the vehicle emergency call system to a second endpoint in the vehicle emergency call system over a communication session signaling protocol.

Also, another apparatus for wireless communication in a vehicle emergency call system is described, with the apparatus including a processor, memory in electronic communication with the processor, and instructions stored in the memory, the instructions being executable by the processor to transmit a set of telematics capabilities from a first endpoint in the vehicle emergency call system to a second endpoint in the vehicle emergency call system over a communication session signaling protocol.

A non-transitory computer-readable medium for wireless communication in a vehicle emergency call system in a wireless device is disclosed, with the non-transitory computer-readable medium storing computer-executable code for transmitting a set of telematics capabilities from a first endpoint in the vehicle emergency call system to a second endpoint in the vehicle emergency call system over a communication session signaling protocol.

In some examples of the method, apparatuses, and/or computer program product, the first endpoint may be an emergency call in-vehicle system (IVS) and the second endpoint may be an emergency call answering point. The set of telematics capabilities may include at least one action that the emergency call IVS is capable of performing, and the at least one action may include one or more of gathering and/or transmitting telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, disconnecting a primary or other battery or other power source, connecting a primary or other battery or other power source, unlocking a door, locking a door, activating a horn of a vehicle, activating an externally audible sound, activating lights of a vehicle, activating flashers of a vehicle, actuating a power window, playing a recorded message, rendering media, displaying a text message, activating a camera, deactivating a camera, or a combination thereof.

In some examples, the set of telematics capabilities may be transmitted to the emergency call answering point in a capabilities data structure corresponding to a request data structure by which the emergency call IVS accepts requests to perform the at least one action. The capabilities data structure may be formatted substantially identical to a format of the request data structure, and/or the capabilities data structure may be formatted as an Extensible Markup Language (XML) element. Further, at least one child XML element may be included in the capabilities XML element data structure defining the at least one action.

In some examples, a parameter corresponding to the at least one action in the set of telematics capabilities may be included in the set of telematics capabilities, the parameter defining a supported aspect of the at least one action. The set of telematics capabilities may be transmitted as a capabilities Extensible Markup Language (XML) element, the capabilities XML element including at least one child XML element defining the at least one action, wherein the parameter corresponding to the at least one action is included as an XML attribute within the at least one child XML element corresponding to the at least one action. The set of telematics capabilities may be transmitted as a capabilities Extensible Markup Language (XML) element, the capabilities XML element including at least one child XML element defining the at least one action, wherein the parameter corresponding to the at least one action is included as a further child XML element within the at least one child XML element corresponding to the at least one action.

In some examples, the set of telematics capabilities may be dynamically reconfigured by the emergency call IVS based at least on part on an operational condition of vehicle components associated with the at least one action, and/or the set of telematics capabilities may be dynamically configurable by one or more of a manufacturer of the emergency call IVS, a manufacturer of the vehicle, a telematics service provider, or another authorized entity.

One or more emergency call related actions that the emergency call IVS is capable of performing may be included in the set of telematics capabilities. Also, a request to perform an action may be received from the emergency call answering point, the request based at least in part on the set of telematics capabilities, and an indication may be transmitted to the emergency call answering point regarding whether the IVS did or did not perform the requested action.

In some examples, a subset of emergency call related actions that the emergency call IVS is capable of performing may be included in the set of telematics capabilities, the subset being determined based at least in part on a category of assistance needed by a user of the emergency call IVS. A request to perform an action may be received from the emergency call answering point, the request based at least in part on the set of telematics capabilities, and the action may be performed.

In some examples, an invitation and a set of data may be transmitted to establish an emergency call with the emergency call answering point, where the set of telematics capabilities is transmitted together with the invitation and set of data. The set of data may be a minimum set of telematics data.

In some examples, an invitation and a set of data may be transmitted to establish an emergency call with the emergency call answering point, a request may be received from the answering point to send the set of capabilities in a response to the invitation, and the set of telematics capabilities may be transmitted together with an acknowledgment of the response to the invitation. The set of telematics capabilities may be transmitted during or following establishment of an emergency call.

In some examples, an invitation and a set of data to establish an emergency call may be transmitted with the emergency call answering point, and the set of telematics capabilities may be transmitted after the emergency call is established in response to a request by the emergency call answering point to transmit the set of telematics capabilities.

Additionally, a method for communicating telematics data in a vehicle emergency call system is described, with the method including receiving a set of telematics capabilities from a first endpoint in the vehicle emergency call system at a second endpoint in the vehicle emergency call system over a communication session signaling protocol, and transmitting a request to the first endpoint to perform an action, the request to perform the action based at least in part on the received set of telematics capabilities.

An apparatus for communicating telematics data in a vehicle emergency call system is described, with the apparatus including means for receiving a set of telematics capabilities from a first endpoint in the vehicle emergency call system at a second endpoint in the vehicle emergency call system over a communication session signaling protocol, and means for transmitting a request to the first endpoint to perform an action, the request to perform the action based at least in part on the received set of telematics capabilities.

Another apparatus for communicating telematics data in a vehicle emergency call system is described, with the apparatus including a processor, memory in electronic communication with the processor, and instructions stored in the memory, the instructions being executable by the processor to receive a set of telematics capabilities from a first endpoint in the vehicle emergency call system at a second endpoint in the vehicle emergency call system over a communication session signaling protocol, and transmit a request to the first endpoint to perform an action, the request to perform the action based at least in part on the received set of telematics capabilities.

A non-transitory computer-readable medium for communicating telematics data in a vehicle emergency call system is described, with the non-transitory computer-readable medium storing computer-executable code for receiving a set of telematics capabilities from a first endpoint in the vehicle emergency call system at a second endpoint in the vehicle emergency call system over a communication session signaling protocol, and transmitting a request to the first endpoint to perform an action, the request to perform the action based at least in part on the received set of telematics capabilities.

In some examples of the method, apparatuses, and/or computer program product, the first endpoint may be an emergency call in-vehicle system (IVS) and the second endpoint may be an emergency call answering point. Also, in some examples, a request may be received from the IVS to establish an emergency call, and a request may be transmitted by the emergency call answering point to the emergency call IVS for transmission of the set of telematics capabilities.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5B shows a diagram of an exemplary request message according to a communication session signaling protocol;

FIG. 5C shows a diagram of an exemplary request message according to a communication session signaling protocol;

FIG. 9B shows a diagram of an exemplary response message according to a communication session signaling protocol;

FIG. 9C shows a diagram of an exemplary response message according to a communication session signaling protocol;

FIG. 9D shows a diagram of an exemplary response message according to a communication session signaling protocol;

FIG. 9E shows a diagram of an exemplary response message according to a communication session signaling protocol;

FIG. 9F shows a diagram of an exemplary response message according to a communication session signaling protocol;

FIG. 25B shows an exemplary message according to a communication session signaling protocol, in accordance with various aspects of the present disclosure;

FIG. 25C shows an exemplary capabilities data object, in accordance with various aspects of the present disclosure;

FIG. 46 shows an exemplary message for placing an emergency call, in accordance with various aspects of the present disclosure;

FIG. 47 shows an exemplary MIME type for use in placing an emergency call, in accordance with various aspects of the present disclosure;

FIG. 50 is a diagram illustrating attributes for use in placing emergency calls, in accordance with various aspects of the present disclosure;

FIG. 51 is a diagram illustrating child elements for use in placing emergency calls, in accordance with various aspects of the present disclosure;

FIG. 52 is a diagram illustrating child elements for use in placing emergency calls, in accordance with various aspects of the present disclosure;

FIGS. 53A and 53B are diagrams illustrating attributes and child elements for use in placing emergency calls, in accordance with various aspects of the present disclosure;

FIG. 54 is a diagram illustrating child elements for use in placing emergency calls, in accordance with various aspects of the present disclosure;

FIG. 55 is a diagram illustrating specifications for use in placing emergency calls, in accordance with various aspects of the present disclosure;

FIG. 57 is a diagram illustrating an example of a SIP eCall INVITE message that contains an MSD, in accordance with various aspects of the present disclosure;

FIG. 58 is a diagram illustrating one example of a foo XML schema, in accordance with various aspects of the present disclosure;

FIG. 59 is a diagram illustrating a MIME content type for use in placing emergency calls, in accordance with various aspects of the present disclosure;

FIG. 60 is a diagram illustrating a MIME content type for use in placing emergency calls, in accordance with various aspects of the present disclosure;

FIG. 61 is a diagram illustrating an XML namespace for use in placing emergency calls, in accordance with various aspects of the present disclosure;

FIG. 62 is a diagram illustrating an XML namespace for use in placing emergency calls, in accordance with various aspects of the present disclosure;

FIG. 64 is a diagram illustrating an example of an initial set of values, in accordance with various aspects of the present disclosure;

FIG. 65 is a diagram illustrating an example of an initial set of values, in accordance with various aspects of the present disclosure; and FIG. 66 is a diagram illustrating an example of an initial set of values, in accordance with various aspects of the present disclosure.

DETAILED DESCRIPTION

Features generally relating to one or more improved systems, methods, and/or apparatuses for asserting support for telematics capabilities in vehicle emergency call systems are described. In one example, an in-vehicle system (IVS) of a vehicle terminal may transmit a set of telematics capabilities to an emergency call answering point (e.g., a public safety answering point (PSAP)) using a communication session signaling protocol. The set of telematics capabilities may include one or more actions that the IVS is capable of performing, including sending/resending telematics data to the answering point and/or actuating an external vehicle system. In one embodiment, the telematics capabilities are transmitted to the answering point in a format corresponding to a format by which the answering point can request that the IVS take corresponding actions—such as an XML data structure.

After receiving the set of telematics capabilities from the IVS, the answering point may respond by requesting that the IVS take one or more of the supported actions. The requests may be tailored to the particular IVS in some embodiments, which may reduce the amount of signaling between the answering point and the IVS.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1A:
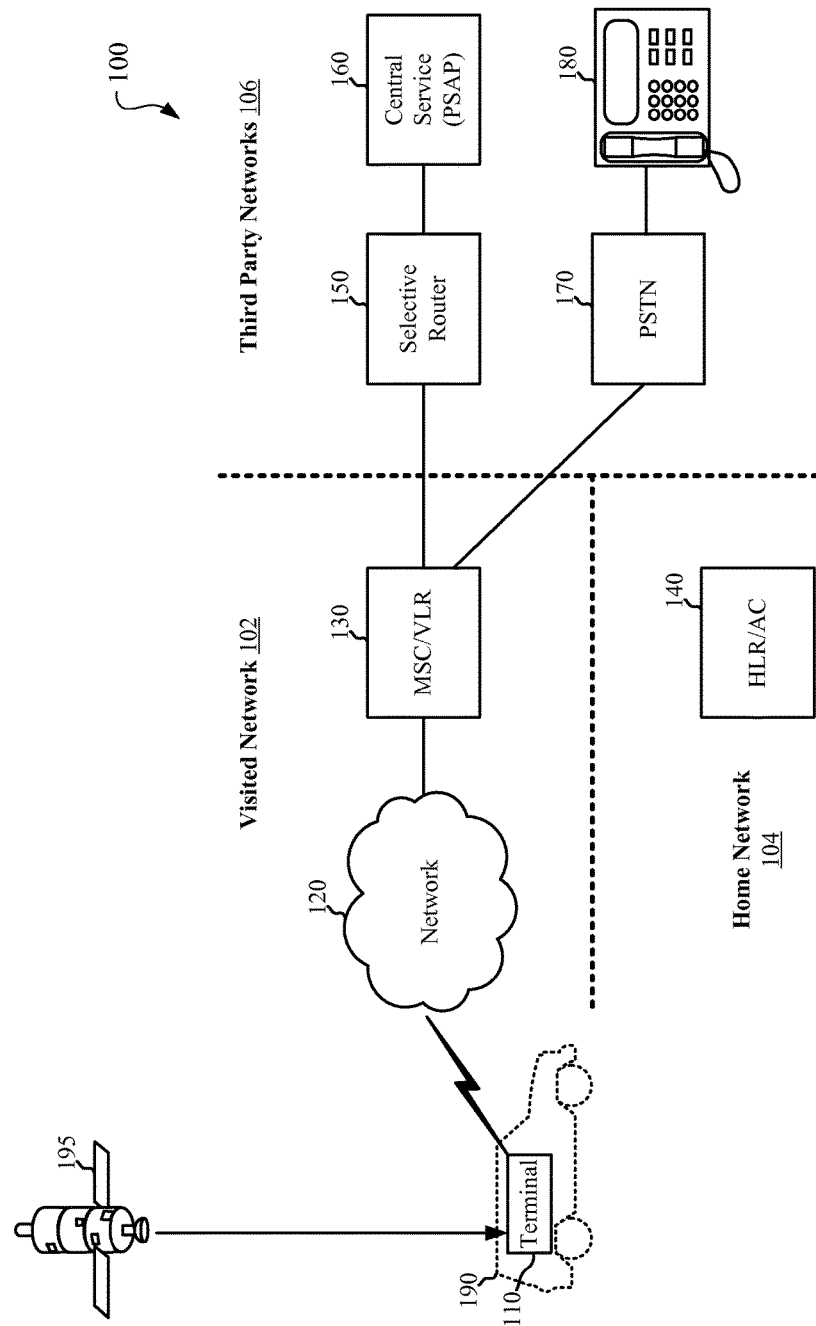
FIG. 1A shows a block diagram of a wireless communications system.
Figure 1B:
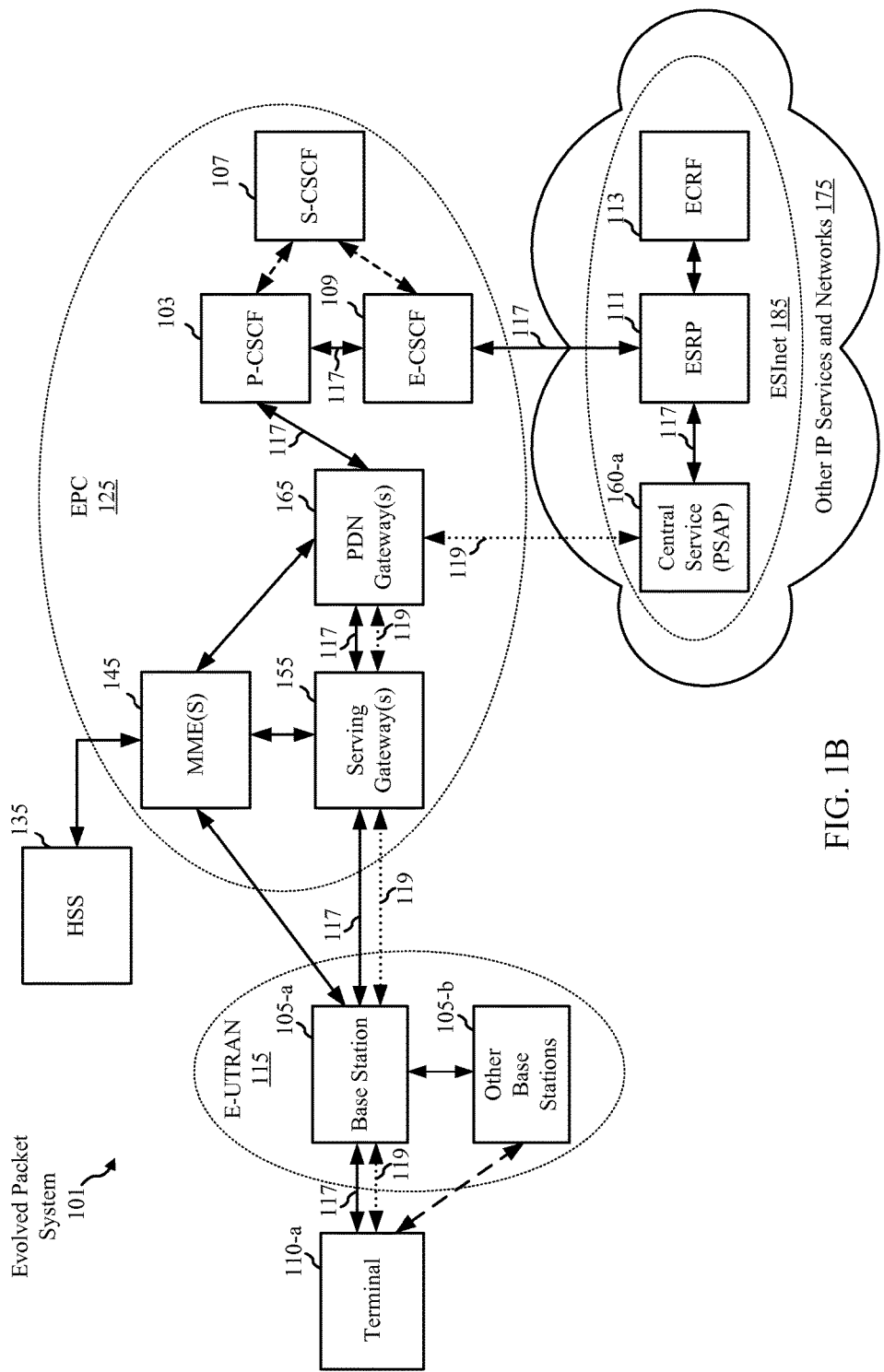
FIG. 1B illustrates another example block diagram of a wireless communications system.

FIG. 1A shows an exemplary wireless network system 100 which may be used to exchange telematics data and related (telematics) metadata between a terminal 110 and a central service (e.g., a Public Safety Answering Point (PSAP) 160) through signaling messages transmitted over a communication session signaling protocol. FIG. 1B, described below, shows examples of aspects of the system 100 in FIG. 1A. In some embodiments, packet-based telephony (e.g., Voice over Internet Protocol (VoIP), all-IP, Next Generation Network (NGN), etc.) may be used to exchange both the telematics data and metadata between the terminal and the central service—for example, a communication session signaling protocol (e.g., Session Initiation Protocol (SIP)).

Telematics data may refer broadly to data generated, collected, or stored at a terminal (such as a vehicle for transmission to a central service) for processing. Telematics data may include, but is not limited to, vehicle diagnostics data (e.g., location data, airbag deployment data, collision or impact sensor data, engine sensor data, and the like). In some embodiments, the recipient of telematics data may be another device (e.g. a PC, laptop, mobile phone, other vehicle, other fixed or mobile terminal) rather than a central service and the recipient may then store the telematics data, process it in some way or forward the data at the time of receipt or at a later time to another entity such as a central service. As an example of forwarding, a source of telematics data that is unable to establish a session with a central service may establish a session with some intermediate device that is able to reach the central service.

Telematics metadata may refer broadly to control or other data associated with telematics data transmitted between a terminal and a central service. For example, telematics metadata may include, but is not limited to, an acknowledgement of whether the telematics data was received at the central service, a request to retransmit the telematics data, a request to transmit different telematics data, a request to take some other action, auxiliary data describing actions taken by the central service, and the like. While telematics metadata may often be transmitted from the central service to the terminal in response to an attempt by the terminal to transmit telematics data, telematics metadata may also be transmitted by the terminal.

A communication session or session may refer broadly to a temporary or semi-permanent interactive information exchange between the endpoints or participants (e.g., a mobile device and a central server) for the purpose of streaming audio, video, or other media content between the endpoints or participants.

The wireless network system 100 in FIG. 1A may include a visited network 102, a home network 104, and third party networks 106. Visited network 102 may also be referred to as a Visited Public Land Mobile Network (V-PLMN), a serving network, etc. Home network 104 may also be referred to as a Home PLMN (H-PLMN). Visited network 102 may be a serving network for a terminal 110, which may be roaming from its home network 104, as assumed in much of the description below. Visited network 102 and home network 104 may be the same network if terminal 110 is not roaming.

Visited network 102 may include a radio access network (RAN) 120, a Mobile Switching Center (MSC)/Visitor Location Register (VLR) 130, and other network entities not shown in FIG. 1A for simplicity. RAN 120 may be a Global System for Mobile Communications (GSM) network, a Wideband Code Division Multiple Access (WCDMA) network, a General Packet Radio Service (GPRS) access network, a Long Term Evolution (LTE) network, CDMA 1× network, a High Rate Packet Data (HRPD) network, an Ultra Mobile Broadband (UMB) network, etc. WCDMA and GPRS are part of Universal Mobile Telecommunication System (UMTS). GSM, WCDMA, GPRS, and LTE are described in documents from an organization named "3rd Generation Partnership Project" (3GPP). CDMA 1× and HRPD are part of cdma2000, and cdma2000 and UMB are described in documents from an organization named "3rd Generation Partnership Project 2" (3GPP2). MSC 130 may perform switching functions for circuit-switched calls and may also route Short Message Service (SMS) messages. VLR 130 may store registration information for terminals that have registered with visited network 102. For some types of RAN (e.g. an LTE, GPRS or HRPD RAN), MSC/VLR 130 may be replaced by other entities—e.g. by a Serving GPRS Support Node (SGSN) in the case of GPRS or a Mobility Management Entity (MME) in the case of LTE.

Home network 104 may include a Home Location Register (HLR)/Authentication Center (AC) 140 and other network entities not shown in FIG. 1A for simplicity. HLR 140 may store subscription information for terminals that have service subscription with home network 104. AC 140 may perform authentication for terminals having service subscription with home network 104. In some networks, HLR 140 may be replaced by a Home Subscriber Server (HSS). In some cases there may be no home network 104 if terminal 110 is not subscribed to normal communications services—e.g. is restricted to making emergency calls only.

Third party networks 106 may include a router 150 (e.g., a PSAP selective router), a central service 160 (e.g., PSAP), a Public Switched Telephone Network (PSTN) 170, and possibly other network entities not shown in FIG. 1A. Router 150 may route calls between MSC 130 and central service 160. Central service 160 may be responsible for answering emergency calls and may also be referred to as an Emergency Center (EC). Central service 160 may be operated or owned by or on behalf of a government agency, e.g., a county or city. PSTN 170 may provide telephone services for conventional wireline telephones, such as a telephone 180. In certain examples, third party networks 106 may also include at least one third-party central service (not shown) which may be configured to communicate with the central service 160 (e.g., PSAP). For example, a third-party central service may be a private service operated or affiliated with an automobile manufacturer. In certain examples, the third-party central service may receive some or all emergency calls from terminal 110 and forward data or calls to PSAP central service 160 when appropriate.

FIG. 1A shows only some of the network entities that may be present in visited network 102 and home network 104. For example, visited network 102 may include network entities supporting packet-switched calls and other services as well as a location server to assist in obtaining terminal location.

Terminal 110 may be stationary or mobile and may also be referred to as a mobile station (MS) in GSM and CDMA 1×, a user equipment (UE) in WCDMA and LTE, an access terminal (AT) in HRPD, a SUPL enabled terminal (SET) in Secure User Plane Location (SUPL), a subscriber unit, a station, etc. Terminal 110 may be a device such as a cellular phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals.

Terminal 110 may also include one or more devices which communicate with a personal navigation device (PND), such as by short-range wireless, infrared, wireline connection, or other connection—regardless of whether satellite signal reception, assistance data reception, and/or position-related processing occurs at the device or at the PND. Also, terminal 110 is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also included. Terminal 110 may be an emergency call In-Vehicle System (IVS), either dedicated to emergency calls or handling a broader set of functions, which may be permanently attached to (and possibly part of) a vehicle 190. Terminal 110 may be associated with one or more other devices not shown in FIG. 1A, such as sensors attached to a vehicle or a control unit for sensors attached to a vehicle or some other source of telematics data that is able to send telematics data to terminal 110 (e.g. via wireless means) and possibly instigate a session from terminal 110 to a central server.

Terminal 110 may have a service subscription with home network 104 and may be roaming in visited network 102, as shown in FIG. 1A. Terminal 110 may receive signals from RAN 120 in visited network 102 or may communicate with the RAN to obtain communication services. Terminal 110 may also communicate with home network 104 for communication services when not roaming (not shown in FIG. 1A). In some embodiments, terminal 110 may monitor signals from RAN 120 but not communicate with RAN 120 until such time as a session may be needed with central service 160. Such embodiments may be advantageous to reduce signaling load on visited network 102 and avoid or minimize subscription chargers to the user of terminal 110. Terminal 110 may also receive signals from one or more satellites 195, which may be part of a satellite positioning system (SPS). An SPS may include a system of transmitters positioned to enable entities to determine their location on or above the Earth based, at least in part, on signals received from the transmitters. Such a transmitter may transmit a signal marked with a repeating pseudo-random noise (PN) code of a set number of chips and may be located on ground based control stations, user equipment and/or space vehicles.

In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems.

By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. Terminal 110 may measure signals from satellites 195 and obtain pseudo-range measurements for the satellites. Terminal 110 may also measure signals from base stations in RAN 120 and obtain timing and/or signal strength measurements for the base stations. The pseudo-range measurements, timing measurements, and/or signal strength measurements may be used to derive a position estimate for terminal 110. A position estimate may also be referred to as a location estimate, a position fix, etc.

Terminal 110 may have an International Mobile Equipment Identity (IMEI), which is a unique number assigned to the terminal. Terminal 110 may be used for a service subscription of a user. The service subscription may be associated with an International Mobile Subscriber Identity (IMSI), which is a unique number assigned to a subscription for GSM and UMTS networks. The service subscription may also be associated with a Mobile Subscriber Integrated Services Digital Network Number (MSISDN), which is a telephone number for the service subscription. The IMSI may be used as a key for the service subscription in a subscriber database in HLR 140. The MSISDN may be dialed by other users to connect calls to terminal 110 used for the service subscription. The IMSI, the MSISDN, and other subscription information may be stored in a Subscriber Identity Module (SIM) or a Universal Subscriber Identity Module (USIM), which may be inserted into terminal 110. Terminal 110 may also have no SIM/USIM, in which case terminal 110 may have only an IMEI but no IMSI or MSISDN.

Wireless networks may support different types of emergency calls. One type may include "normal" emergency calls originated by users dialing well-known emergency numbers such as 911 in North America and 112 in Europe. Another type may include eCalls, which are emergency calls that may have the characteristics described above and may include the transfer of telematics data to a central service as well as supporting voice and/or other media communication between the user of terminal 110 and the central service. Support for eCalls may be required by the European Union and by other world regions and/or countries. An eCall may be different from a normal emergency call in the manners in which the call is placed and the additional emergency related data that may be sent to establish the eCall and used to process the eCall. For example, the additional data may indicate how the eCall was initiated (e.g. whether manually by a user or automatically in response to sensor data or a sensor trigger), a vehicle type and vehicle identification number (VIN), a timestamp, a position estimate and position confidence flag, a direction of travel, a number of passengers (e.g., from seat occupancy sensors), other passenger data (e.g., fastened seatbelts), a service provider for terminal 110 (if any), a trigger type (e.g., deployed airbags, bumper sensors, fire indicators, rollover, or other situation detection, etc.), and possibly other information. The additional data may also enable an accurate geographic location of the terminal to be provided to the central service 160. Another type may include vehicle emergency calls which differ from eCall in certain aspects.

In certain examples, terminal 110 may be configured to initiate an emergency call to the central service 160 (e.g., PSAP). The emergency call may be initiated in response to manual input from a user or in response to one or more detected conditions (e.g., deployed airbags, collision sensors, fire indicators, rollover, or other situation detection, etc.). To initiate the emergency call, the terminal 110 may use a communication session signaling protocol such as Session Initiation Protocol (SIP), Extensible Messaging and Presence Protocol (XMPP), Google Talk, Skype, OSCAR, or Microsoft Messenger Service, or another communication session signaling protocol, to establish a packet-based call (e.g., voice call, packet based data call involving text, IM or video communication, and the like) with the central service 160 or a third-party central service (not shown). The terminal 110 may transmit a set of telematics data in a first signaling message over the communication session signaling protocol, and the central service 160 or third-party central service may respond via a second signaling message over the communication session signaling protocol with metadata for the set of telematics data, such as an acknowledgement of whether the telematics data was received at the central service, a request to retransmit the telematics data, a request to transmit different telematics data, a request to take some other action, auxiliary data describing actions taken by the central service, and/or other relevant telematics metadata. In this way, the transmission of telematics data and related telematics metadata may occur separately from voice and/or other media (e.g., Instant Message (IM), text, video, etc.) communications and need not therefore disrupt the media stream (e.g., media channel). Moreover, telematics data and related telematics metadata may be exchanged between the terminal 110 and central service much more efficiently and quickly than may be possible with voice channel modulation. Further, the telematics data and related telematics metadata may be associated or coordinated with the session and/or the voice channel (e.g., the telematics data and related telematics metadata may be exchanged between the same PSAP that is handling the voice channel).

In some embodiments, the terminal 110 may be configured to transmit a set of telematics capabilities to the central service 160 (e.g., an emergency call answering point or PSAP) using a communication session signaling protocol. In one example, the terminal 110 may transmit the capabilities with the set of telematics data in the first signaling message, whereas in other embodiments the terminal 110 may transmit the capabilities in a subsequent signaling message—for example in response to a request from the central service to transmit the set of capabilities.

The set of capabilities may include one or more actions that the terminal (e.g., an emergency IVS of a vehicle) is capable of performing, for example gathering additional telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, unlocking a door, locking a door, activating a horn of a vehicle, activating an externally audible sound, activating lights of a vehicle, activating flashers of a vehicle, actuating a power window, playing a recorded message, rendering media, displaying a text message, activating a camera, deactivating a camera, or a combination thereof.

As described in more detail below, the set of capabilities may be transmitted in a capabilities data structure corresponding to a request data structure by which the emergency call IVS accepts requests to perform the one or more actions. In one example, the capabilities data structure may be substantially identical to the request data structure. Also, in one example, the capabilities data structure may be formatted as an Extensible Markup Language (XML) element. If the capabilities data structure is an XML element, the one or more actions may each be included as a child XML element within the capabilities XML data structure, optionally with a parameter corresponding to the action (e.g., a duration over which the action should be carried out or another parameter related to the action) being a parameter of the child XML element. In another example, the parameter may be included as a child XML element within the child XML element corresponding to the available action. It will be appreciated that XML formatting is merely one way to format the capabilities data structure, and that many others are contemplated and within the scope of this disclosure.

In some embodiments, having the terminal 110 transmit the capabilities data structure with actions that the terminal 110 is capable of performing may accommodate the wide variety of actions supported by different vehicles, or by the same vehicle over time. In this manner, the set of capabilities supported by any given terminal 110 can be reconfigured over time. For example, manufacturer of an IVS, a manufacturer of a vehicle, a telematics service provider, or another authorized entity may reconfigure the set of capabilities associated with a particular terminal 110. In another example, the set of capabilities may be dynamically reconfigured by the IVS itself based at least in part on operational conditions of vehicle components associated with the actions (e.g., if the IVS recognizes that a headlight was damaged during an accident, the IVS may remove flashing the lights from the set of capabilities transmitted to the central service 160).

FIG. 1B is a diagram illustrating an LTE/LTE-Advanced network architecture, in accordance with various embodiments, which may be an example of aspects of the system 100 illustrated in FIG. 1A. The LTE/LTE-A network architecture may be referred to as an Evolved Packet System (EPS) 101, and may be used to transmit data between terminals 110 and the central service 160 of FIG. 1A in some embodiments. The EPS 101 in FIG. 1B may include one or more terminals 110-*a* (e.g., User Equipments (UEs)), an Evolved UMTS Terrestrial Radio Access Network (E-UTRAN) 115, an Evolved Packet Core (EPC) 125, a Home Subscriber Server (HSS) 135, and may connect to Other IP Services and Networks 175. The EPS 101 may interconnect with other access networks, but for simplicity those entities/interfaces are not shown. As shown, the EPS 101 provides packet-switched services, however, as those skilled in the art will readily appreciate, the various concepts presented throughout this disclosure may be extended to networks providing circuit-switched services.

The E-UTRAN 115 may include a base station 105-*a* (e.g., Evolved Node B (eNB)) and other base stations 105-*b*. The base station 105-*a* may provide user and control plane protocol terminations toward the terminal 110-*a*. The terminal 110-*a* may be an example of the terminal 110 of FIG. 1A. The base station 105-*a* may be connected to the other base stations 105-*b* via an X2 interface (e.g., backhaul). The base station 105-*a* may provide an access point to the EPC 125 for the terminal 110-*a*. The base station 105-*a* may be connected by an S1 interface to the EPC 125. The EPC 125 may include one or more Mobility Management Entities (MMEs) 145, one or more Serving Gateways 155, and one or more Packet Data Network (PDN) Gateways 165. The MME 145 may be the control node that processes the signaling between the terminal 110-*a* and the EPC 125. Generally, the MME 145 may provide bearer and connection management and manage mobility for terminals such as terminal 110-*a*. All user IP packets may be transferred through the Serving Gateway 155, which itself may be connected to the PDN Gateway 165. The PDN Gateway 165 may provide terminal IP address allocation as well as other functions. The PDN Gateway 165 may be connected to the Other IP Services and Networks 175 including IP services owned and operated by the operator for EPS 101. The Other IP Services and Networks 175 may include the Internet, an Intranet, an IP Multimedia Subsystem (IMS), and a Packet-Switched (PS) Streaming Service (PSS). The Other IP Services and Networks 175 may also include (or connect to) an Emergency Services IP network (ESInet) 185, which may be owned or operated by or on behalf of some public (e.g., public safety) organization.

The PDN Gateway 165 may also be connected to a Proxy-Call Session Control Function (P-CSCF) 103. The P-CSCF 103 may be connected to an Emergency-Call Session Control Function (E-CSCF) 109. In certain examples (enterprise networks, for example), the P-CSCF 103 may be connected to the E-CSCF 109 through a Serving-Call Session Control Function (S-CSCF) 107. P-CSCF 103, E-CSCF 109, and S-CSCF 107 may be part of an IMS for EPS 101. In the case where the terminal 110-*a* is an IMS device, it may send an INVITE to its cellular carrier's network (e.g., to the P-CSCF 103 which may forward it to the E-CSCF 109, which may forward it to the emergency services network (ESInet) 185 which may determine the correct PSAP (e.g., central service 160-*a*) and forward it there.

The ESInet 185 may include a central service 160-*a* (e.g., PSAP), which may be an example of the central service 160 of FIG. 1A. The central service 160-*a* may be connected to an Emergency Services Routing Proxy (ESRP) 111. The ESRP 111 may be connected to an Emergency Call Routing Function (ECRF) 113.

The terminal 110-*a* may be configured to collaboratively communicate with multiple base stations 105 through, for example, Multiple Input Multiple Output (MIMO), Coordinated Multi-Point (CoMP), or other schemes. MIMO techniques use multiple antennas on the base stations and/or multiple antennas on the terminal to take advantage of multipath environments to transmit multiple data streams. CoMP includes techniques for dynamic coordination of transmission and reception by a number of base stations to improve overall transmission quality for terminal as well as increasing network and spectrum utilization.

In certain examples, the terminal 110-*a* may be configured to initiate an emergency call to the central service 160-*a* (e.g., PSAP). The emergency call may be initiated in response to manual input from a user or in response to one or more detected condition (e.g., deployed airbags, collision sensors, fire indicators, rollover, or other situation detection, etc.). The emergency call may include a first set of signaling 117 related to a communication session signaling protocol (e.g., SIP) (that may include telematics information, for example) and a second set of signaling 119 related to a communication session (e.g., voice/data). The base station 105-*a* may route the first set of signaling 117 and the second set of signaling 119 to the serving gateway 155. The serving gateway 155 may route the first set of signaling 117 and the second set of signaling 119 to the PDN gateway 165. The PDN gateway 165 may route the first set of signaling 117 to the P-CSCF 103 and may route the second set of signaling 119 to the central service 160. The P-CSCF 103 may route the first set of signaling 117 to the E-CSCF 109. In some cases (in enterprise networks, for example), the P-CSCF 103 may route the first set of signaling 117 to the E-CSCF 109 via the S-CSCF 107. The E-CSCF 109 may route the first set of signaling 117 to the ESRP 111. The ESRP 111 may route the first set of signaling 117 to the central service 160-*a*. Thus, the telematics data and related telematics metadata may be associated or coordinated with the session and/or the media stream(s) (e.g., the telematics data and related telematics metadata may be exchanged between the same PSAP that is handling the media stream(s)). The media stream(s) may include any streaming media, including voice, message-at-a-time text (e.g., IM), character-at-a-time text (e.g., streaming text, real-time text), audio, video, and/or any non-streaming media such as text messages. In some cases, the media exchanged in what may be referred to as a media stream may carry only non-streaming media.

As described above, a set of capabilities corresponding to the terminal may also be transmitted from the terminal 110-*a*. The set of capabilities may be transferred in one or both of the first or second sets of signaling 117, 119.

Figure 2:
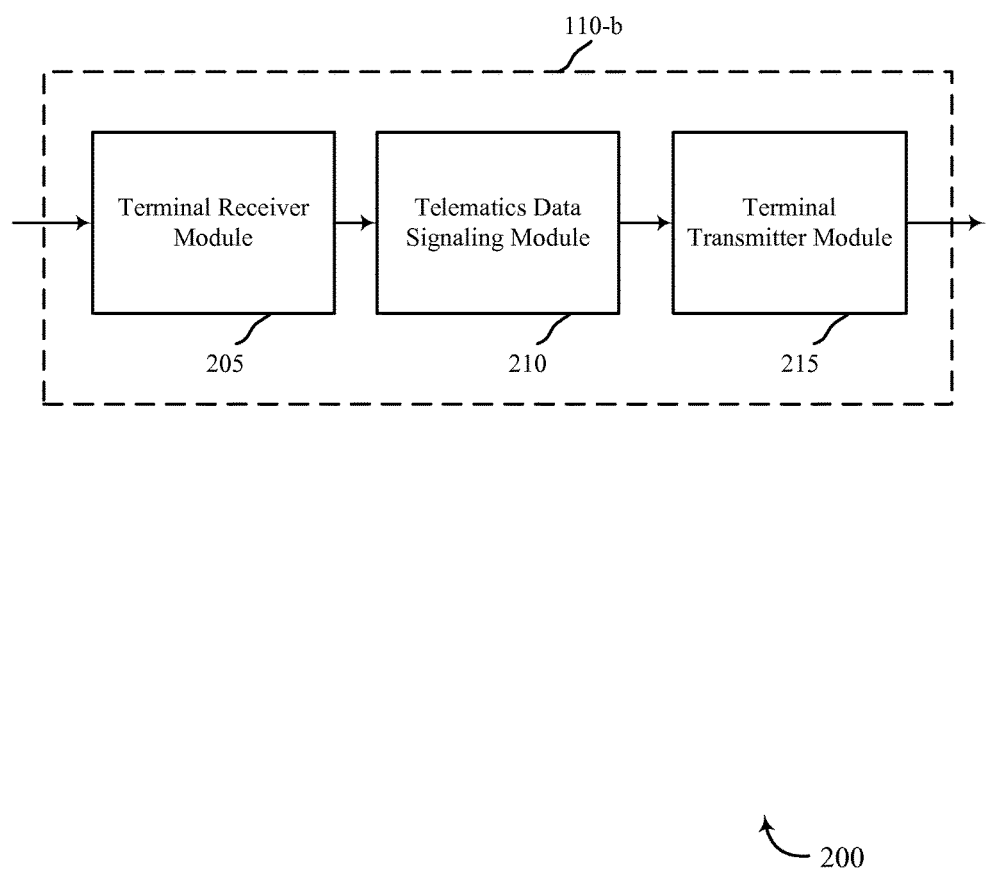
FIG. 2 is a block diagram illustrating one embodiment of a terminal in accordance with the present systems and methods.

FIG. 2 is a block diagram 200 illustrating one embodiment of a terminal 110-*b*, in accordance with the present systems and methods. The terminal 110-*b* may be an example of the terminal 110 of FIGS. 1A and/or the terminal 110-*a* of FIG. 1B. The terminal 110-*b* may include a terminal receiver module 205, a telematics data signaling module 210, and a terminal transmitter module 215. Each of these components may be in communication with each other. Terminal 110-*b* may include other modules not shown in FIG. 2—e.g. may include sensors to detect conditions and events associated with a vehicle and a receiver and processor to enable the location of the terminal to be estimated or determined from wireless signals received from GPS satellites.

These components of the terminal 110-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the terminal receiver module 205 may include a cellular receiver and may receive transmissions from a base station 105. In one example, the terminal receiver module 205 may receive a signaling message for a communication signaling protocol that has been adapted to include telematics metadata. The telematics data signaling module 210 may extract the telematics metadata from the adapted signaling message. The telematics data signaling module 210 may also adapt a signaling message for a communication signaling protocol to include telematics data. The adapted signaling message for the communication signaling protocol may be transmitted via the terminal transmitter module 215. Details regarding the telematics data signaling module 210 will be described below.

Figure 3:
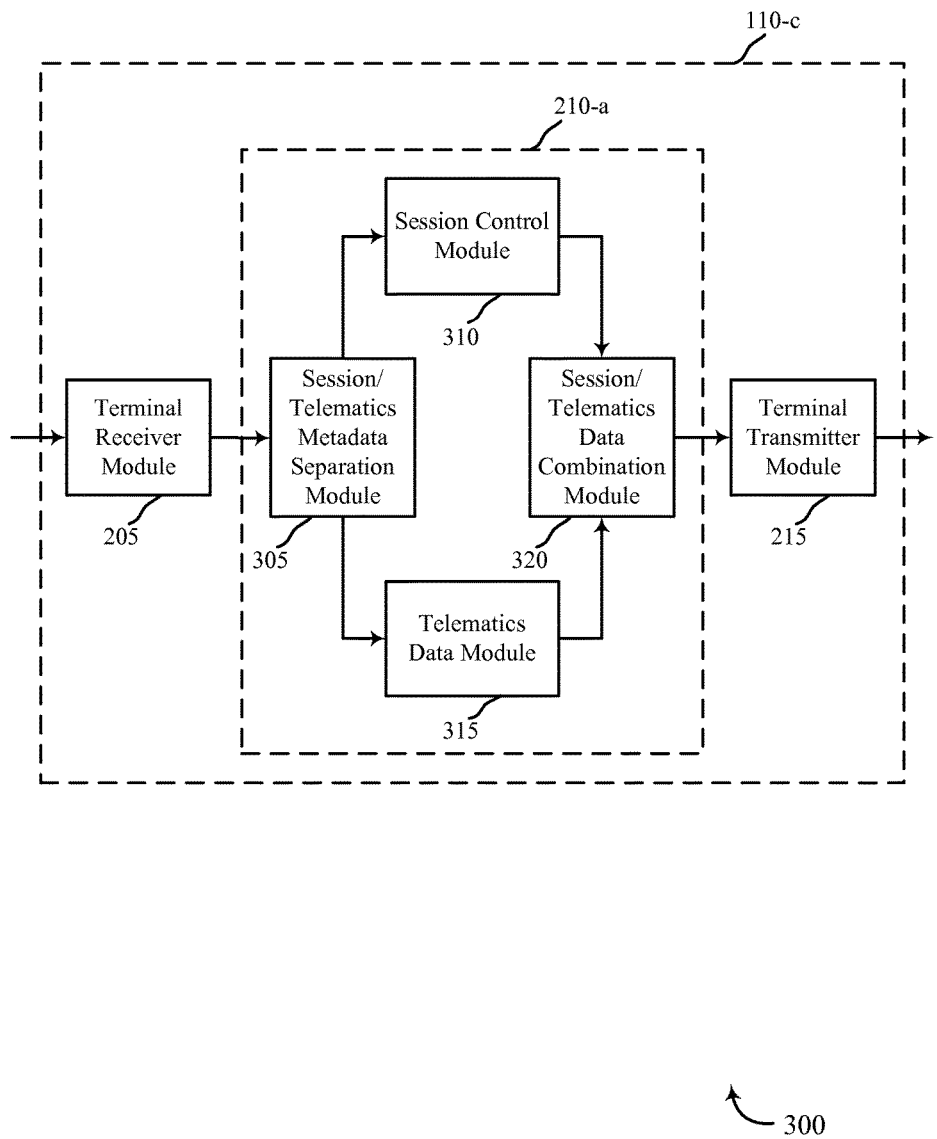
FIG. 3 is a block diagram illustrating a further embodiment of the terminal.

FIG. 3 is a block diagram 300 illustrating one embodiment to of a terminal 110-c in accordance with the present systems and methods. The terminal 110-c may be an example of the terminal 110 illustrated in FIGS. 1A, 1B, and/or 2. The terminal 110-c may include a terminal receiver module 205, a telematics data signaling module 210-a, and a terminal transmitter module 215, as previously described. Each of these components may be in communication with each other.

These components of the terminal 110-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the telematics data signaling module 210-a may include a telematics data module 315. The telematics data module 315 may generate and/or obtain telematics data. The telematics data module 315 may also receive telematics metadata. In certain examples, the telematics data module 315 may obtain telematics data based on received telematics metadata.

The telematics data signaling module 210-a may also include a session control module 310. The session control module 310 may use one or more signaling messages to control and/or facilitate a communications session. In certain embodiments, the session control module 310 may control and/or facilitate a communications session by communicating session information according to a communication session signaling protocol. In one example, the session control module 310 may generate a signaling message that includes a set (e.g., first set) of signal information. The session control module 310 may also obtain a signaling message that includes a set (e.g., second set) of signal information.

In one embodiment, the telematics data signaling module 210-a may include a session/telematics metadata separation module 305. As noted previously, a signaling message may be adapted to include telematics data and/or telematics metadata along with the session information. For example, a signaling message may be adapted to include a second set of session information and a first set of telematics metadata. The session/telematics metadata separation module 305 may extract any telematics metadata from an adapted signaling message. The session/telematics metadata separation module 305 may provide the session information (in the form of a signaling message, for example) to the session control module 310 and may provide the telematics metadata to the telematics data module 315.

The telematics data signaling module 210-a may also include a session/telematics data combination module 320. The session/telematics data combination module 320 may adapt a signaling message generated by the session control module 310 to include telematics data from the telematics data module 315. In one example, the adapted signaling message may include a first set of session information and a first set of telematics data. The adapted signaling message may be transmitted via the terminal transmitter module 215.

Figure 4:
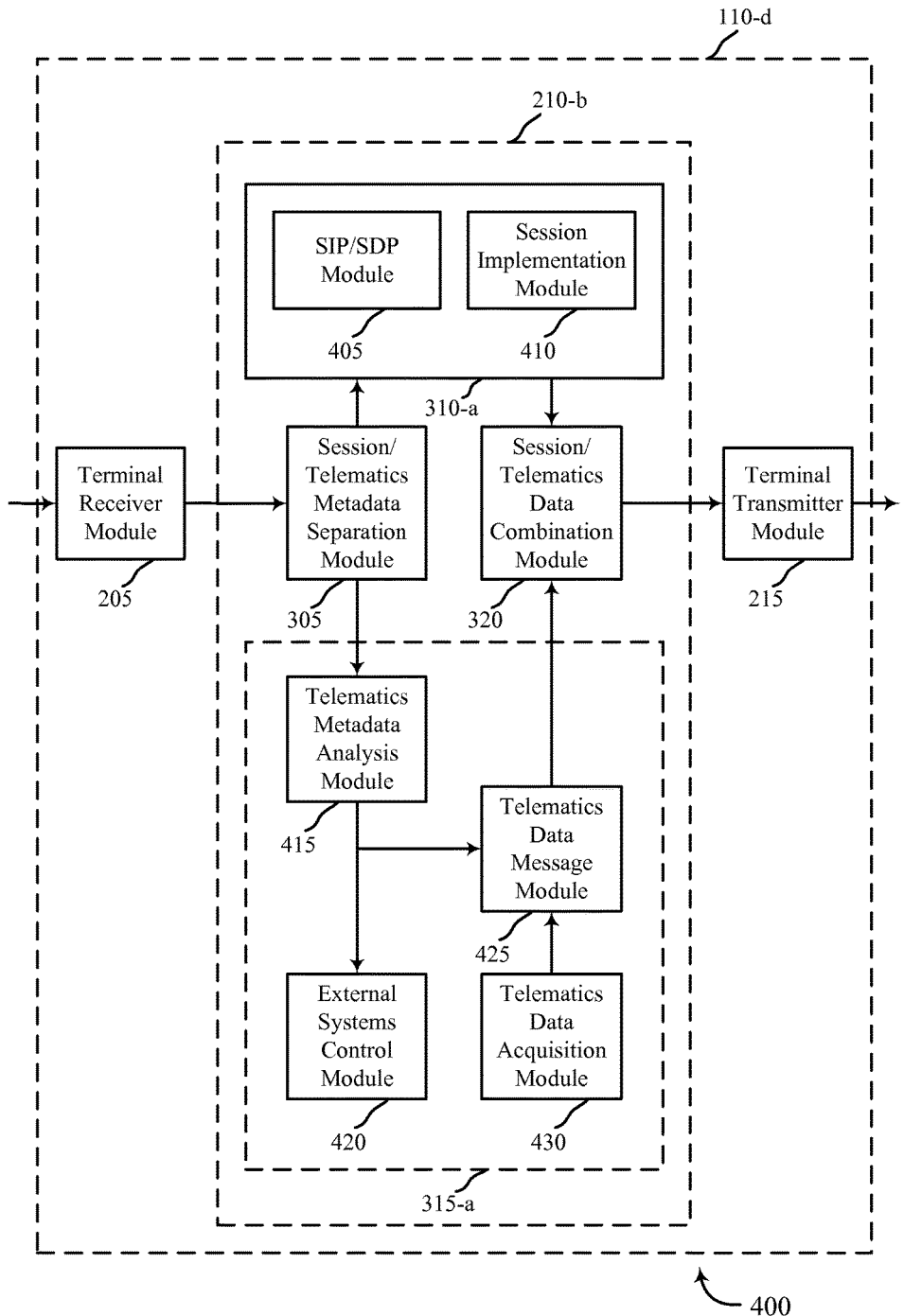
FIG. 4 is a block diagram illustrating a further example of the terminal for implementing the functionality of the present systems and methods.

FIG. 4 is a block diagram 400 illustrating one embodiment of a terminal 110-d in accordance with the present systems and methods. The terminal 110-d may be an example of the terminal 110 illustrated in FIGS. 1A, 1B, 2, and/or 3. In one configuration, the terminal 110-d may include a terminal receiver module 205, a telematics data signaling module 210-b, and a terminal transmitter module 215. Each of these components may be in communication with each other.

These components of the terminal 110-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the terminal 110-d may be configured at least to gather telematics data, establish a communication session with a central service, transmit telematics data to the central service through an adapted use of a communication session signaling protocol, receive telematics metadata from the central service via the adapted use of the communication session signaling protocol, and take certain actions based on the received telematics metadata.

The telematics data signaling module 210-b may include a session control module 310-a. The session control module 310-a may include an SIP/SDP module 405 and a session implementation module 410. The SIP/SDP module 405 may be configured to negotiate, set up, manage, and terminate communication sessions with the central service. The SIP/SDP module 405 may generate SIP signaling message header content and SDP content to communicate session-related signaling data with the central service. The session implementation module 410 may be configured to receive media content (e.g., audio data for a voice call, audio and video data for a video call, text data for a call with text with or without voice or video), transmit the media content as a stream of packets to the central service according to the negotiated session, and receive a stream of packets containing media content from the central service according to the negotiated session.

The telematics data signaling module 210-b may also include a telematics data module 315-a. The telematics data module 315-a may include a telematics data acquisition module 430, a telematics data message module 425, a telematics metadata analysis module 415, and an external systems control module 420. The telematics data acquisition module 430 may gather telematics data from a system or device associated with the terminal 110-d. For example, where terminal 110-d is associated with a vehicle, the telematics data acquisition module 430 may gather data related to a vehicle type and vehicle identification number (VIN), one or more timestamps, a position estimate and associated degree of confidence, a direction of travel, a number of passengers (e.g., with fastened seatbelts), a service provider for the terminal (if any), a trigger type (e.g., deployed airbags, bumper sensors, manual trigger, fire indicators, rollover, or other situation detection, etc.), and/or other relevant information that may suit a particular application of the principles described herein.

The telematics data message module 425 of the telematics data module 315-a may format telematics data for transmission to the central service according to a protocol understood by the central service. In certain examples, telematics data message module 425 may compile a standard set of telematics data for transmission to the central service. Additionally or alternatively, the telematics data message module 425 may be configured to compile a set of specific telematics data requested from the central service for transmission to the central service.

The telematics data module 315-a may additionally include a telematics metadata analysis module 415. The telematics metadata analysis module 415 may analyze the telematics metadata to identify any actions that may be performed based on the telematics metadata received from the central service in association with the telematics data transmitted to the central service. The identified actions may be specifically requested by the central service or inferred by the telematics metadata analysis module 415 based on the received telematics metadata. For example, the telematics metadata may include a request to retransmit the telematics data, to transmit a different set of telematics data, or to transmit an updated version of the set of telematics data. The telematics metadata analysis module 415 may provide the appropriate telematics metadata and/or appropriate instructions to the telematics data message module 425 and/or the external systems control module 420.

The external systems control module 420 of the telematics data module 315-a may be configured to take one or more actions based on telematics metadata received from the central service in association with the telematics data transmitted to the central service. Returning again to the example in which the terminal 110-d is associated with a vehicle and the telematics data is transmitted to the central service in response to a detected collision, the telematics metadata may include instructions to take certain precautionary or rescue actions with respect to the vehicle and its occupants. Such actions may include, but are not limited to, gathering additional telematics data, turning off or on an ignition of the vehicle, turning a fuel supply of the vehicle off or on, unlocking or locking a door of the vehicle, activating the horn of the vehicle, playing externally audible sounds, turning on the lights (e.g., headlights, running lights) of the vehicle, turning on the interior (e.g., cabin) lights of the vehicle, turning on the flashers of the vehicle (e.g., 4 ways, emergency flashers, hazard lights), actuating a power window, playing a recorded message received from the central service or stored at the terminal 110-d, rendering media (e.g., rendering text-to-speech, playing media sent by the central service, playing media referenced by and/or associated with an instruction sent by the central service), displaying a text message received from the central service or stored at the terminal 110-d, or other appropriate actions. It is noted that the things such as activating the horn, playing externally audible sounds, turning on the light, and/or turning on the flashers may help alert emergency personnel of the location of the vehicle or otherwise get noticed.

The telematics data signaling module 210-b may include the session/telematics metadata separation module 305. The session/telematics metadata separation module 305 may receive (via the terminal receiver module 205, for example) a modified SIP or other communication session signaling protocol message and may separate the SIP/SDP (or other protocol) information from telematics metadata messages. In certain embodiments, the session/telematics metadata separation module 305 may provide the SIP/SDP (or other protocol) information to the SIP/SDP module 405 and the one or more telematics metadata messages to the telematics metadata analysis module 415 as described above. In one example, the session/telematics metadata separation module 305 may identify different portions of a modified SIP message based on information from the header of the modified SIP message. In this example, the session/telematics metadata separation module 305 may provide the portions identified as SIP/SDP information to the SIP/SDP module 405 and the portions identified as telematics metadata messages to the telematics metadata analysis module 415 as described above.

The telematics data signaling module 210-b may also include the session/telematics data combination module 320. The session/telematics data combination module 320 may combine SIP/SDP (or other protocol) information from the SIP/SDP module 405 and one or more telematics data messages from the telematics data message module 425-a into a modified SIP or other communication session signaling protocol message as described above. The terminal transmitter module 215 may transmit the generated signaling messages to the central service.

Figure 5A:
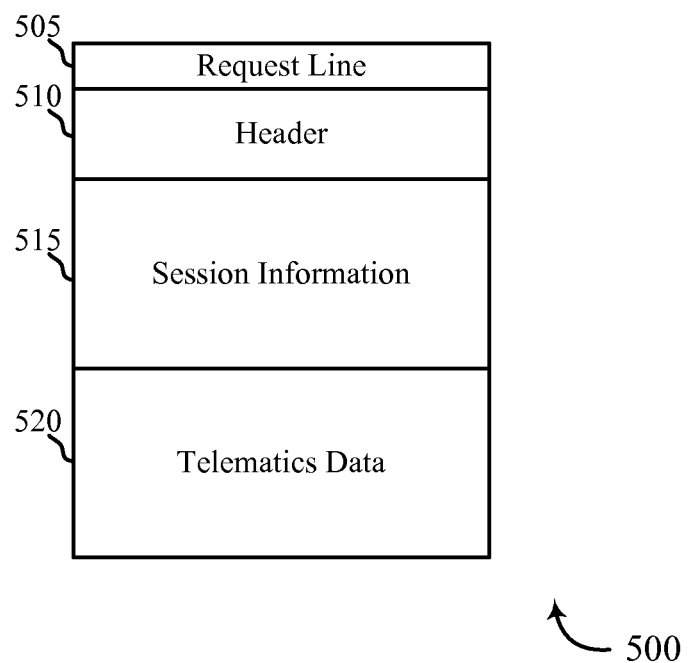
FIG. 5A shows a block diagram of an exemplary format for a request message according to a communication session signaling protocol.

FIG. 5A, FIG. 5B, and FIG. 5C illustrate an example of a session initiation protocol (SIP) request message modified to carry both session data and telematics data. FIG. 5A shows a diagram of an example format 500 of the request message and FIGS. 5B and 5C show a diagram of the content of an example SIP request message 550 based on the format of FIG. 5A. While the examples of FIG. 5A, FIG. 5B, and FIG. 5C are described in the context of modified and repurposed SIP request messages, it will be understood that the principles of the present description may be used to modify or extend other communication session signaling protocols (e.g., XMPP, Google Talk, MSN, etc.) or as a basis for new communication session signaling protocols.

By repurposing the SIP protocol to carry both session data and telematics data, the telematics data may be efficiently transmitted to a central service without interrupting or degrading the quality of a related call. As shown in FIG. 5A, the modified SIP request message format 500 may include a request line 505, a header 510, a set of session information 515 (e.g., session parameters, session data), and a set of telematics data 520. The SIP protocol is defined by the Internet Engineering Task Force (IETF) in a number of Request For Comments standards such as RFC 3261. These standards define a number of SIP request and response messages, including an INVITE message, an ACK message, a BYE message, a CANCEL message, an OPTIONS message, a REGISTER message, a PRACK message, a SUBSCRIBE message, a NOTIFY message, a PUBLISH message, an INFO message, a REFER message, a MESSAGE message, and an UPDATE message. The present format 500 may be used for each of these messages and for other types of request and response messages.

In the example of FIG. 5B, a modified SIP INVITE message 550-a based on the format of FIG. 5A may be used, for example, by a terminal to simultaneously request a call or other communications session with a central service and transmit telematics data to that central service. In this way, the telematics data may be received by the central service even if the central service is unable to establish (or declines) a call with the terminal.

The request line 505-*a* of the example SIP INVITE message 550-*a* may identify the message 550-*a* as a request and specify the type of request that is being made (e.g., INVITE). The header 510-*a* of the request message may define the source of the request, the intended recipient (e.g., emergency service URN) of the request, a call identifier, contact information for the source, a call sequence number, an indication of the type(s) of data in the body, and a length of the message. In the present example, the header 510-*a* may specify that the body contains mixed data, with the character string "-----NextPart-----" indicating the boundary between the different types of data in the body. In the present example, the body of the message includes both session information 515-*a* and telematics data 520-*a*. It is noted that the present example may not show all of the header fields that may typically be included.

The session information 515-*a* may include of list of parameters for the proposed session between the terminal and the central service. For example, the SIP INVITE message 550-*a* of may include a set of Session Description Protocol (SDP) parameters for setting up a VoIP audio call.

The telematics data 520-*a* may include sensor readings, stored or logged data, and other data associated with the terminal that are transmitted to the central service. In certain examples, the telematics data may not be directly related to setting up and maintaining the session. Thus, even if the central service rejects the proposed parameters of the call in the session information 515-*a* portion of the SIP INVITE message 550-*a* or is unable to establish the session for other reasons, the central service may still receive and process the telematics data 520-*a*. In the present example, the SIP INVITE message 550-*a* may propose an emergency call with a PSAP service based on an automatic or manual trigger in a vehicle. The telematics data 520-*a* transmitted with the parameters session information 515-*a* may include a number of measurements related to the status of the vehicle and/or its occupants and the events triggering the emergency call. As shown in the example of FIG. 5B, the telematics data 520-*a* may include a status code, a cargo type, a manufacturer specific identifier associated with the terminal, the location of the vehicle, a current or previous velocity of the vehicle, a direction of the vehicle, and a checksum. In certain examples, the telematics data 520-*a* may include an eCall minimum set of data (MSD) or other standard set of emergency call data—e.g., as defined by or on behalf of some country or region (e.g. the European Union).

FIG. 5C shows an example modified SIP request message 550-*b* similar to the modified SIP request message 550-*a* of FIG. 5B. In the example of FIG. 5C, however, the session information 515-*b* may include a Presence Information Data Format-Location Object (PIDF-LO) and the telematics data 520-*b* may include an eCallData object 535. In one example, the eCallData object 535 may be referenced by a tag 530 in the header 510-*b*. In one example, the tag 530 in the header 510-*b* may use the content-ID (i.e., 1234567890@rosebud.example.com) of the eCallData object 535 to reference the eCallData object 535. In the example of FIG. 5C, the header 510-*b* may also include an indication 525 that the INVITE is for both an emergency call and an automatically-triggered eCall.

Figure 6:
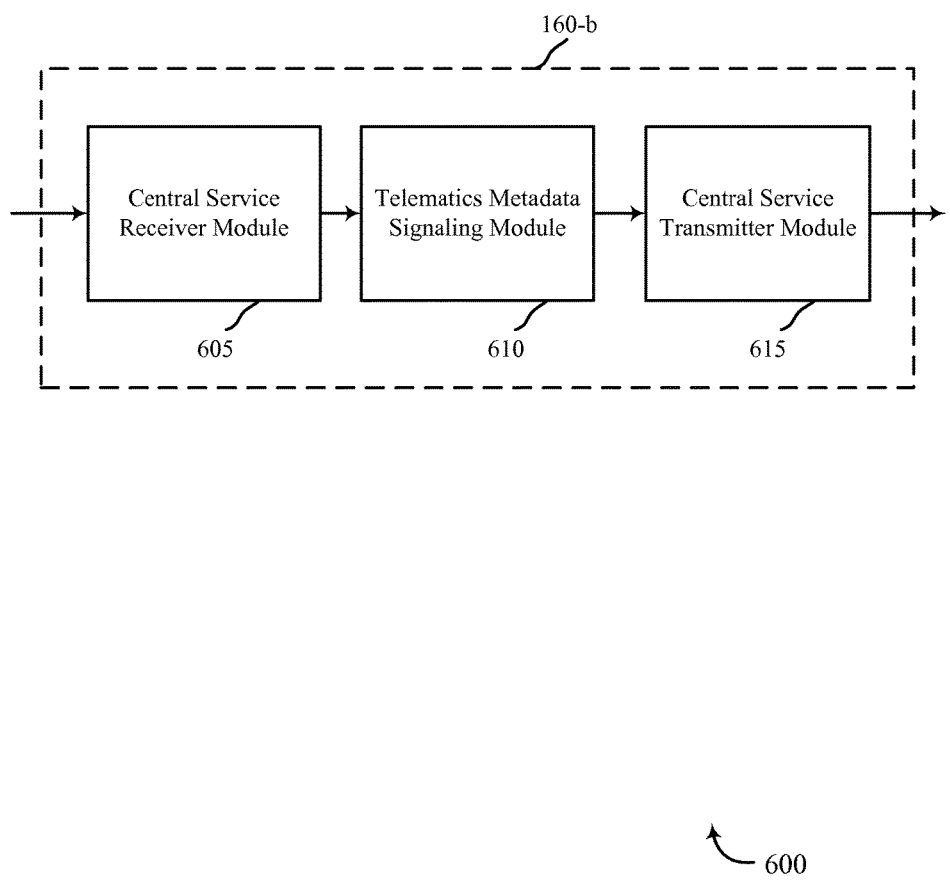
FIG. 6 is a block diagram illustrating one embodiment of a central station in accordance with the present systems and methods.

FIG. 6 is a block diagram 600 illustrating one embodiment of a central service 160-*b*, in accordance with the present systems and methods. The central service 160-*b* may be an example of the central service 160 of FIGS. 1A and/or 1B. The central service 160-*b* may include a central service receiver module 605, a telematics metadata signaling module 610, and a central service transmitter module 615. Each of these components may be in communication with each other.

These components of the central service 160-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the central service receiver module 605 may include a cellular receiver and/or a network interface card (NIC) and may receive communications via an Other IP Services and Networks 175 or any other IP connectivity service. In one example, the central service receiver module 605 may receive a signaling message for a communication signaling protocol that has been adapted to include telematics data. The telematics metadata signaling module 610 may extract the telematics data from the adapted signaling message. The telematics metadata signaling module 610 may also adapt a signaling message for a communication signaling protocol to include telematics metadata. The adapted signaling message for the communication signaling protocol may be transmitted via the central service transmitter module 615. Details regarding the telematics metadata signaling module 610 will be described below. In another configuration, the central service receiver module 605 may support the receipt of packet data via wireline means—e.g. from ESRP 111 in FIG. 1B.

Figure 7:
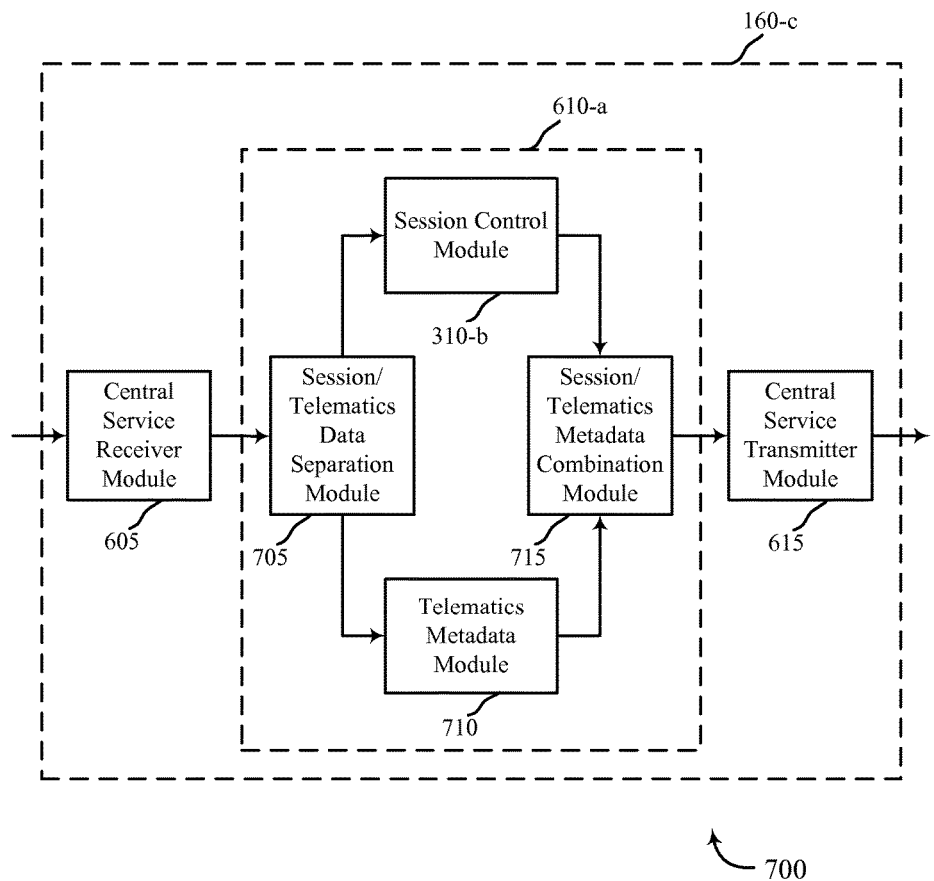
FIG. 7 is a block diagram illustrating a further embodiment of the central station.

FIG. 7 is a block diagram 700 illustrating one embodiment to of a central service 160-*c* in accordance with the present systems and methods. The central service 160-*c* may be an example of the central service 160 illustrated in FIGS. 1A, 1B, and/or 6. The central service 160-*c* may include a central service receiver module 605, a telematics metadata signaling module 610-*a*, and a central service transmitter module 615, as previously described. Each of these components may be in communication with each other.

These components of the central service 160-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the telematics metadata signaling module 610-*a* may include a telematics metadata module 710. The telematics metadata module 710 may generate and/or obtain telematics metadata. The telematics metadata module 710 may also receive telematics data. In certain examples, the telematics metadata module 710 may generate telematics metadata based on received telematics data.

The telematics metadata signaling module 610-a may also include a session control module 310-b. The session control module 310-b may be an example of the session control module 310 illustrated in FIGS. 3 and/or 4. In one example, the session control module 310-b may obtain a signaling message that includes a set (e.g., first set) of signal information. The session control module 310-b may also generate a signaling message that includes a set (e.g., second set) of signal information.

In one embodiment, the telematics metadata signaling module 610-a may include a session/telematics data separation module 705. As noted previously, a signaling message may be adapted to include telematics data and/or telematics metadata along with the session information. For example, a signaling message may be adapted to include a first set of session information and a first set of telematics data. The session/telematics data separation module 705 may extract any telematics data from an adapted signaling message. The session/telematics data separation module 705 may provide the session information (in the form of a signaling message, for example) to the session control module 310-b and may provide the telematics data to the telematics metadata module 710.

The telematics metadata signaling module 610-a may also include a session/telematics metadata combination module 715. The session/telematics metadata combination module 715 may adapt a signaling message generated by the session control module 310-b to include telematics metadata from the telematics metadata module 710. In one example, the adapted signaling message may include a second set of session information and a first set of telematics metadata. The adapted signaling message may be transmitted via the central service transmitter module 615.

Figure 8:
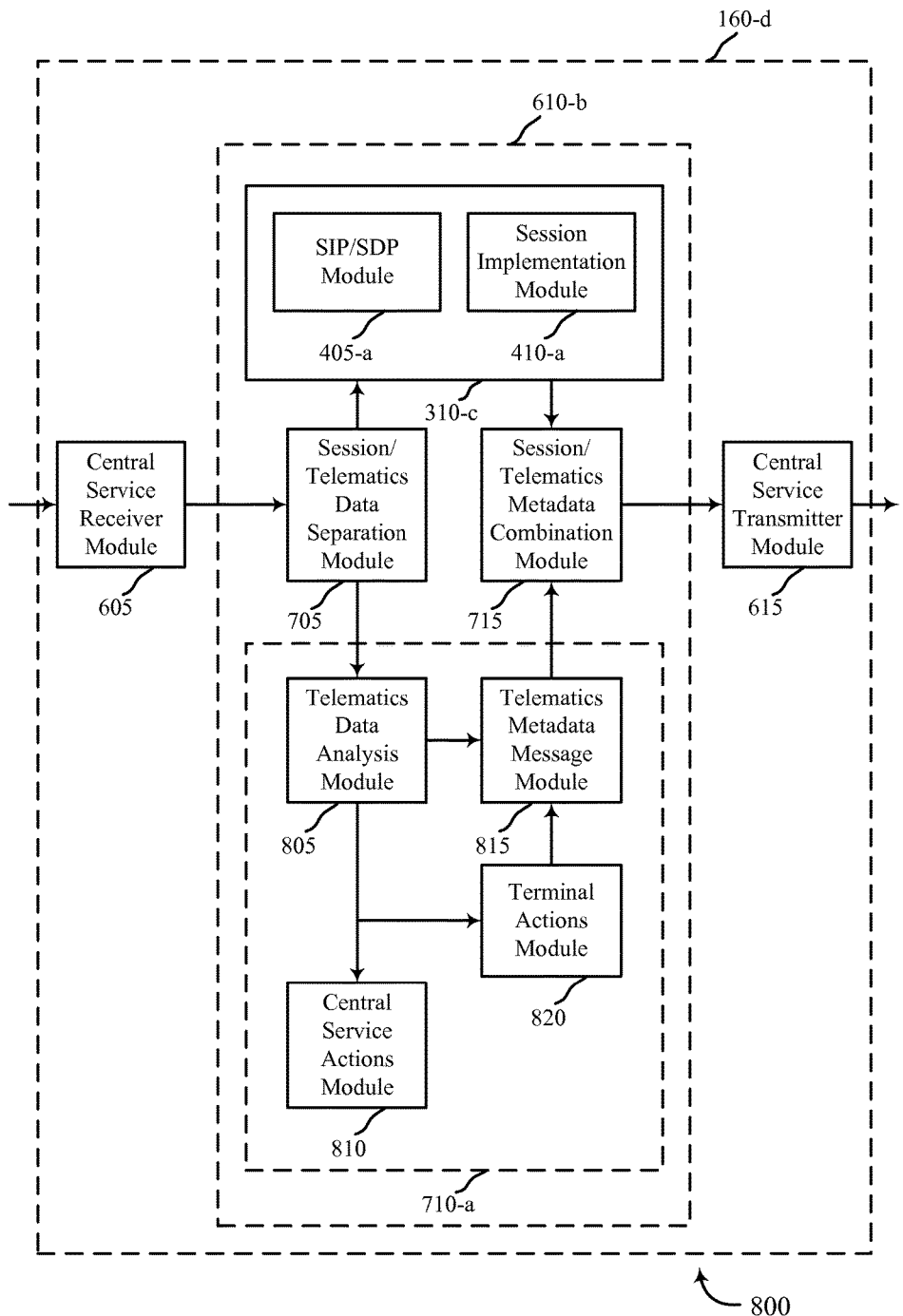
FIG. 8 is a block diagram illustrating a further example of the central station for implementing the functionality of the present systems and methods.

FIG. 8 is a block diagram 800 illustrating one embodiment of a central service 160-d in accordance with the present systems and methods. The central service 160-d may be an example of the central service 160 illustrated in FIGS. 1A, 1B, 6, and/or 7. In one configuration, the central service 160-d may include a central service receiver module 605, a telematics metadata signaling module 610-b, and a central service transmitter module 615. Each of these components may be in communication with each other.

These components of the central service 160-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the central service 160-d may be configured at least to receive telematics data from a terminal through an adapted use of a communication session signaling protocol, establish a communication session with the terminal, generate telematics metadata based on the content of the received telematics data, and transmit the telematics metadata to the terminal through the adapted use of the communication session signaling protocol. In certain examples, the central service 160-d may also direct the terminal via the telematics metadata to take certain action based on the received telematics data.

The telematics metadata signaling module 610-b may include a session control module 310-c. The session control module 310-c may be an example of the session control module 310 illustrated in FIGS. 3, 4, and/or 7. The session control module 310-c may include an SIP/SDP module 405-a and a session implementation module 410-a. The SIP/SDP module 405-a may be configured to negotiate, set up, manage, and terminate communication sessions with the terminal. The SIP/SDP module 405-a may generate SIP signaling message header content and SDP content to communicate session-related signaling data with the terminal. The session implementation module 410-a may be configured to receive media content (e.g., audio data for a voice call, audio and video data for a video call, text data for a text call), transmit the media content as a stream of packets to the terminal according to the negotiated session, and receive a stream of packets containing media content from the terminal according to the negotiated session.

The telematics metadata signaling module 610-b may also include a telematics metadata module 710-a. The telematics metadata module 710-a may include a telematics data analysis module 805, a central service actions module 810, a terminal actions module 820, and a telematics metadata message module 815.

The telematics data analysis module 805 may receive telematics data from the terminal and apply a set of one or more rules to identify the nature of the telematics data and determine appropriate actions to take in response to the telematics data. For example, where the terminal is associated with a vehicle, the telematics data analysis module 805 may analyze telematics data related to a vehicle type and vehicle identification number (VIN), one or more timestamps, a position estimate and associated degree of confidence, a direction of travel, a number of passengers (e.g., with fastened seatbelts), a service provider for the terminal (if any), a trigger type (e.g., deployed airbags, bumper sensors, manual trigger, fire indicators, rollover, or other situation detection, etc.), and/or other relevant information that may suit a particular application of the principles described herein. In one configuration, the telematics data analysis module 805 may provide analyzed telematics data and/or instructions to the central service actions module 810 and/or the terminal actions module 820.

The central service actions module 810 may take identified actions at the central service 160-d based on the analyzed telematics data, and the terminal actions module 820 may generate instructions for the terminal to take certain actions based on the telematics data. The telematics metadata message module 815 may generate a set of telematics metadata for transmission to the terminal based on the received telematics data. The telematics metadata message module 815 may additionally generate a set of telematics metadata for transmission to the terminal in response to a detected attempt by the terminal to transmit telematics data to the central service 160-d. Additionally, the telematics metadata message module 815 may format telematics metadata for transmission to the terminal according to a protocol understood by the terminal. As described above, the telematics metadata may include information such as an acknowledgement or negative acknowledgment of whether the telematics data was received at the central service 160-d, a request to retransmit the telematics data (e.g., the previous version and/or a current version), a request to transmit different telematics data, a request to take some other action, auxiliary data describing actions taken by the central service, and/or other relevant telematics metadata.

Returning to the example in which a terminal is associated with a vehicle and initiates an emergency call to the central service 160-*d* in response to a detected collision, crash, rollover, or other situation, the telematics data analysis module 805 may receive telematics data from the terminal indicating the type and severity of collision, the central service actions module 810 may provide (e.g., forward) information about the collision to emergency services (or other suitable destination), and the terminal actions module 820 may generate an instruction to the terminal to turn off the fuel supply of the vehicle and play a recorded message or display a text message (e.g., from central service 160-*d* or stored by the terminal) indicating that help is on its way, render media (e.g., rendering text to speech), etc. The telematics metadata message module 815 may then generate a set of telematics metadata for transmission to the terminal, where the telematics metadata acknowledges receipt of the telematics metadata, provides the instructions generated by the terminal actions module 820, and/or provides other relevant information to the terminal (e.g., an estimated time before an operator is available to take a voice and/or other media call, an estimated time before emergency services arrive, etc.).

In one embodiment, the telematics metadata signaling module 610-*b* may include a session/telematics data separation module 705. The session/telematics data separation module 705 may receive (via the central service receiver module 605, for example) a modified SIP or other communication session signaling protocol message and may separate the SIP/SDP (or other protocol) information from telematics data messages. In certain embodiments, the session/telematics data separation module 705 may provide the SIP/SDP information to the SIP/SDP module 405-*a* and the one or more telematics data messages to the telematics data analysis module 805 as described above. In one example, the session/telematics data separation module 705 may identify different portions of a modified SIP message based on information from the header of the modified SIP message. In this example, the session/telematics data separation module 705 may provide the portions identified as SIP/SDP (or other protocol) information to the SIP/SDP module 405-*a* and the portions identified as telematics data messages to the telematics data analysis module 805 as described above.

The telematics metadata signaling module 610-*b* may also include a session/telematics metadata combination module 715. The session/telematics metadata combination module 715 may combine SIP/SDP (or other protocol) information from the SIP/SDP module 405-*a* and one or more telematics metadata messages from the telematics metadata module 710-*a* into a modified SIP or other communication session signaling protocol message as described above. The central service transmitter module 615 may transmit the generated signaling messages to the terminal.

FIG. 9A, FIG. 9B, FIG. 9C, FIG. 9D, FIG. 9E, and FIG. 9F illustrate an example of a session initiation protocol (SIP) response message modified to carry both session data and telematics metadata. The SIP response message of FIGS. 9A-9F may be transmitted to a terminal 110 from a central service 160 in response to receiving a SIP request message according to the description of FIGS. 5A-5C.

Figure 9A:
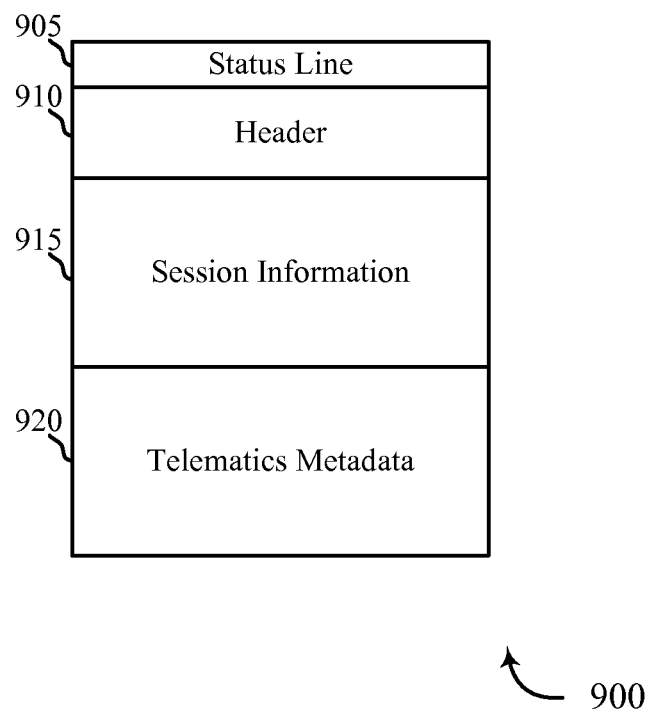
FIG. 9A shows a block diagram of an exemplary format for a response message according to a communication session signaling protocol.

By repurposing the SIP protocol to carry both session data and telematics metadata, the telematics metadata may be efficiently transmitted to a terminal without interrupting or degrading the quality of a related call. FIG. 9A shows a diagram of an example format 900 of the response message. FIG. 9B, FIG. 9C, FIG. 9D, FIG. 9E, and FIG. 9F show diagrams of example SIP response messages 950a-e based on the format of FIG. 9A. While the examples of FIG. 9A, FIG. 9B, FIG. 9C, FIG. 9D, FIG. 9E, and FIG. 9F are described in the context of modified and repurposed SIP response messages, it will be understood that the principles of the present description may be used to modify or extend other communication session signaling protocols (e.g., XMPP, Google Talk, MSN, etc.) or as a basis for new communication session signaling protocols.

The modified SIP response message format 900 may be used to generate signaling messages in response to SIP request messages. As shown in FIG. 9A, the modified SIP response message format 900 may include a status line 905, a header 910, a set of session data 915, and a set of telematics metadata 920. The SIP protocol defines a number of response messages, provisional responses, successful responses, redirection responses, and client failure responses. The present format 900 may be used for each of these message types and for other types of response messages.

In the example of FIG. 9B, a modified SIP 200 (OK) message 950-*a* based on the format of FIG. 9A may be used, for example, by a central service in response to receiving the modified SIP INVITE message 550 of FIG. 5B and/or FIG. 5C to indicate that the central service accepts the proposed VoIP session. The SIP 200 (OK) message 950-*a* may further provide metadata to the terminal acknowledging receipt of the telematics data transmitted in the SIP INVITE message 550. The SIP 200 (OK) message 950-*a* may also provide additional information (that emergency services have been notified and voice confirmation is pending, for example).

The status line 905-*a* of the example SIP 200 (OK) signaling message 950-*a* may identify the message 950-*a* as a SIP response and specify the type of response that is being made (e.g., OK). The header 910-*a* of the response message may provide the identity of the terminal and the central service, the call identifier, contact information for the terminal and the central service, the call sequence number, an indication of the type(s) of data in the body, and a length of the response message 950-*a* message. In the present example, the header 910-*a* may specify that the body contains mixed data with the character string "-----Next-Part-----" indicating the boundary between the different types of data in the body. In the present example, the body of the message includes both session data 915-*a* and telematics metadata 920-*a*.

The session data 915-*a* may include of list of agreed upon parameters for the proposed session between the terminal and the central service. These session parameters may be a set of Session Description Protocol (SDP) parameters for the VoIP audio call.

The telematics metadata 920-*a* may include information related to the telematics data received at the central service in the SIP INVITE signaling message 550. As described previously, the telematics metadata 920-*a* may include an acknowledgement of whether the telematics data was received at the central service, a request to retransmit the telematics data, a request to transmit different telematics data, a request to take some other action, auxiliary data describing actions taken by the central service, and/or other relevant telematics metadata. Returning to the example of an emergency call made from a terminal associated with a vehicle to a PSAP service, the telematics metadata 920-*a* shown in FIG. 9B may include an acknowledgment that the telematics data was received and a status code indicating that emergency services have been notified and that a voice call is pending.

FIG. 9C shows an example modified SIP response message 950-*b* similar to the modified SIP response message 950-*a* of FIG. 9B. In the example of FIG. 9C, however, the telematics metadata 920-*b* may further include an instruction to the terminal to take certain actions with respect to any vehicle associated with the terminal. Thus, the telematics metadata 920-*b* of FIG. 9C may include an instruction to turn off an ignition of the vehicle, turn off a fuel pump of the vehicle, unlock the doors of the vehicle, and play a specified recording of instructions to the occupants of the vehicle. In some configurations, the instructions to the terminal may come from a human. For example, a human that is taking the call may cause commands to be sent to the terminal, which may include requests for updated or additional telematics data, one or more messages to be communicated to the vehicle (such as by displaying text, rendering text to speech, playing a recording, playing media) including pre-defined or fully dynamic messages (e.g., typed by a human on the spot), locking/unlocking doors, triggering lights/horn, etc.

FIG. 9D shows the status line 905-*c* and header 910-*c* of an example modified SIP response message 950-*c* similar to the modified SIP response message 950-*a* of FIG. 9B. In the example of FIG. 9C, however, the header 910-*c* further includes a P-header for eCallMetaData 925. In this example, the P-header for eCallMetaData 925 may include an acknowledgement 930 that acknowledges receipt of data with the specified ID, a command 935 to play a static message, a command 940 to get noticed (e.g., flash lights, honk horn, make noise, etc.), and a command 945 to send eCall data AltSet1. In one example, the static message may be stored on the terminal and/or a known location.

FIG. 9E shows an example modified SIP response message 950-*d* similar to the modified SIP response message 950-*a* of FIG. 9B. In the present example, the header 910-*d* may include a P-header for eCallMetaData 925-*a* similar to the P-header for eCallMetaData 925 of FIG. 9D. In the example of FIG. 9E, however, the P-header for eCallMetaData 925-*a* may include a command 955 to play a dynamic message and a reference 960 that indicates the content ID (i.e., 5432154321@example.gov) of the dynamic message that should be played. In this example, the dynamic media may be included in the body (e.g., the telematics metadata 920-*d*) of the response message 950-*d*. As indicated previously, the dynamic media object 965 may have and may be referenced by a specific content ID.

FIG. 9F shows an example modified SIP response message 950-*e* similar to the modified SIP response message 950-*a* of FIG. 9B. In the example of FIG. 9F, however, the telematics metadata (e.g., eCall metadata) may be included in the body (e.g., telematics metadata 920-*e*). The present example additionally illustrates that both static messages and dynamic messages may be included in a telematics metadata object (e.g., eCallMetaData object). In this example, the header 910-*e* may include a tag 970 that references an telematics metadata object 975 in the body (e.g., telematics metadata 920). For example, the tag 970 may reference the telematics metadata object 975 by referencing the content ID (i.e., 9876543210@example.gov) of the telematics metadata object 975. In this example, the telematics metadata 920-*b* may include the telematics metadata object 975. In the present example, the telematics metadata object 975 may include an acknowledgement 930-*a* that acknowledges receipt of data with the specified ID, a command 935-*a* to play a static message, a command 955-*a* to play a dynamic message, a dynamic media object 965-*a*, a command 940-*a* to get noticed (e.g., flash lights, honk horn, make noise, etc.), and a command 945-*a* to send eCall data AltSet1. In one configuration, the telematics metadata object 975 may be formed using a markup language (e.g., Extensible Markup Language (XML)). It is noted that the telematics metadata object 975 may be formed using many other encoding or structuring mechanisms such as ASN.1, JSON, MIME, etc.

While the examples of FIGS. 5A, 5B, 5C, 9A, 9B, 9C, 9D, 9E, and 9F illustrate the example of a modified SIP request message carrying telematics data and a modified SIP response message carrying telematics metadata, it will be recognized by those skilled in the art that either type of message may carry telematics data or telematics metadata. For example, in certain examples, a terminal may transmit telematics data to a central service in a message responding to a request from the central service. Similarly, in certain examples the central service may transmit telematics metadata to the terminal in a request message to the terminal. In additional or alternative examples, a request message or a response message may include both telematics data and telematics metadata.

Figure 10:
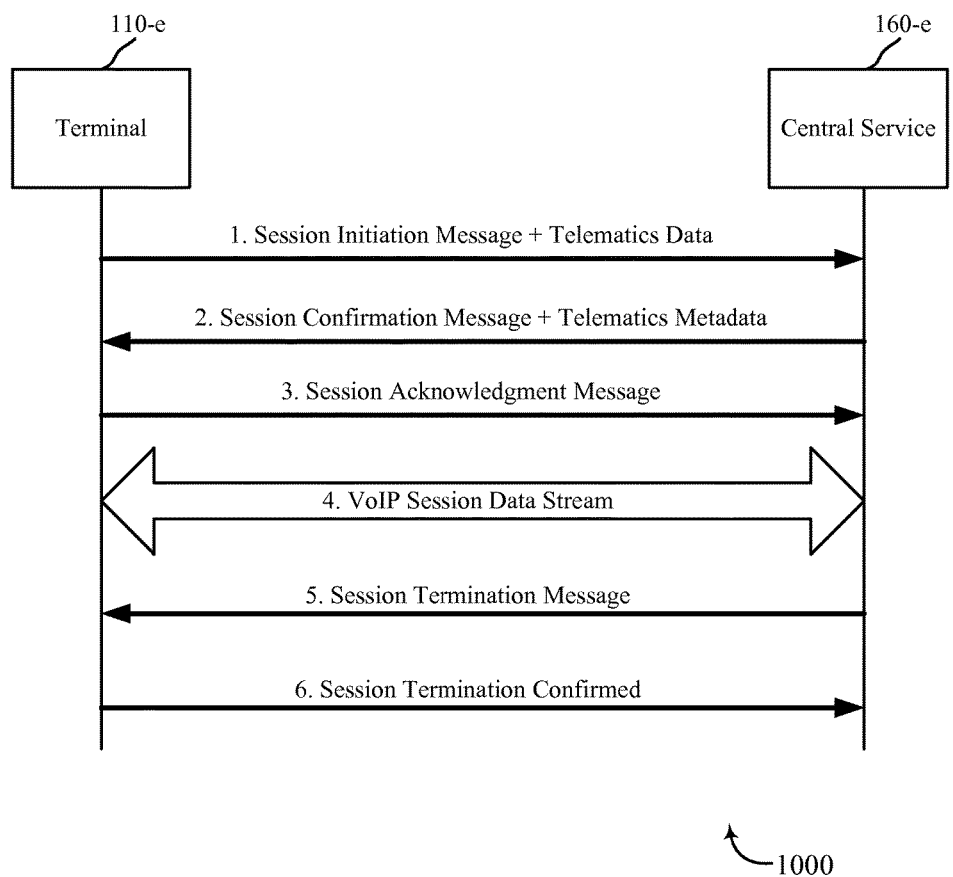
FIG. 10 shows a diagram of an exemplary communications exchange between a terminal and a server.

FIG. 10 is a diagram of one example of a communications exchange between a terminal 110-*e* and a central service 160-*e* for the exchange of telematics data and telematics metadata using a communication session signaling protocol. Terminal 110-*e* may be an example of the terminal 110 of FIGS. 1A, 1B, 2, 3, and/or 4, and central service 160-*e* may be an example of the central service 160 (e.g., PSAP) of FIGS. 1A, 1B, 6, 7, and/or 8, or another central service. In certain examples, central service 160-*e* may be implemented by one or more servers.

The communication session signaling protocol may be an application layer protocol designed to be independent of the underlying transport layer. As such, in certain examples the communication session signaling protocol may be compatible with a number of different transport layer protocols. In certain examples, one or more proxy servers may be disposed intermediate terminal 110-*e* and central service 160-*e* such that initial signaling messages between terminal 110-*e* and central service 160-*e* may be forwarded between one or more of the proxy servers. For the sake of clarity, such proxy servers are not shown in the Figures associated with the present description. It is noted that there may be other (e.g., additional) entities that receive, forward, regenerate, alter, or are otherwise involved in the message exchange (for example, in the case of SIP messaging, back to back user agents, session border controllers, etc.). In FIG. 10 the communication session signaling protocol may be SIP, XMPP, Google Talk, Skype etc. and the underlying transport protocols may be User Datagram Protocol (UDP) over IP or Transmission Control Protocol (TCP) over IP or some other set of transport protocols.

The terminal 110-*e* may communicate with the central service over the communication session signaling protocol to set up and manage a communication session. In the present example, terminal 110-*e* and central service 160-*e* may communicate to establish a VoIP session for a call (carrying voice and/or other media) between a user associated with terminal 110-*e* and an operator associated with central service 160-*e*. As shown in FIG. 10, terminal 110-*e* may transmit a session initiation signaling message to central service 160-*e*. The session initiation signaling message may invite central service 160-*e* to participate in a VoIP session with terminal 110-*e*. Terminal 110-*e* may transmit the session initiation message in response to a manual request from a user associated with terminal 110-*e*. For example, an occupant of a vehicle associated with terminal 110-*e* may press an emergency call button in the vehicle that signals terminal 110-*e* to invite central service 160-*e* to the VoIP session. Additionally or alternatively, terminal 110-*e* may transmit the session initiation message to central service 160-*e* in response to one or more detected or inferred conditions or events (e.g., airbags deployed, collision sensor, engine diagnostic data, engine fire, vehicle fire, rollover, or other situation, etc.).

The session initiation message may include details and parameters for the proposed session (e.g., network addresses, port numbers, type of media, timing, streaming protocols supported, bandwidth, etc.). In addition to this set of session data for the proposed session between terminal 110-*e* and central serviced 160-*e*, terminal device 110-*e* may append (e.g., add) telematics data to the session initiation message transmitted to central service 160-*e*. The telematics data may include readings from one or more sensors in communication with terminal 110-*e* and/or other data stored, determined, calculated, and/or received by terminal 110-*e*. In certain examples, the telematics data may include data typically transmitted to a PSAP during an eCall or other emergency call. For example, the telematics data may include at least one or more of: how the eCall was initiated, a vehicle type and vehicle identification number (VIN), a timestamp, a position estimate and position confidence flag, the direction of travel, the number of passengers (e.g., from seat occupancy sensors) and associated data (e.g., seats with fastened seatbelts), a service provider for the terminal (if any), a trigger type (e.g., deployed airbags, bumper sensors, fire indicators, rollover, or other situation detection, etc.), and/or other relevant information that may suit a particular application of the principles described herein.

Upon receiving the session initiation message with the appended telematics data, central service 160-*e* may determine whether to accept or reject the proposed session. In the present example, central service 160-*e* may transmit a session confirmation message over the communication session signaling protocol indicating that the proposed session is accepted in addition to providing further parameters and data for the session. Additionally, the session confirmation message transmitted to terminal 110-*e* may include a set of telematics metadata associated with the set of telematics data received by central service 160-*e* in the session initiation message. In alternative examples, the central service 160-*e* may transmit the telematics metadata to the central service 160-*e* in a separate message (e.g., in a communication session signaling protocol message specifically used to transmit the telematics metadata, appended to a different type of communication session signaling protocol message, etc.). The telematics metadata may, for example, contain an acknowledgement of whether the telematics data was received at the central service 160-*e*, a request to retransmit the telematics data (e.g., the previous version and/or a current version) to the central service 160-*e*, a request to transmit different telematics data to the central service 160-*e*, a request to take some other action, auxiliary data describing actions taken by the central service 160-*e*, and/or other relevant telematics metadata.

Terminal 110-*e* may receive the telematics metadata and take appropriate action based on the content of the received telematics metadata. In certain examples, the telematics metadata may simply confirm receipt of the telematics data, and terminal 110-*e* may take no action in response to the telematics metadata. In other examples, terminal 110-*e* may respond to a request in the telematics metadata from central service 160-*e* or consult a set of rules to identify an action to take based on the received telematics metadata.

Additionally, terminal 110-*e* may establish a VoIP session with central service 160-*e* based on the session data and parameters in both the session initiation message and the session confirmation message. Terminal 110-*e* and central service 160-*e* may exchange streams of packets containing voice and/or other media data using Real-time Transport Protocol (RTP) or another streaming protocol to implement a call (carrying voice and/or other media) between the user of terminal 110-*e* and the operator of central service 160-*e*. The VoIP session may carry any media including text, both message-at-a-time text (such as instant messaging) and character-at-a-time (streaming text, often called real-time text), and/or video. It is noted that while most media is streamed, the VoIP session may also carry non-streamed media either in addition to or instead of streamed media.

To conclude the VoIP session, central service 160-*e* may transmit a session termination signaling message to terminal 110-*e* over the communication session signaling protocol. Upon receiving the session termination signaling message, terminal 110-*e* may transmit a session termination confirmation signaling message to central service 160-*e*, and the session may terminate.

Figure 11:
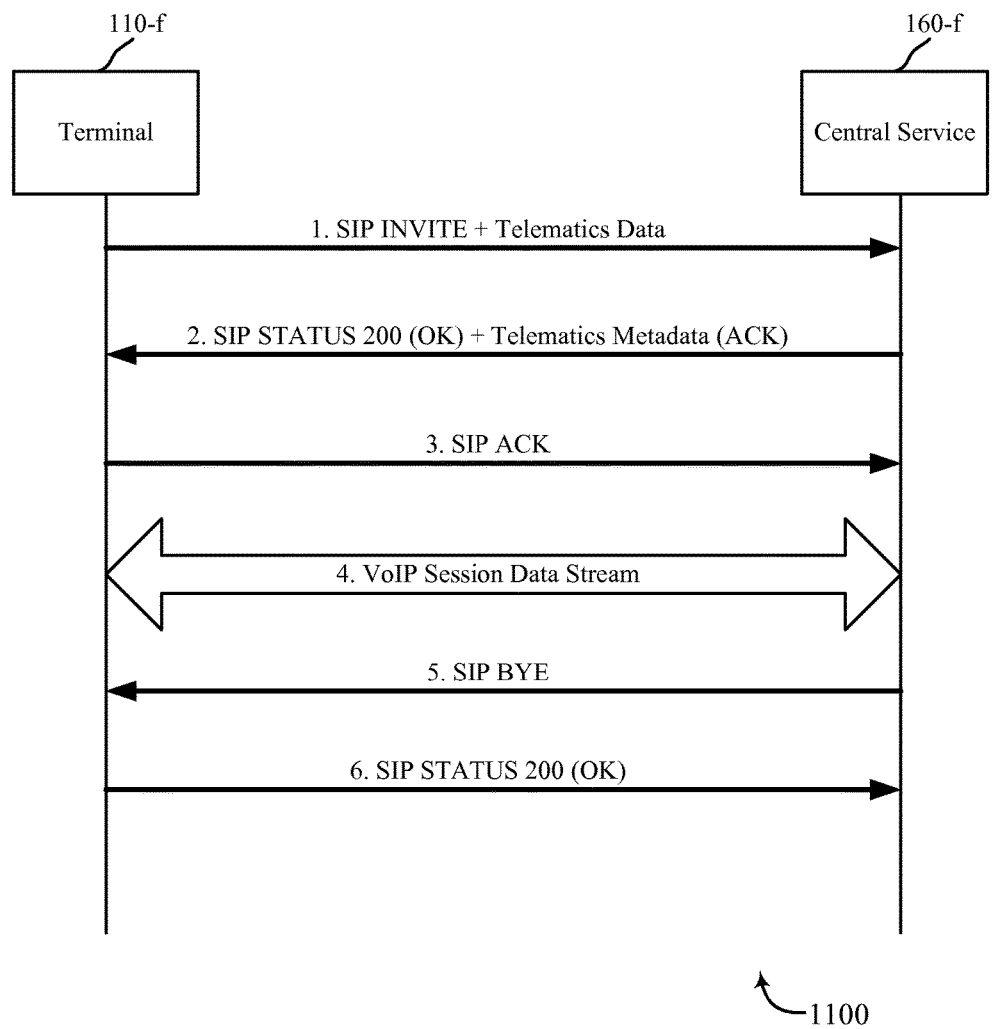
FIG. 11 shows a diagram of an exemplary communications exchange between a terminal and a server.

FIG. 11 is a diagram of an example of a communications exchange 1100 between a terminal 110-*f* and a central service 160-*f* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples (not shown in FIG. 11), other communication session signaling protocols may be used.

Terminal 110-*f* may be an example of the terminal 110 of FIG. 1A or one of the other terminals 110 described above with reference to previous Figures. Central service 160-*f* may be an example of the central service (e.g., PSAP) 160 of FIG. 1A or one of the other central services 160 described above with reference to previous Figures. In certain examples, central service 160-*f* may be implemented by one or more servers. Additionally, in certain examples, one or more proxy servers may be disposed between terminal 110-*f* and central service 160-*f* to forward the communication session signaling protocol messages between terminal 110-*f* and central service 160-*f*.

At a first stage, terminal 110-*b* may transmit a SIP INVITE message to central service 160-*f*. In certain examples, the SIP INVITE message may be an example of the modified SIP request message described above with reference to FIGS. 5A, 5B, and 5C. The SIP INVITE message may simultaneously invite central service 160-*f* to a proposed VoIP session having a proposed set of parameters and convey a set of telematics data from terminal 110-*f* to central service 160-*f*. In certain examples, terminal 110-*f* may be associated with a vehicle and may transmit the SIP INVITE message to central service 160-*f* in response to a detected condition at the vehicle or a manual request for an emergency call by an occupant of the vehicle.

At a second stage, central service 160-*f* may respond to the SIP INVITE message by transmitting a SIP STATUS 200 (OK) message to terminal 110-*f*. The SIP STATUS 200 (OK) message may simultaneously agree to the proposed VoIP session and convey telematics metadata to terminal 110-*f* acknowledging receipt of the telematics data by central service 160-*f*. At a third stage, upon receiving the SIP STATUS 200 (OK) message including the telematics metadata from central service 160-*f*, terminal 110-*f* may transmit a SIP ACK message to central service 160-*f*. At a fourth stage, the VoIP session may be implemented by streaming packets of session data carrying voice and/or other media communications between terminal 110-*f* and central service 160-*f* according to parameters agreed to in the SIP INVITE, SIP STATUS 200 (OK), and SIP ACK messages. At a fifth stage, the VoIP session may be terminated by central service 160-*f* transmitting a SIP BYE message to terminal 110-*f*. Terminal 110-*f* may confirm the termination of the session at a sixth stage by transmitting a SIP STATUS 200 (OK) response message to central service 160-*f*. In other examples, terminal 110-*f* may initiate termination of the VoIP session, and central service 160-*f* may transmit the SIP STATUS 200 (OK) response message to terminal 110-*f*.

Figure 12:
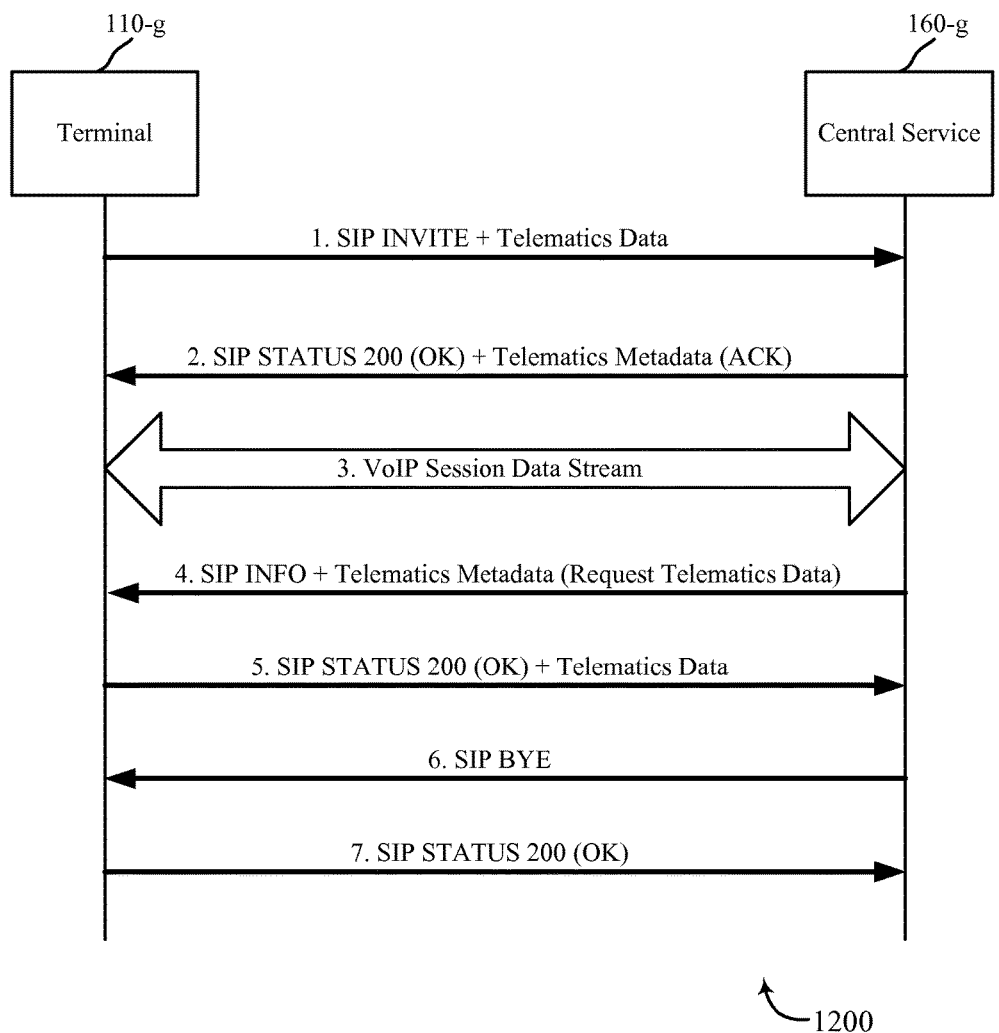
FIG. 12 shows a diagram of an exemplary communications exchange between a terminal and a server.

FIG. 12 is a diagram of an example of a communications exchange 1200 between a terminal 110-*g* and a central service 160-*g* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples, other communication session signaling protocols may be used.

Terminal 110-*g* may be an example of the terminal 110 of FIG. 1A or one of the other terminals 110 described above with reference to previous Figures. Central service 160-*g* may be an example of the central service 160 of FIG. 1A or one of the other central services 160 described above with reference to previous Figures. In certain examples, central service 160-*g* may be implemented by one or more servers. Additionally, in certain examples, one or more proxy servers may be disposed between terminal 110-*g* and central service 160-*g* to forward the communication session signaling protocol messages between terminal 110-*g* and central service 160-*g*.

At a first stage, terminal 110-*g* may transmit a SIP INVITE message to central service 160-*g*. In certain examples, the SIP INVITE message may be an example of the modified SIP request message described above with reference to FIGS. 5A, 5B, and 5C. The SIP INVITE message may simultaneously invite central service 160-*g* to a proposed VoIP session having a proposed set of parameters and convey a set of telematics data from terminal 110-*g* to central service 160-*g*. In certain examples, terminal 110-*g* may be associated with a vehicle and may transmit the SIP INVITE message to central service 160-*g* in response to a detected condition at the vehicle or a manual request for an emergency call by an occupant of the vehicle.

At a second stage, central service 160-*g* may respond to the SIP INVITE message by transmitting a SIP STATUS 200 (OK) message to terminal 110-*g*. The SIP STATUS 200 (OK) message may simultaneously agree to the proposed VoIP session and convey telematics metadata to terminal 110-*g* acknowledging receipt of the telematics data by central service 160-*g*. At a third stage, the VoIP session may be implemented by streaming packets of session data carrying voice and/or other media communications between terminal 110-*g* and central service 160-*g* according to parameters agreed to in the SIP INVITE and SIP STATUS 200 (OK) messages.

At a fourth stage, central service 160-*g* may transmit a SIP INFO message to terminal 110-*g* with additional telematics metadata. In one example, the additional telematics metadata may request additional telematics data beyond what was included in the initial SIP INVITE message. In another example, the additional telematics metadata may addition-ally include instructions for the terminal 110-*g* and/or vehicle to carry out. At a fifth stage, terminal 110-*g* may transmit a SIP STATUS 200 (OK) message to central service 160-*g* with the requested additional telematics data.

At a sixth stage, the VoIP session may be terminated by central service 160-*g* transmitting a SIP BYE message to terminal 110-*g*. Terminal 110-*g* may confirm the termination of the session at a seventh stage by transmitting a SIP STATUS 200 (OK) response message to central service 160-*g*. In other examples, terminal 110-*g* may initiate termination of the VoIP session, and central service 160-*g* may transmit the SIP STATUS 200 (OK) response message to terminal 110-*g*.

Figure 13:
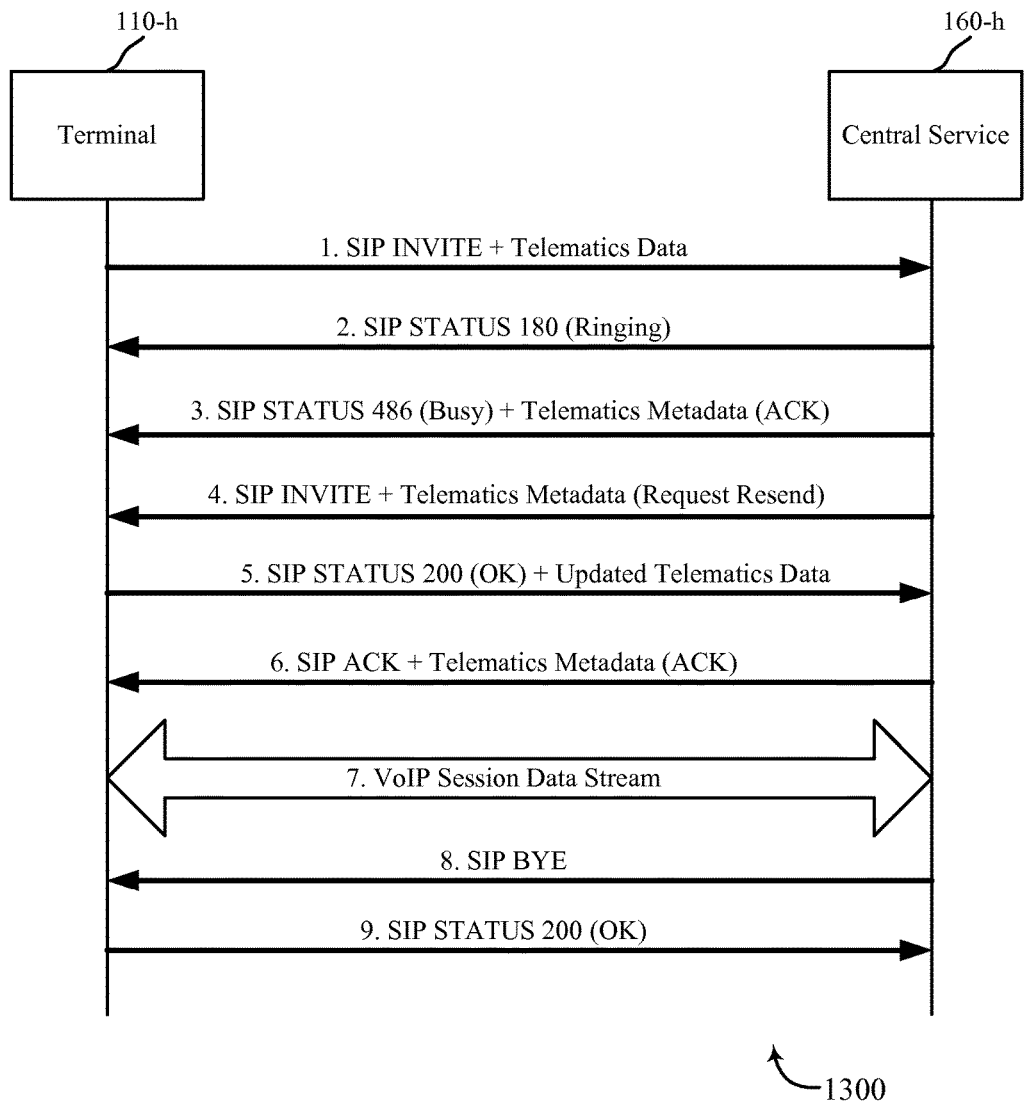
FIG. 13 shows a diagram of an exemplary communications exchange between a terminal and a server.

FIG. 13 is a diagram of another example of a communications exchange 1300 between a terminal 110-*h* and a central service 160-*h* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples, other communication session signaling protocols may be used.

Terminal 110-*h* may be an example of the terminal 110 of FIG. 1A or one of the other terminals 110 described above with reference to previous Figures. Central service 160-*h* may be an example of the central service 160 of FIG. 1A or one of the other central services 160 described above with reference to previous Figures. In certain examples, central service 160-*h* may be implemented by one or more servers. Additionally, in certain examples, one or more proxy servers may be disposed between terminal 110-*h* and central service 160-*h* to forward the communication session signaling protocol messages between terminal 110-*h* and central service 160-*h*.

At a first stage, terminal 110-*h* may transmit a SIP INVITE message to central service 160-*h*. The SIP INVITE message may be an example of a modified SIP request message described above with reference to previous Figures. The SIP INVITE message may simultaneously invite central service 160-*h* to a VoIP session with a proposed set of parameters and convey a set of telematics data from terminal 110-*h* to central service 160-*h*.

At a second stage, central service 160-*h* may respond to the SIP INVITE message by transmitting a SIP STATUS 180 (Ringing) response message to terminal 110-*h*. In certain examples, the SIP STATUS 180 (Ringing) response message may indicate that central service 160-*h* is attempting to page a human operator to answer the VoIP call. If central service 160-*h* is unable to reach a human operator to answer the call, central service 160-*h* may transmit a SIP STATUS 486 (Busy) response message to terminal 110-*h* at a third stage. In alternative examples, the central service 160-*h* may accept the call with a SIP STATUS 200 (OK) response message but place the call in a queue while waiting for a human operator to become available. The SIP STATUS 486 (Busy) or, alternatively, the SIP STATUS 200 (OK) response message may contain telematics metadata related to the telematics data transmitted to central service 160-*h* from terminal 110-*h*.

The telematics metadata may acknowledge to terminal 110-*h* that the telematics data was received by central service 160-*h*. Accordingly, terminal 110-*h* may in certain examples indicate to a user of terminal 110-*h* that the telematics data has been successfully received (received in a satisfactory state, for example) at central service 160-*h*. Thus, even though no operator associated with central service 160-*h* may be available to take a voice and/or other media call, the user may be assured that the telematics data has been received at central service 160-*h*. In certain other embodiments, where there may be no user in control of terminal 110-*h* (e.g. where a call was invoked by terminal 110-*h* in response to sensor data), the telematics metadata acknowledgment may confirm to terminal 110-*h* that the telematics data was received and there is thus no need for terminal 110-*h* to attempt an automatic repeat attempt. This may reduce load on central service 160-*h* when many such terminals 110-*h* are attempting to place emergency calls and send telematics data at the same time—e.g. in response to a very severe incident (e.g. multi-vehicle pileup on a highway) or a disaster situation such as an earthquake, hurricane, tsunami, or wildfire.

In one example, the central service 160-*h* may determine if the telematics data has been received in a satisfactory state (e.g., satisfactorily received). Examples of satisfactory states may be a complete reception of a transmitted set of data (as a result of an error-free transmission, for example). In some cases, a less than complete set of data may qualify as a satisfactory state, while in other cases, a less than complete set of data may not qualify as a satisfactory state. In some cases, the determination of a satisfactory state may be based on the situation in which the telematics data was transmitted in (as determined by the content of the received set of telematics data, for example). Additionally or alternatively, the determination of a satisfactory state may be based on factors such as whether values are consistent with each other or consistent with typical ranges, whether the location data has a high enough confidence, whether the telematics data are sufficiently current, etc. In some cases, the determination of a satisfactory state may be made by a human (e.g., an operator) at the central service 160-*h*. In other cases, the determination of a satisfactory state may be made automatically (by the central service, for example).

For example, returning to the example of a terminal 110-*h* associated with a vehicle emergency calling system, a vehicle occupant may experience a collision and provide a manual indication to terminal 110-*h* that an emergency voice and/or other media call to central service 160-*h* is desired. The telematics data transmitted to central service 160-*h* may include at least the latitude and longitude of the vehicle and an indication that a collision has occurred. If the central service 160-*h* is experiencing a high volume of calls and unable to provide a human operator to answer the call, the vehicle occupant may still receive assurance that her location and information about the collision was received at the central service 160-*h*. For instance, the terminal 110-*h* may receive a SIP STATUS 486 (Busy) message that includes telematics metadata (instructing the terminal 110-*h* to communicate to the user that the data was received at the central service 160-*h*, for example). In certain examples, the telematics metadata may also communicate other useful information to the user through terminal 110-*h*, including a message that emergency services have been dispatched (or are in the area of the user handling other incidents and will subsequently attend to the user) or an instruction to remain in the vehicle. In one example, the telematics metadata may additionally or alternatively provide instructions to the vehicle such as killing the ignition or locking the doors (for safety) or flashing the lights (to help emergency services locate the vehicle).

At a fourth stage, central service 160-*h* may determine that an operator is available to participate in a VoIP call with the user of terminal 110-*h*, and if the call is not already queued or on hold, central service 160-*h* may attempt to call terminal 110-*h* back by transmitting a SIP INVITE message to terminal 110-*h*, the SIP INVITE message proposing a new VoIP session. The SIP INVITE message may include an additional set of telematics metadata related to the received telematics data. In the present example, the additional set of telematics metadata may include a request that terminal 110-*h* retransmit the telematics data to allow central service 160-*h* to evaluate the most up-to-date version of the telematics data.

At a fifth stage, terminal 110-*h* may accept the invitation to the new VoIP session proposed by central service 160-*h* by transmitting a SIP STATUS 200 (OK) message to central service 160-*h*, where the SIP STATUS 200 (OK) message also contains the requested updated telematics data. At a sixth stage, central service 160-*h* may transmit a SIP ACK to terminal 110-*h* with a new set of telematics metadata acknowledging receipt of the updated telematics data. At a seventh stage, the VoIP call between terminal 110-*h* and central service 160-*h* may take place over one or more VoIP session data streams. At the conclusion of the call, central service 160-*h* may transmit a SIP BYE message to terminal 110-*h*, and terminal 110-*h* may acknowledge the end of the call by transmitting a SIP STATUS 200 (OK) message to central service 160-*h*.

In an alternative example, central service 160-*h* may not establish a call session with terminal 110-*h* after transmitting the SIP STATUS 486 (Busy) response message to terminal 110-*h* at stage 3. Nevertheless, terminal 110-*h* may rely on the telematics metadata received at stage 3 to determine that the telematics data was received by central service 160-*h* and that appropriate action is being taken.

Figure 14:
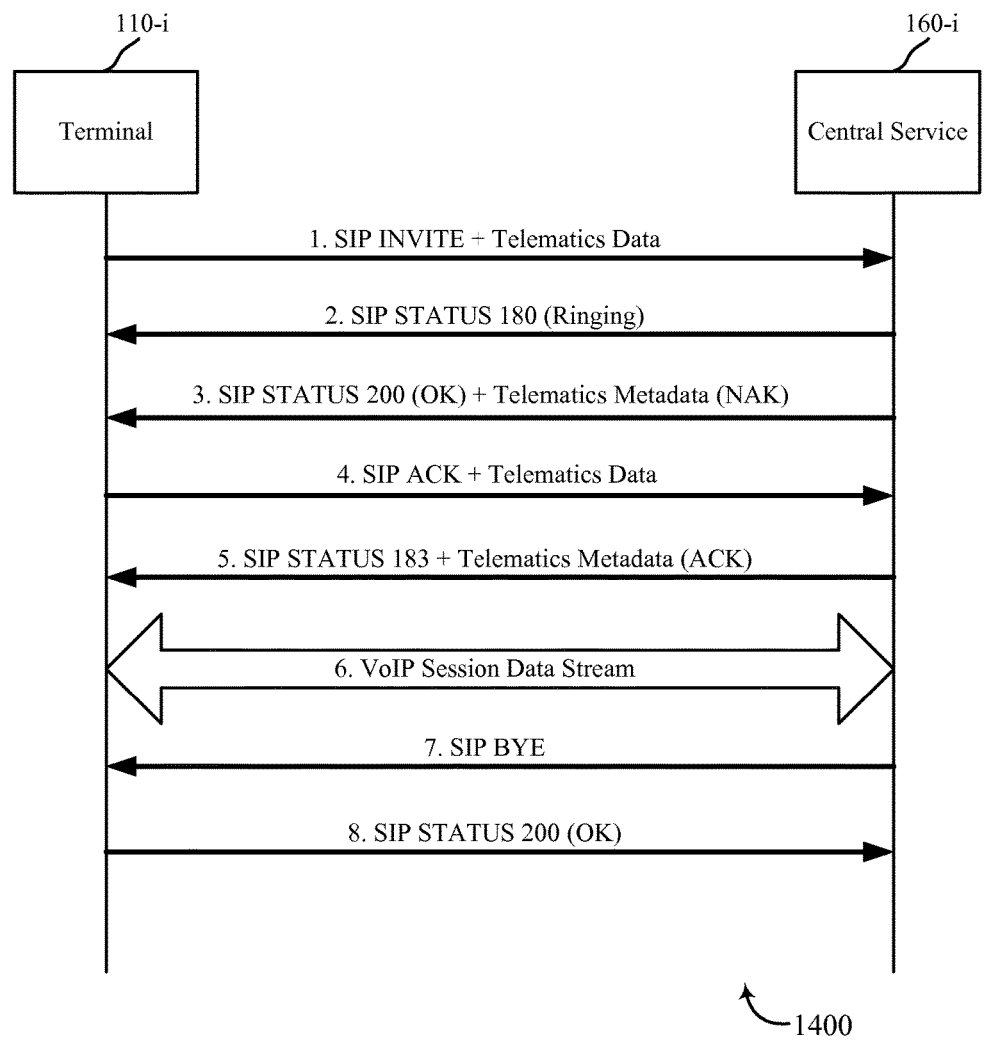
FIG. 14 shows a diagram of an exemplary communications exchange between a terminal and a server.

FIG. 14 is a diagram of another example of a communications exchange 1400 between a terminal 110-*i* and a central service 160-*i* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples, other communication session signaling protocols may be used.

Terminal 110-*i* may be an example of the terminal 110 of FIG. 1A or one of the other terminals 110 described above with reference to previous Figures. Central service 160-*i* may be an example of the central service 160 of FIG. 1A or one of the other central services 160 described above with reference to previous Figures. In certain examples, central service 160-*i* may be implemented by one or more servers. Additionally, in certain examples, one or more proxy servers may be disposed between terminal 110-*i* and central service 160-*i* to forward the communication session signaling protocol messages between terminal 110-*i* and central service 160-*i*.

At a first stage, terminal 110-*i* may transmit a SIP INVITE message to central service 160-*i*. The SIP INVITE message may simultaneously invite central service 160-*i* to a proposed VoIP session with a proposed set of parameters and convey a set of telematics data from terminal 110-*i* to central service 160-*i*. At a second stage, central service 160-*i* may transmit a SIP STATUS 180 (Ringing) response message to terminal 110-*i*. At a third stage, central service 160-*i* may transmit a SIP STATUS 200 (OK) message to terminal 110-*i* to indicate acceptance of the proposed VoIP session. The SIP STATUS (OK) message may also contain telematics metadata indicating that the telematics data transmitted by terminal 110-*i* was not received (e.g., not satisfactorily received) (i.e., a NAK response). In some cases, the telematics metadata may additionally include instructions for the terminal, messages, etc. Consequently, at a fourth stage, terminal 110-*i* may transmit a SIP ACK message confirming the VoIP session and retransmitting the telematics data. In certain examples, the retransmitted telematics data may be the same telematics data originally sent with the SIP INVITE message. Alternatively, the retransmitted telematics data may be updated or otherwise different from the original telematics data.

At a fifth stage, central service 160-*i* may transmit a SIP STATUS 183 (SESSION IN PROGRESS) method containing telematics metadata acknowledging that the retransmitted telematics data has been received at central service 160-*i*. At a sixth stage, the VoIP call may be implemented by the negotiated VoIP session through which streaming voice and/or other media data may be exchanged between terminal 110-*i* and central service 160-*i*. At a seventh stage and the conclusion of the VoIP call, central service 160-*i* may transmit a SIP BYE message to terminal 110-*i*. At an eighth stage, terminal 110-*i* may respond with a SIP STATUS 200 (OK) message to confirm that the VoIP session has ended.

Figure 15:
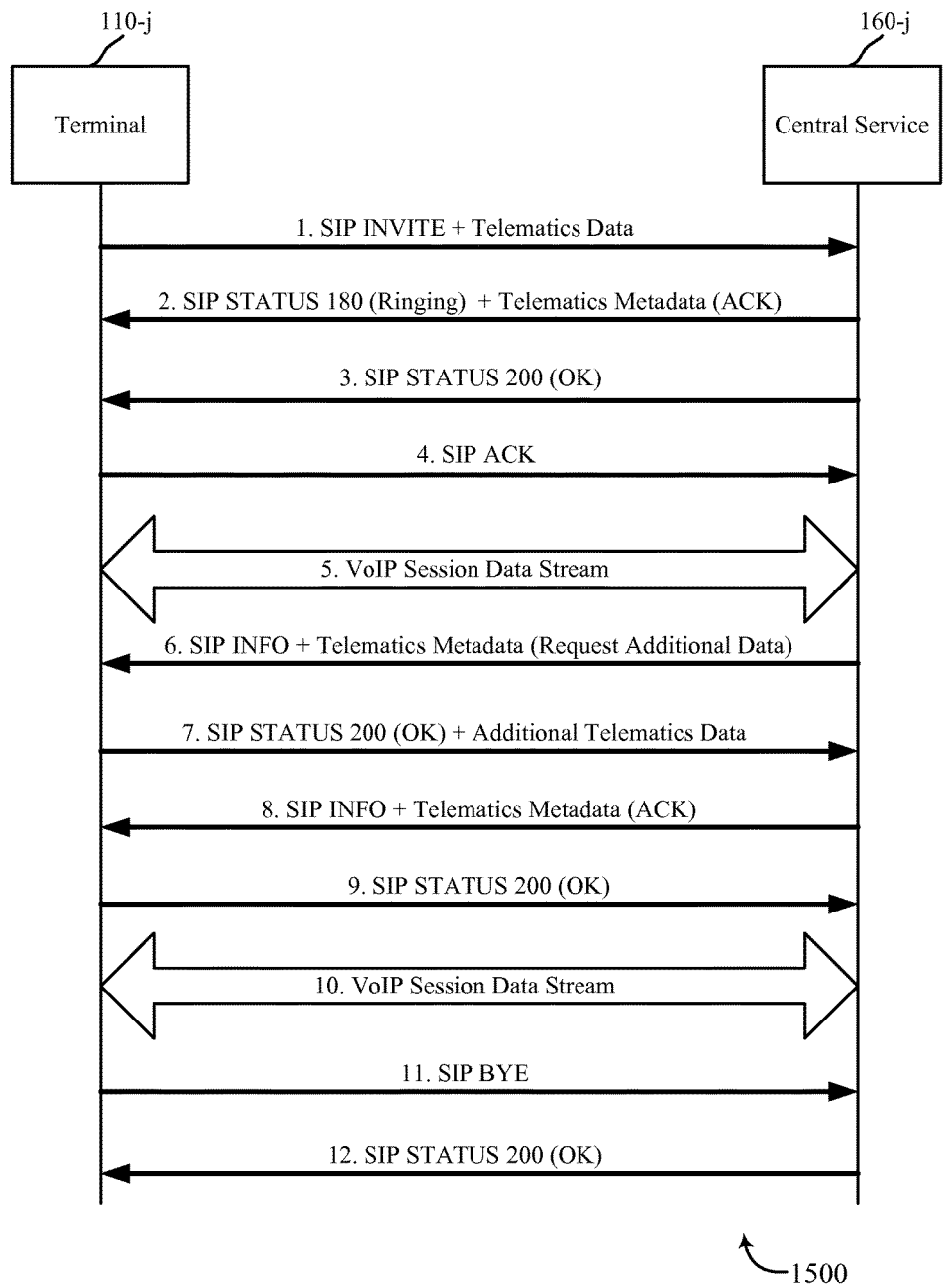
FIG. 15 shows a diagram of an exemplary communications exchange between a terminal and a server.

FIG. 15 is a diagram of another example of a communications exchange 1500 between a terminal 110-*j* and a central service 160-*j* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples, other communication session signaling protocols may be used.

Terminal 110-*j* may be an example of the terminal 110 of FIG. 1A or one of the other terminals 110 described above with reference to previous Figures. Central service 160-*j* may be an example of the central service 160 of FIG. 1A or one of the other central services 160 described above with reference to previous Figures. In certain examples, central service 160-*j* may be implemented by one or more servers. Additionally, in certain examples, one or more proxy servers may be disposed between terminal 110-*j* and central service 160-*j* to forward the communication session signaling protocol messages between terminal 110-*j* and central service 160-*j*.

At a first stage, terminal 110-*j* may transmit a SIP INVITE message to central service 160-*j*. The SIP INVITE message may simultaneously invite central service 160-*j* to a proposed VoIP session with a proposed set of parameters and convey a set of telematics data from terminal 110-*j* to central service 160-*j*. At a second stage, central service 160-*j* may transmit a SIP STATUS 180 (Ringing) response message to terminal 110-*j*. The SIP STATUS 180 (Ringing) response message may also include telematics metadata acknowledging that the telematics data has been received at central service 160-*j*. At a third stage, central service 160-*j* may transmit a SIP STATUS 200 (OK) message to terminal 110-*j* to indicate acceptance of the proposed VoIP session. At a fourth stage, terminal 110-*j* may transmit a SIP ACK message to central service 160-*j*, and at a fifth stage, the VoIP call may be implemented by the negotiated VoIP session.

At a sixth stage, central service 160-*j* may transmit a SIP INFO message to terminal 110-*j* with additional telematics metadata. The additional telematics metadata may request additional telematics data beyond what was included in the initial SIP INVITE message. At a seventh stage, terminal 110-*j* may transmit a SIP STATUS 200 (OK) message to central service 160-*j* with the requested additional telematics data. At an eight stage, central service 160-*j* may transmit a SIP INFO message to terminal 110-*j* with a set of telematics metadata acknowledging receipt of the additional telematics data. At a ninth stage, terminal 110-*j* may transmit a SIP STATUS 200 (OK) message to central service 160-*j* as a response to the SIP INFO message in keeping with SIP protocol. At a tenth stage, the negotiated VoIP session may continue.

In certain examples, stages six through nine may take place without interrupting the VoIP session data stream. Thus, data carrying voice and/or other media may be exchanged between terminal 110-*j* and central service 160-*j* at substantially the same time as the SIP messages carrying telematics data and telematics metadata are exchanged. In certain examples, the SIP INFO and SIP STATUS 200 (OK) messages transmitted between central service 160-*j* and terminal 110-*j* in stages six through nine may not carry useful data about the VoIP session, but rather may be generated and/or transmitted for the sole purpose of carrying telematics data and telematics metadata. Alternatively, the SIP INFO and SIP STATUS 200 (OK) messages in stages six through nine may carry important session information or renegotiated session parameters between terminal 110-*j* and central service 160-*j*.

At an eleventh stage and the conclusion of the VoIP call, terminal 110-*j* may transmit a SIP BYE message to central service 160-*j*. At a twelfth stage, central service 160-*j* may respond with a SIP STATUS 200 (OK) message to confirm that the VoIP session has ended.

Figure 16:
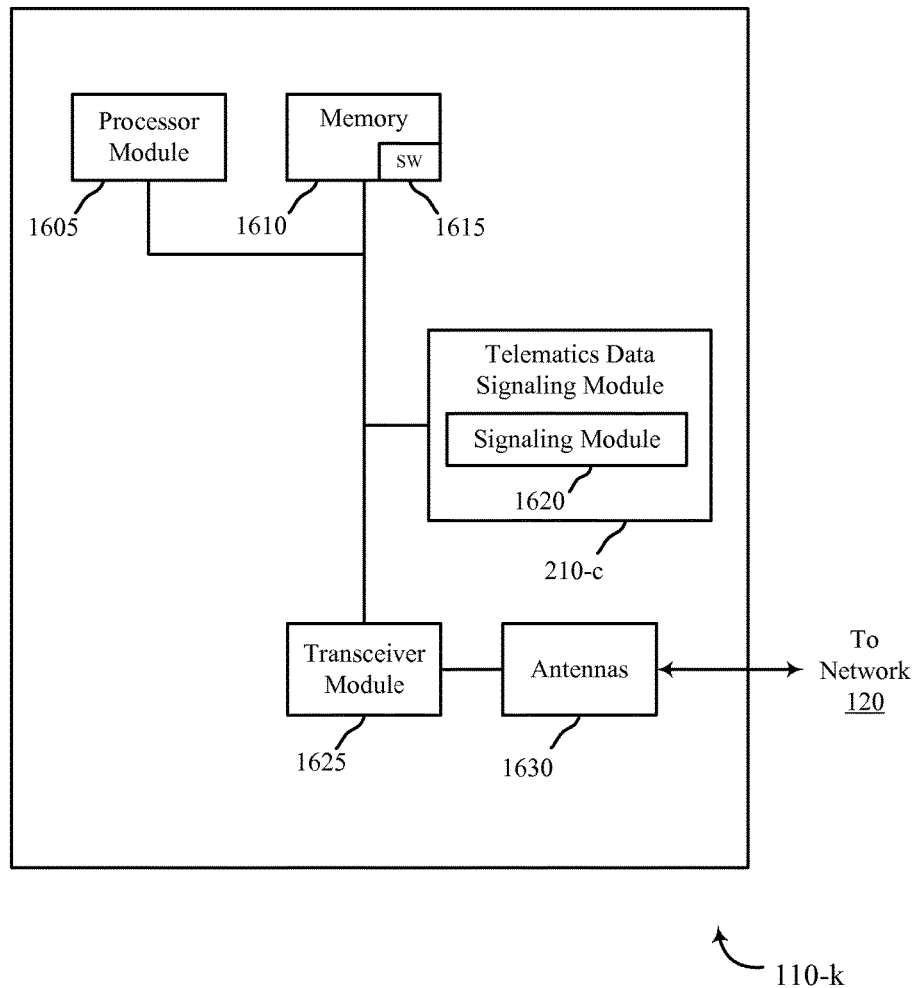
FIG. 16 shows a block diagram of an exemplary terminal in a wireless communications system.

FIG. 16 shows a block diagram of an exemplary wireless terminal 110-*k*. Terminal 110-*k* may be an example of the terminal 110 of FIG. 1A or one of the other terminals 110 described above with reference to previous Figures. The wireless terminal 110-*k* of the present example may include a processor module 1605, a memory 1610, a telematics data signaling module 210-*c*, a transceiver module 1625, and antennas 1630. Each of these components may be communicatively coupled with each other, directly or indirectly (e.g., via one or more buses).

The transceiver module 1625 is configured to communicate bi-directionally, via the antennas 1630 and/or one or more wired or wireless links, with one or more networks, as described above. The transceiver module 1625 may include a modem configured to modulate data and provide the modulated data to the antennas 1630 for transmission, and to demodulate data received from the antennas 1630. While the terminal 110-*k* may include a single antenna, the terminal 110-*k* may include multiple antennas 1630 for multiple links.

The memory 1610 may include random access memory (RAM) and read-only memory (ROM). The memory 1610 may store computer-readable, computer-executable software code 1615 containing instructions that are configured to, when executed, cause the processor module 1605 to perform various functions. Alternatively, the software code 1615 may not be directly executable by the processor module 1605 but be configured to cause the terminal 110-*k* (e.g., when compiled and executed) to perform functions described herein.

The processor module 1605 may include an intelligent hardware device, e.g., a central processing unit (CPU) such as those made by Intel® Corporation, AMD®, or Qualcomm®, a microcontroller, an application-specific integrated circuit (ASIC), etc. According to the architecture of FIG. 16, the terminal 110-*k* may further include the telematics data signaling module 210-*c*. The module 210-*c* may be an example of the telematics data signaling module 210 illustrated in FIGS. 2, 3, and/or 4. The telematics data signaling module 210-*c* may include a signaling module 1620. The signaling module 1620 may cause the transceiver module 1625 to transmit the generated signaling messages to the central service. Additionally, the signaling module 1620 may cause the transceiver module 1625 to receive modified SIP or other communication session signaling protocol messages from the central service.

Figure 17:
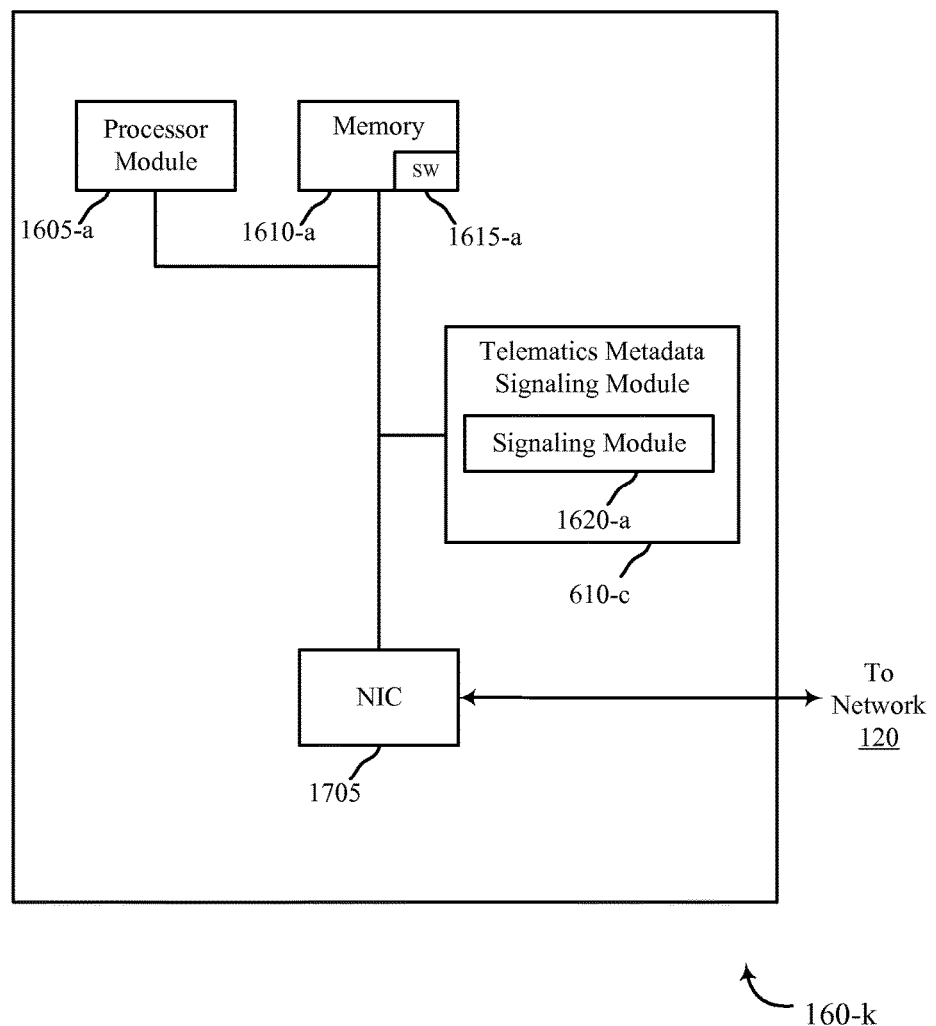
FIG. 17 shows a block diagram of an exemplary central service in a wireless communications system.

FIG. 17 shows a block diagram of an exemplary device implementing a central service 160-*k*. The device implementing the central service 160-*k* may be a server or other computer-based device. Central service 160-*k* may be an example of the central service 160 of FIG. 1A or one or more other central services 160 described above with reference to previous Figures. The central service 160-*k* of the present example may include a processor module 1605-*a*, a memory 1610-*a*, a telematics metadata signaling module 610-*c*, and a network interface controller (NIC) 1705. Each of these components may be communicatively coupled with each other, directly or indirectly.

The memory 1610-*a* may include random access memory (RAM) and read-only memory (ROM). The memory 1610-*a* may store computer-readable, computer-executable software code 1615-*a* containing instructions that are configured to, when executed, cause the processor module 1605-*a* to perform various functions. Alternatively, the software code 1615-*a* may not be directly executable by the processor module 1605-*a* but be configured to cause the central service 160-*k* (e.g., when compiled and executed) to perform functions described herein.

The central service 160-*k* may include the telematics metadata signaling module 610-*c*. The module 610-*c* may be an example of the telematics metadata signaling module 610 illustrated in FIGS. 6, 7, and/or 8. The telematics metadata signaling module 610-*c* may include a signaling module 1620-*a*. The signaling module 1620-*a* may cause the NIC 1705 to transmit the generated signaling messages to the terminal 110. Additionally, the signaling module 1620-*a* may cause the network interface card 1705 to receive modified SIP or other communication session signaling protocol messages from the terminal.

Figure 18:
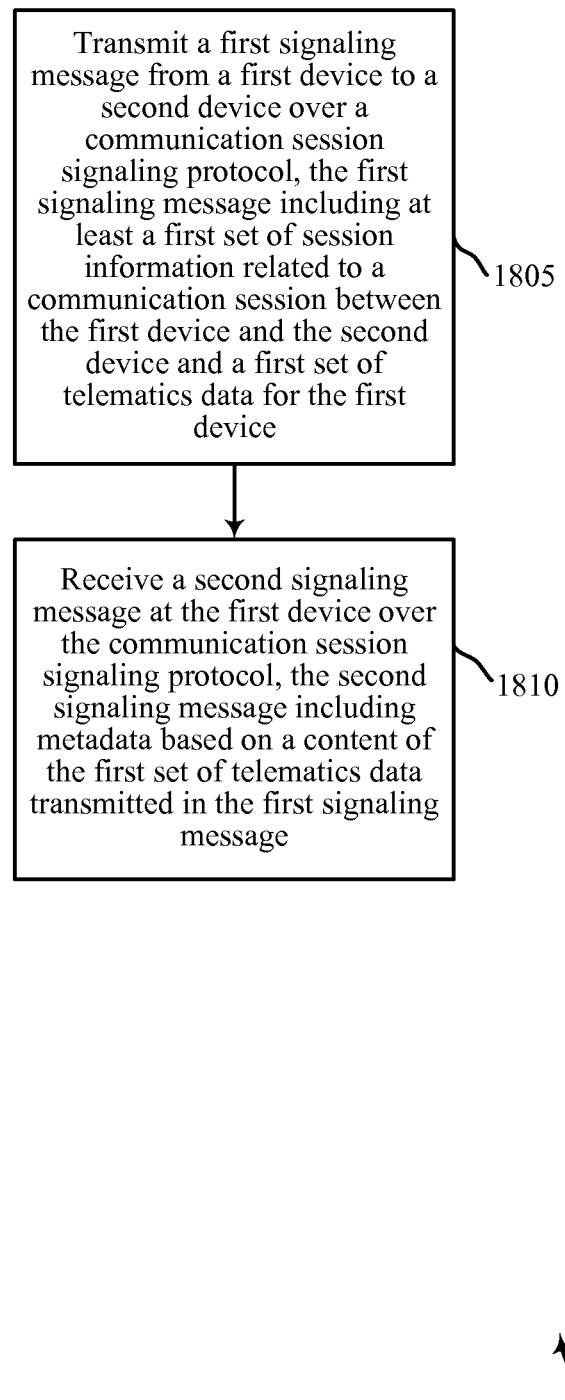
FIG. 18 is a flowchart of an exemplary method of communicating telematics data.

FIG. 18 is a flowchart illustrating one embodiment of a method 1800 for communicating telematics data and/or telematics metadata. For clarity, the method 1800 is described with reference to the terminal 110 of FIGS. 1A, 1B, 2, 3, 4, 10, 11, 12, 13, 14, 15, and/or 16. In one implementation, the telematics data signaling module 210 of FIGS. 2, 3, 4, and/or 16 may execute one or more sets of codes to control the functional elements of the terminal 110 to perform the functions described below.

At block 1805, a first signaling message may be transmitted from a first device to a second device over a communication session signaling protocol. In one example, the first signaling message may include at least a first set of session information related to a communication session between the first device and the second device and a first set of telematics data for the first device. In certain examples, the first device may be one or more of the terminals 110 described with reference to the preceding Figures, and the second device may be one or more of the central services 160 described with reference to the preceding Figures. The communication session signaling protocol may be, for example a modified version of Session Initiation Protocol (SIP) as described in the previous examples, or another applicable communication session signaling protocol (e.g., XMPP, Google Talk, Skype, etc.). The communication session may be a VoIP call between the terminal and the central service. In some cases, the communication session may exchange streaming media (such as voice, video, streaming or character-at-a-time text) inside a media stream as well as any media (such as text messages) outside of a media stream. In one example, the communication session may only carry non-streaming media.

At block 1810, a second signaling message may be received at the first device over the communication session signaling protocol. In one example, the second signaling message may include metadata based on a content of the first set of telematics data transmitted in the first signaling message. The telematics metadata may include, but is not limited to, an acknowledgement of whether the telematics data was received at the central service 160, a request to retransmit the telematics data, a request to transmit different telematics data, a request to take some other action, auxiliary data describing actions taken by the central service, and/or other relevant telematics metadata.

Therefore, the method 1800 may provide for communicating telematics data and/or telematics metadata. It should be noted that the method 1800 is just one implementation and that the operations of the method 1800 may be rearranged or otherwise modified such that other implementations are possible.

Figure 19:
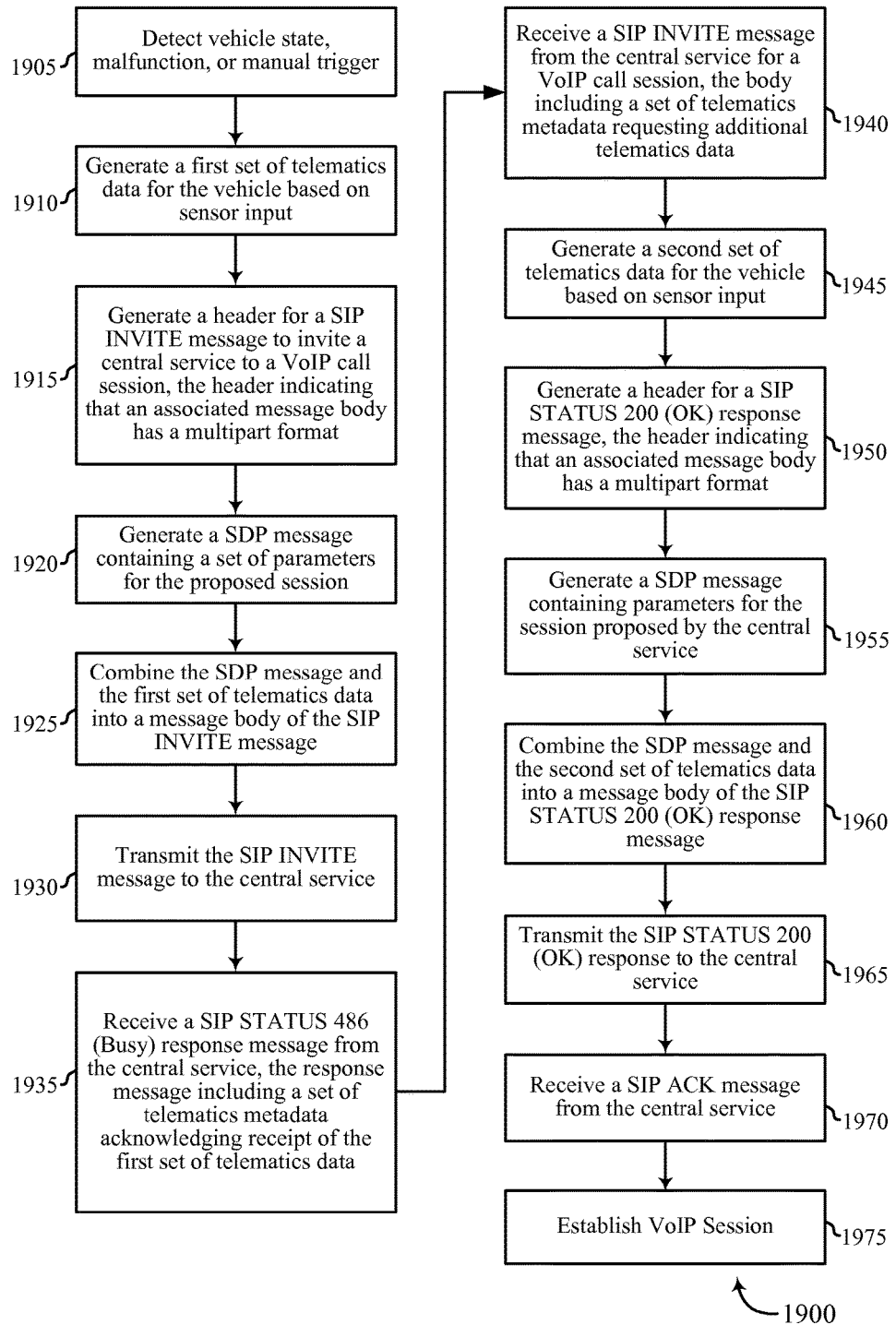
FIG. 19 is a flowchart of an exemplary method of communicating telematics data.

FIG. 19 is a flowchart illustrating one embodiment of a method 1900 for communicating telematics data and/or telematics metadata by modifying signaling messages used in a communication session signaling protocol. For clarity, the method 1900 is described with reference to the terminal 110 of FIGS. 1A, 1B, 2, 3, 4, 10, 11, 12, 13, 14, 15, and/or 16. In one implementation, the telematics data signaling module 210 of FIGS. 2, 3, 4, and/or 16 may execute one or more sets of codes to control the functional elements of the terminal 110 to perform the functions described below. The method 1900 of FIG. 19 may be an example of the method 1800 of FIG. 18.

At block 1905, a vehicle state (e.g., crash, fire, airbag deployment, rollover, or other situation), malfunction, or manual trigger may be detected at the terminal. At block 1910, a first set of telematics data for the vehicle may be generated based on input from one or more sensors communicatively coupled with the terminal. At block 1915, a header for a SIP INVITE message may be generated at the terminal to invite a central service (e.g., PSAP) to a Voice over Internet Protocol (VoIP) call session, the header indicating that an associated message body has a multipart format. At block 1920, a session description protocol (SDP) message containing a set of parameters for the proposed session may be generated at the terminal. At block 1925, the SDP message and the first set of telematics data may be combined into a message body of the SIP INVITE message, with the SDP message as a first portion of the body of the SIP INVITE message and the telematics data as a second portion of the body of the SIP INVITE message. At block 1930, the SIP INVITE message may be transmitted to the central service. In one example, the terminal may send the INVITE to an entity which has responsibility for handling emergency requests (such as an entity within a carrier's network), and that entity may process or forward the INVITE to or towards the central service (e.g., PSAP).

At block 1935, a SIP STATUS 486 (Busy) response message may be received from the PSAP central service device. In one example, the response message may include a multi-part body containing a first portion of the message body and a set of telematics metadata acknowledging receipt of the first set of telematics data in a second portion of the message body. It is noted that the SIP STATUS 486 (Busy) response message may not include SDP information in the message body (the first portion of the message body may be empty, for example, or the set of telematics metadata may be in the first portion of the message body, or may be the only contents in the message body). In certain examples, the terminal may determine from a header of the second signaling message that the body of the SIP STATUS 486 (Busy) response message is in the multi-part format. The terminal may further identify the first portion of the message body and the second portion of the message body based on information in the header of the SIP STATUS 486 (Busy) response message. In some cases, other STATUS responses may be used.

At block 1940, a SIP INVITE message may be received at the terminal from the PSAP central service device for a VoIP call session, and the body of the SIP INVITE message may include a set of telematics metadata requesting additional telematics data from the terminal. Alternatively, the telematics metadata may be received at the terminal in a separate signaling message. At block 1945, a second set of telematics data may be generated for the vehicle based on input from the sensors and/or other sources of telematics data. At block 1950, a header for a SIP STATUS 200 (OK) response message may be generated at the terminal. In one example, the header may indicate that an associated message body has a multi-part format. At block 1955, an SDP message containing parameters for the session proposed by the PSAP central service device may be generated. At block 1960, the SDP message and the second set of telematics data may be combined into a message body of the SIP STATUS 200 (OK) message. At block 1965, the SIP STATUS 200 (OK) response message may be transmitted to the central service from the terminal. At block 1970, a SIP ACK message may be received at the terminal from the central service, and at block 1975, a VoIP session may be established between the terminal and the central service.

Thus, the method 1900 may provide for the communication of telematics data and/or telematics metadata. It should be noted that the method 1900 is just one implementation and that the operations of the method 1900 may be rearranged or otherwise modified such that other implementations are possible.

Figure 20:
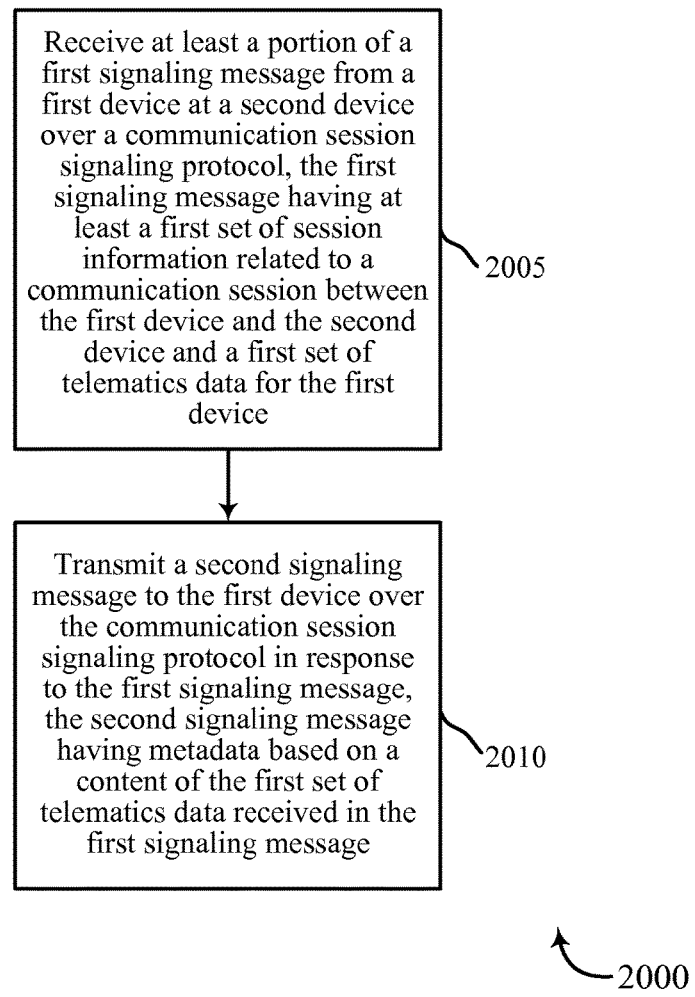
FIG. 20 is a flowchart of an exemplary method of communicating telematics data.

FIG. 20 is a flowchart illustrating one embodiment of a method 2000 for communicating telematics data and/or telematics metadata. For clarity, the method 2000 is described with reference to the central service 160 of FIGS. 1A, 1B, 6, 7, 8, 10, 11, 12, 13, 14, 15, and/or 17. In one implementation, the telematics metadata signaling module 610 of FIGS. 6, 7, 8, and/or 17 may execute one or more sets of codes to control the functional elements of the central service 160 to perform the functions described below.

At block 2005, at least a portion of a first signaling message may be received from a first device at a second device over a communication session signaling protocol. In one embodiment, the first signaling message may have at least a first set of session information related to a communication session between the first device and the second device. The first signaling message may also have at least a first set of telematics data for the first device. In certain examples, the first device may be one or more of the terminals 110 described with reference to the preceding Figures, and the second device may be one or more of the central services 160 described with reference to the preceding Figures. The communication session signaling protocol may be, for example a modified version of Session Initiation Protocol (SIP) as described in the previous examples, or another applicable communication session signaling protocol (e.g., XMPP, Google Talk, Skype, etc.). The communication session may be a VoIP call between the terminal and the central service. In some cases, the communication session may exchange streaming media (such as voice, video, streaming or character-at-a-time text) inside a media stream as well as any media (such as text messages) outside of a media stream. In one example, the communication session may only carry non-streaming media At block 2010, a second signaling message may be transmitted to the first device over the communication session signaling protocol in response to the first signaling message, the second signaling message having metadata based on a content of the first set of telematics data received in the first signaling message.

Therefore, the method 2000 may provide for communicating telematics data and/or telematics metadata by modifying signaling messages used in a communication session signaling protocol. It should be noted that the method 2000 is just one implementation and that the operations of the method 2000 may be rearranged or otherwise modified such that other implementations are possible.

Figure 21:
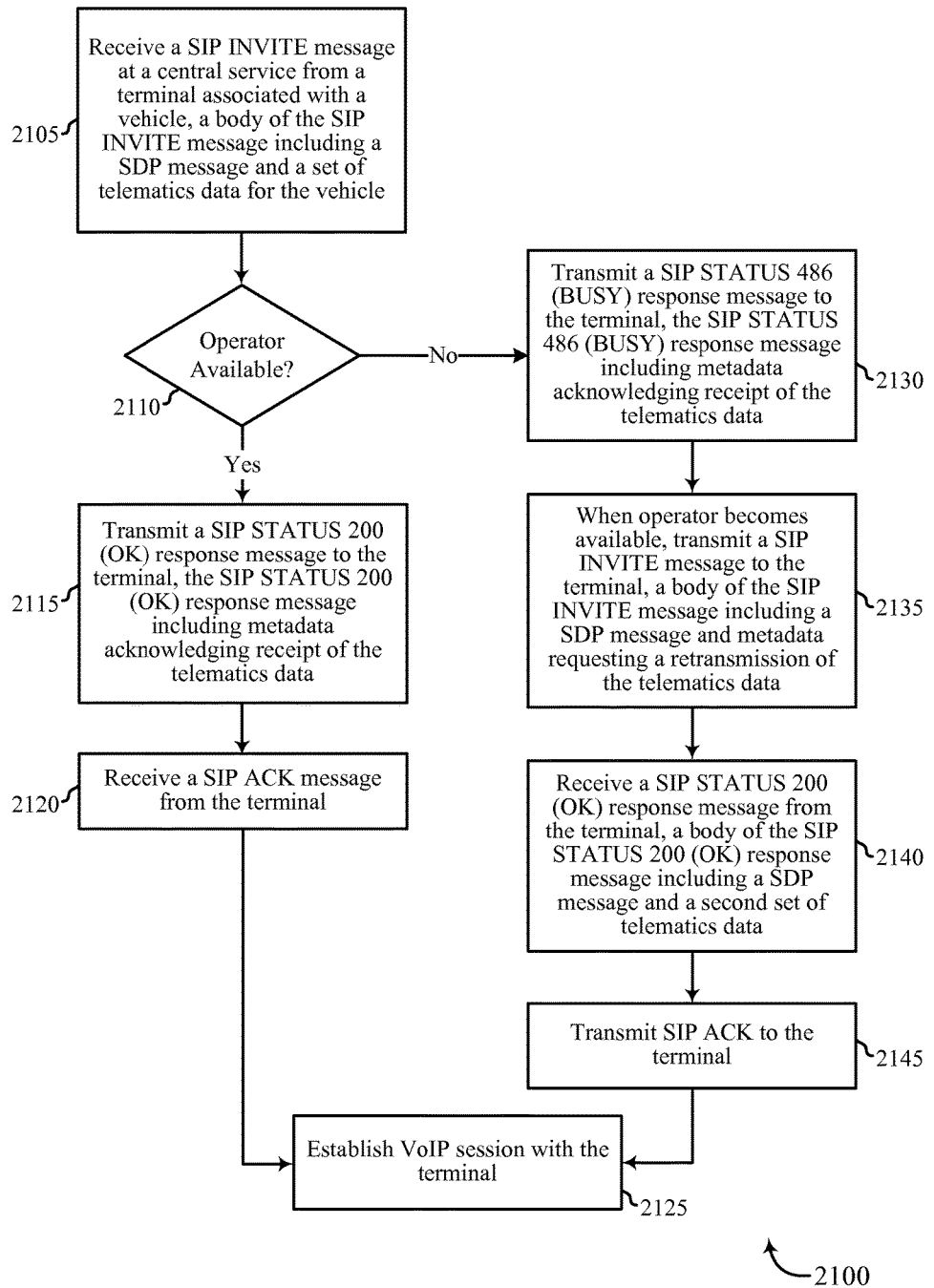
FIG. 21 is a flowchart of an exemplary method of communicating telematics data.

FIG. 21 is a flowchart illustrating one embodiment of a method 2100 for communicating telematics data and/or telematics metadata by modifying signaling messages used in a communication session signaling protocol. For clarity, the method 2100 is described with reference to the central service 160 of FIGS. 1A, 1B, 6, 7, 8, 10, 11, 12, 13, 14, 15, and/or 17. In one implementation, the telematics metadata signaling module 610 of FIGS. 6, 7, 8, and/or 17 may execute one or more sets of codes to control the functional elements of the central service 160 to perform the functions described below. The method 2100 of FIG. 21 may be an example of the method 2000 of FIG. 20.

At block 2105, a SIP INVITE message may be received at a central service (e.g., PSAP) from a terminal associated with a vehicle. A body of the SIP INVITE message may include an SDP message and a set of telematics data for the vehicle. At block 2110, a determination is made as to whether an operator is available to accept a voice and/or other media call at the central service. If an operator is available (block 2110, YES), the central service may transmit a SIP STATUS 200 (OK) response message to the terminal, at block 2115 the SIP STATUS 200 (OK) response message including metadata acknowledging receipt of the telematics data. Alternatively, the metadata may be transmitted to the terminal in a separate signaling message. At block 2120, a SIP ACK message may be received from the terminal, and at block 2125, a VoIP session or other communication may be established with the terminal.

If, however, no operator is available to accept the call (block 2110, NO), at block 2130 the PSAP central service device may transmit a SIP STATUS 485 (BUSY) response message to the terminal, the response message including metadata acknowledging receipt of the telematics data. At block 2135, when an operator becomes available, the central service may transmit a SIP INVITE message to the terminal, where a body of the SIP message contains an SDP message and metadata requesting a retransmission of the telematics data. At block 2140, the central service may receive a SIP STATUS 200 (OK) response message from the terminal, where a body of the SIP STATUS 200 (OK) response message contains a SDP message and a second set of telematics data. At block 2145, a SIP ACK message may be transmitted to the terminal, and at block 2125, a VoIP session or other communication may be established with the terminal.

Thus, the method 2100 may provide for the communication of telematics metadata. It should be noted that the method 2100 is just one implementation and that the operations of the method 2100 may be rearranged or otherwise modified such that other implementations are possible.

Figure 22:
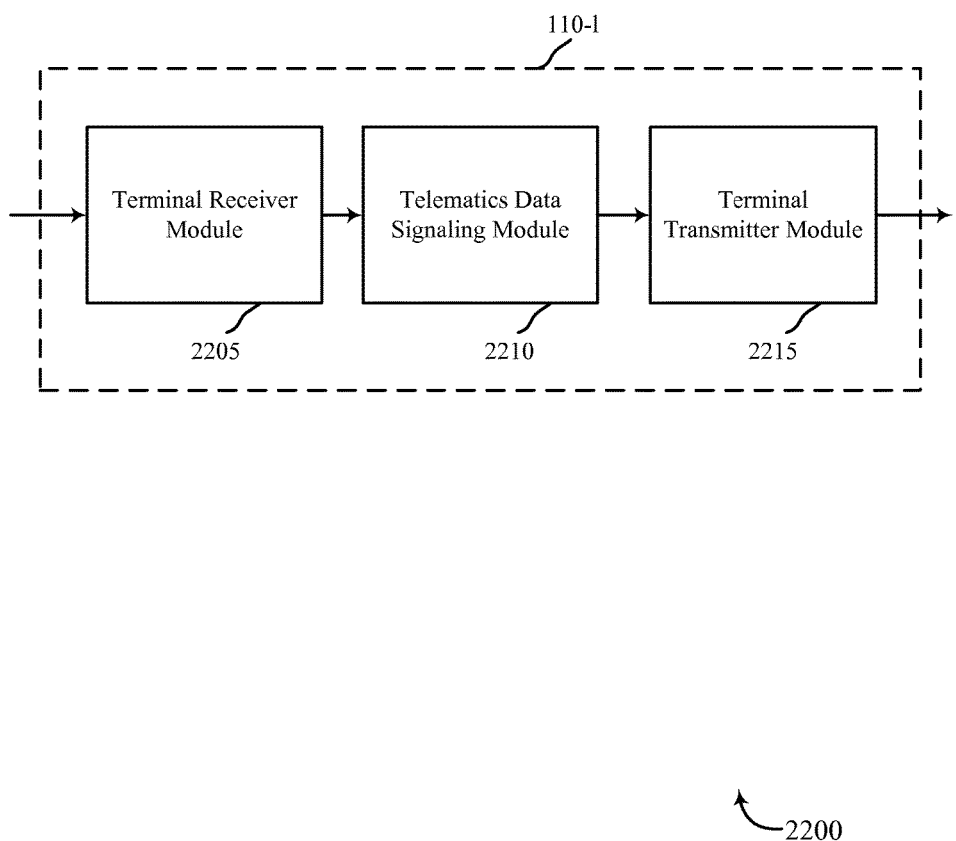
FIG. 22 is a block diagram illustrating an embodiment of a terminal, in accordance with various aspects of the present disclosure.

FIG. 22 is a block diagram 2200 illustrating an embodiment of a terminal 110-*l*, in accordance with the present disclosure. The terminal 110-*l* may be an example of the terminal 110 of FIGS. 1A and/or the terminal 110-*a* of FIG. 1B—for example, the terminal may be an emergency call in-vehicle system (IVS) of a vehicle. The terminal 110-*l* may include a terminal receiver module 2205, a telematics data signaling module 2210, and a terminal transmitter module 2215. Each of these components may be in communication with each other. Terminal 110-*l* may include other modules not shown in FIG. 22—e.g. may include sensors to detect conditions and events associated with a vehicle and a receiver and processor to enable the location of the terminal to be estimated or determined from wireless signals received from GPS satellites.

These components of the terminal 110-*l* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the terminal receiver module 2205 may include a cellular receiver and may receive transmissions from a base station 105 (which may be in communication with central service 160, as described above). In one example, the terminal receiver module 2205 may receive a signaling message for a communication signaling protocol that has been adapted to include telematics metadata. The telematics data signaling module 2210 may extract the telematics metadata from the adapted signaling message, activate one or more external systems, gather telematics data to be sent to central service 160, maintain a set of capabilities associated with the terminal that can be transmitted to central service 160, and so forth. The transmitter module 2215 may be configured to transmit telematics data, capabilities data, and so forth to the central service 160 via a base station 105.

Figure 23:
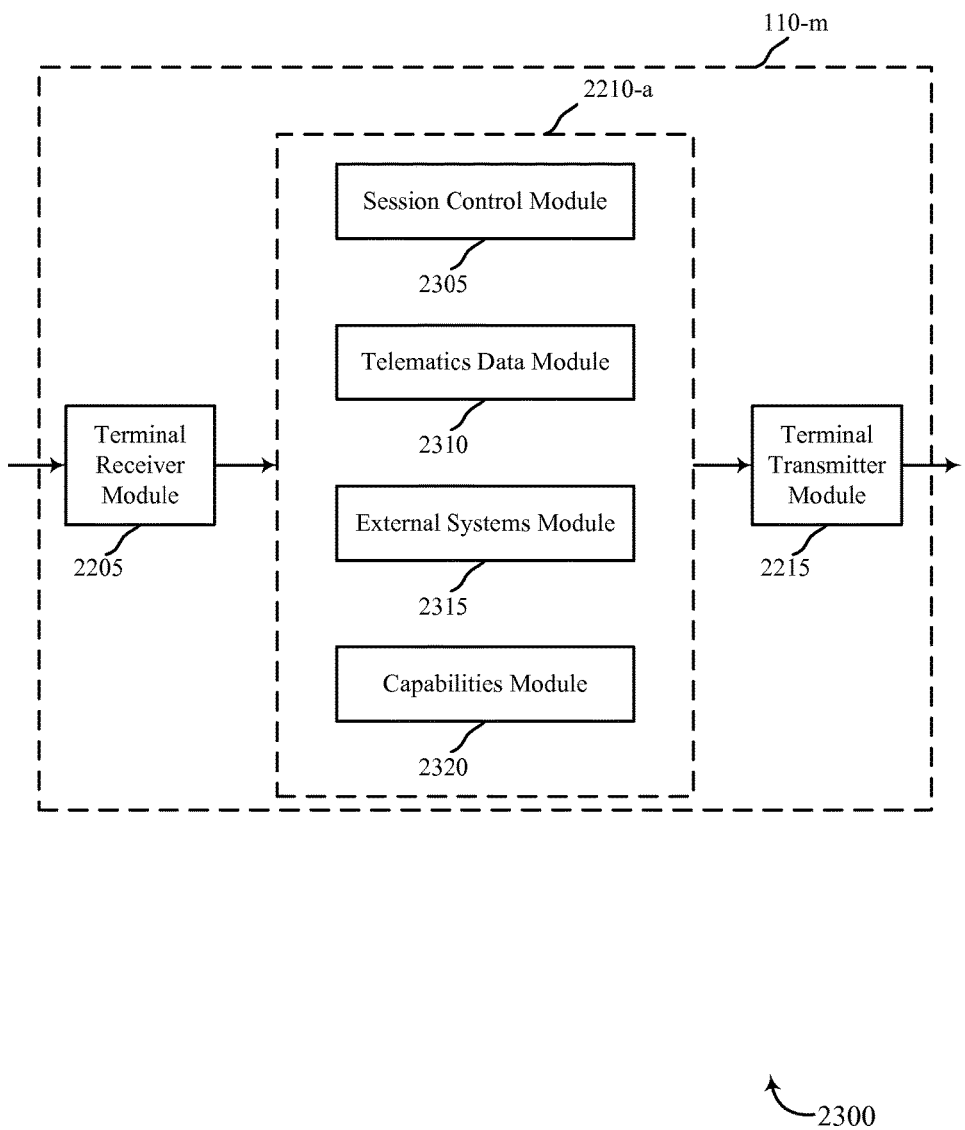
FIG. 23 is a block diagram illustrating an embodiment of a terminal, in accordance with various aspects of the present disclosure.

FIG. 23 is a block diagram 2300 illustrating an embodiment of a terminal 110-*m* in accordance with the present disclosure. The terminal 110-*m* may be an example of the terminals 110 illustrated in FIGS. 1A, 1B, and/or 22. The terminal 110-*m* may include a terminal receiver module 2205, a telematics data signaling module 2210-*a*, and a terminal transmitter module 2215, as previously described. Each of these components may be in communication with each other.

These components of the terminal 110-*m* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the telematics data signaling module 2210-*a* may include a session control module 2305, a telematics data module 2310, an external systems module 2315, and a capabilities module 2320.

The session control module 2305 may use one or more signaling messages to control and/or facilitate a communications session. In certain embodiments, the session control module 2305 may control and/or facilitate a communications session by communicating session information according to a communication session signaling protocol. In one example, the session control module 2305 may generate a signaling message that includes a set of signal information. The session control module 2305 may also obtain a signaling message that includes a set of signal information.

The session control module 2305 may also be configured to negotiate, set up, manage, and terminate communication sessions with the central service 160. The session control module 2305 may generate SIP signaling message header content and SDP content to communicate session-related signaling data with the central service. The session control module 2305 may also be configured to receive media content (e.g., audio data for a voice call, audio and video data for a video call, text data for a call with text with or without voice or video), transmit the media content as a stream of packets to the central service according to the negotiated session, and receive a stream of packets containing media content from the central service according to the negotiated session.

The telematics data module 2310 may generate and/or obtain telematics data. The telematics data module 2310 may also receive telematics metadata. In certain examples, the telematics data module 2310 may obtain telematics data based on received telematics metadata.

The telematics data module 2310 may gather telematics data from a system or device associated with the terminal 110-*m*. For example, where terminal 110-*m* is associated with a vehicle, the telematics data module 2310 may gather data related to a vehicle type and vehicle identification number (VIN), one or more timestamps, a position estimate and associated degree of confidence, a direction of travel, a number of passengers (e.g., with fastened seatbelts), a service provider for the terminal (if any), a trigger type (e.g., deployed airbags, bumper sensors, manual trigger, fire indicators, rollover, or other situation detection, etc.), and/or other relevant information that may suit a particular application of the principles described herein. The telematics data module 2310 may also format telematics data for transmission to the central service 160 according to a protocol understood by the central service 160. In certain examples, the telematics data module 2310 may compile a standard set of telematics data for transmission to the central service. Additionally or alternatively, the telematics data module 2310 may be configured to compile a set of specific telematics data requested from the central service for transmission to the central service.

The telematics data module 2310 may also be configured to analyze the telematics metadata to identify any actions that may be performed based on the telematics metadata received from the central service 160 in association with the telematics data transmitted to the central service. The identified actions may be specifically requested by the central service or inferred by the telematics data module 2310 based on the received telematics metadata. For example, the telematics metadata may include a request to retransmit the telematics data, to transmit a different set of telematics data, or to transmit an updated version of the set of telematics data. The telematics data module 2310 may provide the appropriate telematics metadata and/or appropriate instructions to the external systems control module 2315.

The external systems module 2315 may be configured to take one or more actions based on telematics metadata received from the central service in association with the telematics data transmitted to the central service. If, for example, the terminal 110-*m* is associated with a vehicle and telematics data is transmitted to the central service in response to a detected collision, the telematics metadata may include instructions to take certain precautionary or rescue actions with respect to the vehicle and its occupants. Such actions may include, but are not limited to, gathering additional telematics data, turning off or on an ignition of the vehicle, turning a fuel supply or power source (e.g., drivetrain battery) of the vehicle off or on, unlocking or locking a door of the vehicle, activating the horn of the vehicle, playing externally audible sounds, turning on the lights (e.g., headlights, running lights) of the vehicle, turning on the interior (e.g., cabin) lights of the vehicle, turning on the flashers of the vehicle (e.g., 4 ways, emergency flashers, hazard lights), actuating a power window, playing a recorded message received from the central service or stored at the terminal 110-*m*, rendering media (e.g., rendering text-to-speech, playing media sent by the central service, playing media referenced by and/or associated with an instruction sent by the central service), displaying a text message received from the central service or stored at the terminal 110-*m*, enabling or disabling a camera of the vehicle, or other appropriate actions. It is noted that the things such as activating the horn, playing externally audible sounds, turning on the light, and/or turning on the flashers may help alert emergency personnel of the location of the vehicle or otherwise help that the vehicle be noticed. Returning to FIG. 23, the external systems module 2315 may perform an action after the terminal 110-*m* receives an explicit request to perform an action from the central service 160 or can infer that an action should be performed from a message from the central service 160.

The capabilities module 2320 may be configured to store and/or generate a set of telematics capabilities associated with the terminal 110-*m* so that the set of capabilities can be provided to the central service 160 in FIG. 1A. As described above, the telematics capabilities may include actions that the terminal 110-*m* is capable of performing, including gathering and sending telematics data and/or take an action via the external systems module 2315. In some examples, the central service 160 may adapt requests provided to the terminal 110-*m* based on the received set of capabilities generated or stored in the capabilities module 2320, whereas in other embodiments, the central service 160 may not so adapt requests provided to the terminal 110-*m*.

In some embodiments, the capabilities module 2320 and the session control module 2305 may be configured to operate together to transmit an invitation and a set of data (e.g., telematics data, such as a minimum set of data) to establish an emergency call with the central service 160, where the set of telematics capabilities is transmitted together with the invitation and set of data. In other embodiments, the capabilities module 2320 and the session control module 2305 may be configured to operate together to transmit the set of telematics data after the emergency call is established in response to a request by the central service 160 to transmit the set of telematics capabilities. In still other embodiments, the capabilities module 2320 and the session control module 2305 may be configured to operate together to transmit the set of telematics capabilities together with an acknowledgment of a response to an invitation to establish an emergency call. In general, the capabilities module 2320 and the session control module 2305 may be configured to send the set of capabilities at any time before, during, or following establishment of an emergency call.

Figure 24:
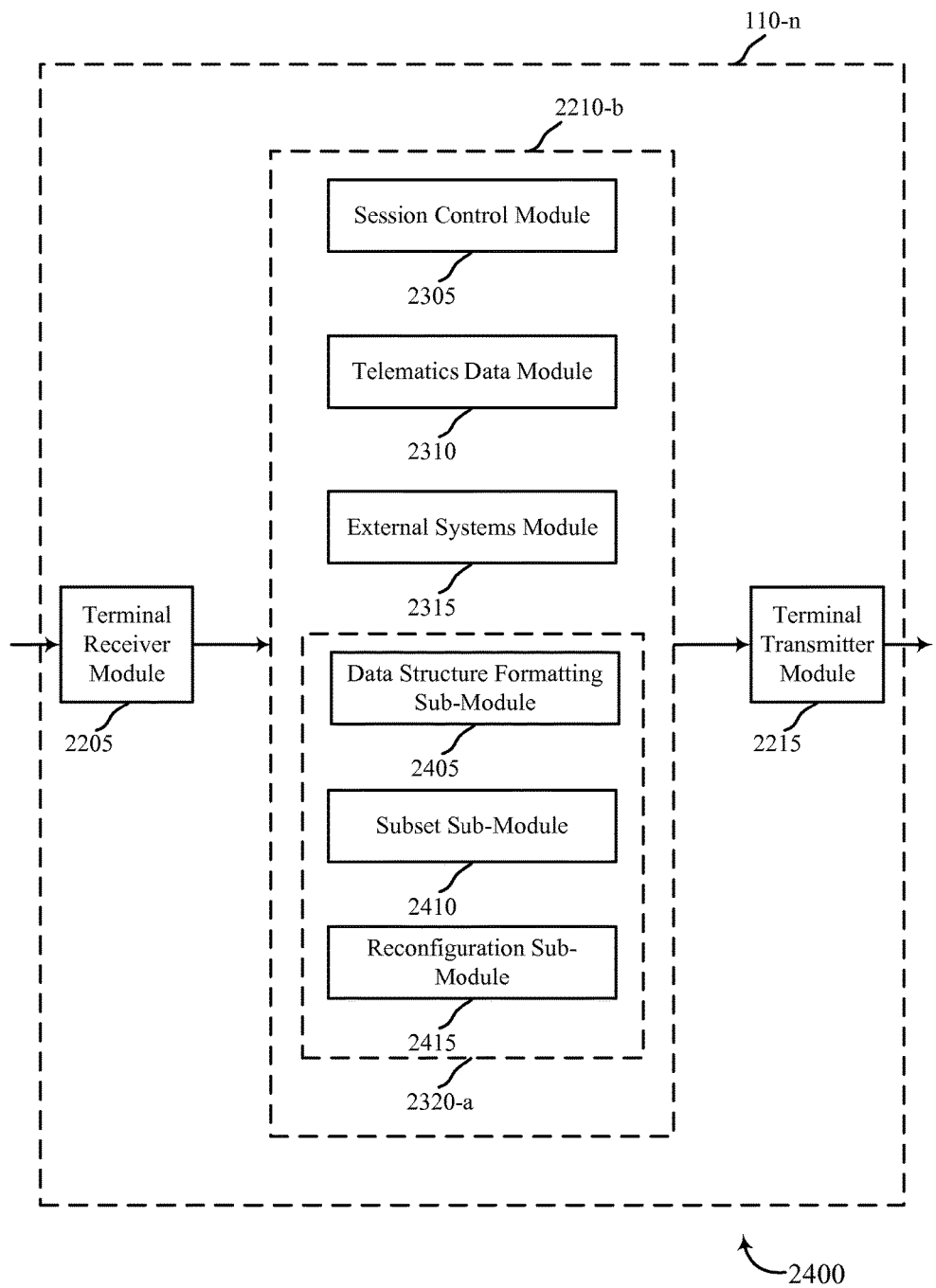
FIG. 24 is a block diagram illustrating an embodiment of a terminal, in accordance with various aspects of the present disclosure.

FIG. 24 is a block diagram 2400 illustrating an embodiment of a terminal 110-*n* in accordance with the present disclosure. The terminal 110-*n* may be an example of the terminals 110 illustrated in FIGS. 1A, 1B, 22, and/or 23. In one configuration, the terminal 110-*n* may include a terminal receiver module 2205, a telematics data signaling module 2210-*b*, and a terminal transmitter module 2215. Each of these components may be in communication with each other.

These components of the terminal 110-*n* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

As illustrated in FIG. 24, the capabilities module 2320-*a* (which may be an example of one or more aspects of the capabilities module 2320 in FIG. 23) may include one or more of a data structure formatting sub-module 2405, a subset sub-module 2410, and/or a reconfiguration sub-module 2415. The data structure formatting sub-module 2405 may be configured to format the set of capabilities stored by the capabilities module 2320-*a* in a data structure corresponding to a request data structure by which the terminal 110-*n* accepts requests to perform one or more actions (e.g., requests interpretable by the session control module 2305, the telematics data module 2310, and/or the external systems module 2315). In one embodiment, the data structure formatting sub-module 2405 may format the capabilities data structure substantially identical to the request data structure, whereas in other embodiments the capabilities data structure may merely be similar to the request data structure (e.g., may share one or more components, structures, data representation or programming languages, etc.).

In one specific embodiment, the data structure formatting sub-module may be configured to format the capabilities data structure as an Extensible Markup Language (XML) element that can be transmitted to the central service 160 via the terminal transmitter module 2215. The capabilities XML element may include one or more child XML elements each defining an action that the terminal 110-*n* may perform, such as sending telematics data to the central service 160 and/or utilizing the external systems module 2315 to activate some system associated with the terminal 110-*n*. The capabilities XML element may also include one or more parameters corresponding to one or more of the available actions—such as a duration during which a certain action should be performed (e.g., honk the horn for 10 minutes), a type of supported data (e.g., encodings of videos, audio, or text that the terminal 110-*n* can present to a passenger of the vehicle), and so forth. The parameters may be implemented as XML attributes within each action XML child element, and/or may be implemented as further XML child elements with the action XML child elements.

The subset sub-module 2410 may be configured to cause the capabilities module 2320-a to transmit all or merely a subset of emergency call actions that the terminal 110-n is capable of performing. The subset sub-module 2410 may be configured to transmit all of the capabilities in some embodiments, but may alternatively be configured to only send certain subsets of capabilities based on how an emergency call is initiated. If, for example, an emergency call is automatically initiated by the terminal 110-n based on, for example, a detected collision, the subset sub-module 2410 may provide all of the telematics or emergency call capabilities associated with terminal 110-n for transmission to the central service 160. If, on the other hand, the emergency call is activated by a passenger manually pressing a button, the subset sub-module 2410 may be configured to provide only a subset of emergency call capabilities for transmission to the central service, with the subset being based at least in part on a category of assistance needed by a user of the emergency calls system. For example, if the user presses an emergency button, the subset sub-module 2410 may be configured to transmit all emergency call capabilities, whereas if the user presses an assistance button, the subset sub-module 2410 may provide a more limited subset of the entirety of capabilities of the terminal 110-n for transmission to the central service 160.

The reconfiguration sub-module 2415 may be configured to reconfigure the set of telematics capabilities stored or generated in the capabilities module 2320-a for transmission to the central service 160. In one example, the reconfiguration sub-module 2415 may be configured to update the set of telematics capabilities based at least in part on operational conditions of vehicle components associated with the actions in the set of capabilities. For example, if a particular component of a vehicle was damaged in an accident, the reconfiguration sub-module 2415 may be configured to remove capabilities associated with the damaged component from the set of capabilities. In another example, the reconfiguration sub-module 2415 may be configured to receive configuration instructions from one or more of a manufacturer of an IVS, a manufacturer of a vehicle, a telematics service provider, or another authorized entity based on new or revised capabilities associated with terminal 110-n and/or supported by central service 160.

Figure 25A:
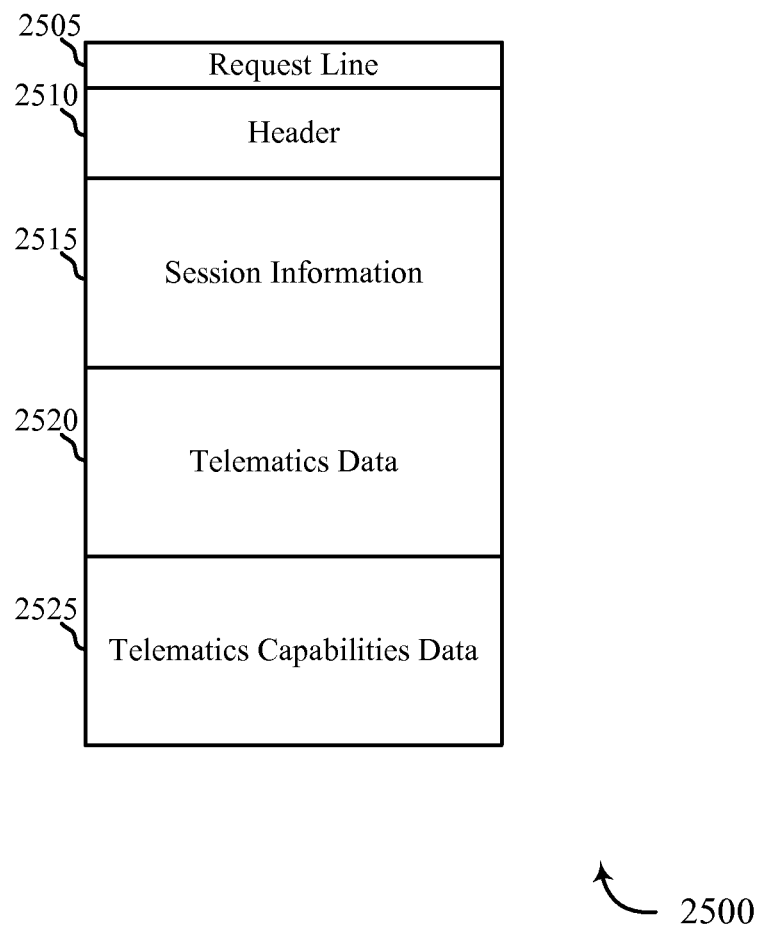
FIG. 25A shows a block diagram of an exemplary message according to a communication session signaling protocol, in accordance with various aspects of the present disclosure.

FIG. 25A and FIG. 25B illustrate examples of a session initiation protocol (SIP) request message that may be used to carry both session information and telematics data, and FIG. 25C illustrates an example of a telematics capabilities data structure that may be included in a SIP request message. It will be understood that, as noted above, the set of telematics capabilities may be transmitted at many different times, including before, during, or following the establishment of an emergency call. FIGS. 25A-25C merely illustrate one example—i.e., when the set of telematics capabilities is transmitted to the central service 160 during establishment of the emergency call—but the disclosure here may of course be adapted to any time during which the set of telematics capabilities is transmitted to the central service 160. While the examples of FIGS. 25A-25C are described in the context of SIP request messages with XML elements, it will be understood that the principles of the present description may be used to modify or extend other communication session signaling protocols (e.g., XMPP, Google Talk, MSN, etc.) or as a basis for new communication session signaling protocols, and may use other data structures or data representations as well.

Turning now specifically to FIG. 25A, a diagram of an example format 2500 of the request message is shown. A SIP request message format 2500 may include a request line 2505, a header 2510, session information 2515 (e.g., session parameters, session data), telematics data 2520, and also telematics capabilities data 2525. The SIP protocol is defined by the Internet Engineering Task Force (IETF) in a number of Request For Comments standards such as RFC 3261. These standards define a number of SIP request and response messages, including an INVITE message, an ACK message, a BYE message, a CANCEL message, an OPTIONS message, a REGISTER message, a PRACK message, a SUBSCRIBE message, a NOTIFY message, a PUBLISH message, an INFO message, a REFER message, a MESSAGE message, and an UPDATE message. The present format 2500 may be used for each of these messages and for other types of request and response messages.

With reference now to the example of FIG. 25B, a modified SIP INVITE message 2500-a based on the format of FIG. 25A may be used, for example, by a terminal to simultaneously request a call or other communications session with a central service, transmit telematics data to that central service, and also transmit a set of telematics capabilities to the central service. In this manner, the central service may be made aware of which action(s) a terminal 110 supports and is capable of performing.

The request line 2505-a of the example SIP INVITE message 2500-a may identify the message 2500-a as a request and specify the type of request that is being made (e.g., INVITE). The header 2510-a of the request message may define the source of the request, the intended recipient (e.g., emergency service URN) of the request, a call identifier, contact information for the source, a call sequence number, an indication of the type(s) of data in the body, and a length of the message. In the present example, the header 2510-a may specify that the body contains mixed data, with the character string "--boundary1--" indicating the boundary between the different types of data in the body. In the present example, the body of the message includes session information 2515-a, telematics data 2520-a, and telematics capabilities data 2525-a. It is noted that the present example may not show all of the header fields that may typically be included.

The session information 2515-a may include of list of parameters for the proposed session between the terminal and the central service. For example, the SIP INVITE message 2500-a may include a set of Session Description Protocol (SDP) parameters for setting up a VoIP audio call.

The telematics data 2520-a may include sensor readings, stored or logged data, and other data associated with the terminal that are transmitted to the central service. In certain examples, the telematics data may not be directly related to setting up and maintaining the session. Thus, even if the central service rejects the proposed parameters of the call in the session information 2515-a portion of the SIP INVITE message 2500-a or is unable to establish the session for other reasons, the central service may still receive and process the telematics data 2520-a. In the present example, the SIP INVITE message 2500-a may propose an emergency call with a PSAP service 160 based on an automatic or manual trigger in a vehicle. The telematics data 2520-a may include a number of measurements related to the status of the vehicle and/or its occupants and the events triggering the emergency call. As shown in the example of FIG. 25B, the telematics data 2520-*a* may include a status code, a cargo type, a manufacturer specific identifier associated with the terminal, the location of the vehicle, a current or previous velocity of the vehicle, a direction of the vehicle, and a checksum. In certain examples, the telematics data 2520-*a* may include an eCall minimum set of data (MSD) or other standard set of emergency call data—e.g., as defined by a standards or industry organization or on behalf of some country or region.

The SIP INVITE message 2500-*a* may also include a capabilities data object 2530, one example 2530-*a* of which is now described with reference to FIG. 25C. In FIG. 25C, the capabilities data object 2530-*a* includes an XML root header <capabilities>, a plurality of request child XML elements 2535-*a*-1, 2535-*a*-2, 2535-*a*-3, 2535-*a*-4, 2535-*a*-5, 2535-*a*-6, and closes with </capabilities>. Each of the request child XML elements 2535-*a*-1, 2535-*a*-2, 2535-*a*-3, 2535-*a*-4, 2535-*a*-5, 2535-*a*-6 defines an action, together with one or more parameters in some cases.

For example, the first request child XML element 2535-*a*-1 defines an action "msg-static" associated with displaying a static message (e.g., on a radio or infotainment display of a vehicle), and includes an XML attribute as a parameter of the action, with the attribute being a msgid, which may be the highest supported static message. The second request child XML element 2535-*a*-2 defines an action "msg-custom" associated with displaying a custom message (e.g., on a radio or infotainment display of a vehicle), and further specifies that the supported data type is a text data type. The third request child XML element 2535-*a*-3 defines an action "play-audio" associated with causing a radio or audio system of a vehicle to render an audio file, and further specifies that the supported data types include the registered multipurpose internet mail extensions (MIME) audio subtypes of 3gpp, 3gpp2, amr, and evrc. The fourth request child XML element 2535-*a*-4 defines an action "lights-flash" associated with flashing lights of a vehicle. The fourth request child XML element 2535-*a*-4 also specifies which lights the vehicle is capable of flashing (interior, exterior front, exterior rear), and defines a supported duration parameter. The fifth request child XML element 2535-*a*-5 defines an action "send-data" associated with a request for the vehicle to send telematics data to the central service 160, and specifies which sets of data can be sent. The sixth request child XML element defines a supported action "enable camera" associated with activating a camera, and further specifies which cameras are supported (e.g., backup camera, blind spot camera, interior camera, etc.) and the supported transmission formats for the video media (e.g., H.264, 3gpp, 3gpp2).

Note that while FIGS. 25A-25C have described one example in which the capabilities data object 2530 is transmitted in a SIP INVITE message 2500-*a*, in other implementations, the capabilities data object 2530 may be sent in a different message, including in its own message. Also, the XML structure and example actions illustrated in FIG. 25C are provided here as an illustration of one possible implementation, but other data structure formats and additional actions are contemplated herein. Further, while not discussed above for the sake of clarity, it should be understood that the communications between the vehicle and the PSAP may include various security features, such as authentication. For example, when the PSAP request is received within a session initiated by the vehicle as an eCall or other emergency call placed over a cellular network, there is a higher degree of trust that the source is indeed a PSAP. If the PSAP request is received in other situations, such as a call-back, trust issues in verifying that a call-back is indeed from a PSAP are more complex. One approach (applicable regardless of which end initiated the call and the means of the call) is for the PSAP or emergency service provider to sign the body part using a certificate issued by a known emergency services certificate authority and for which the IVS can verify the root certificate.

Figure 26:
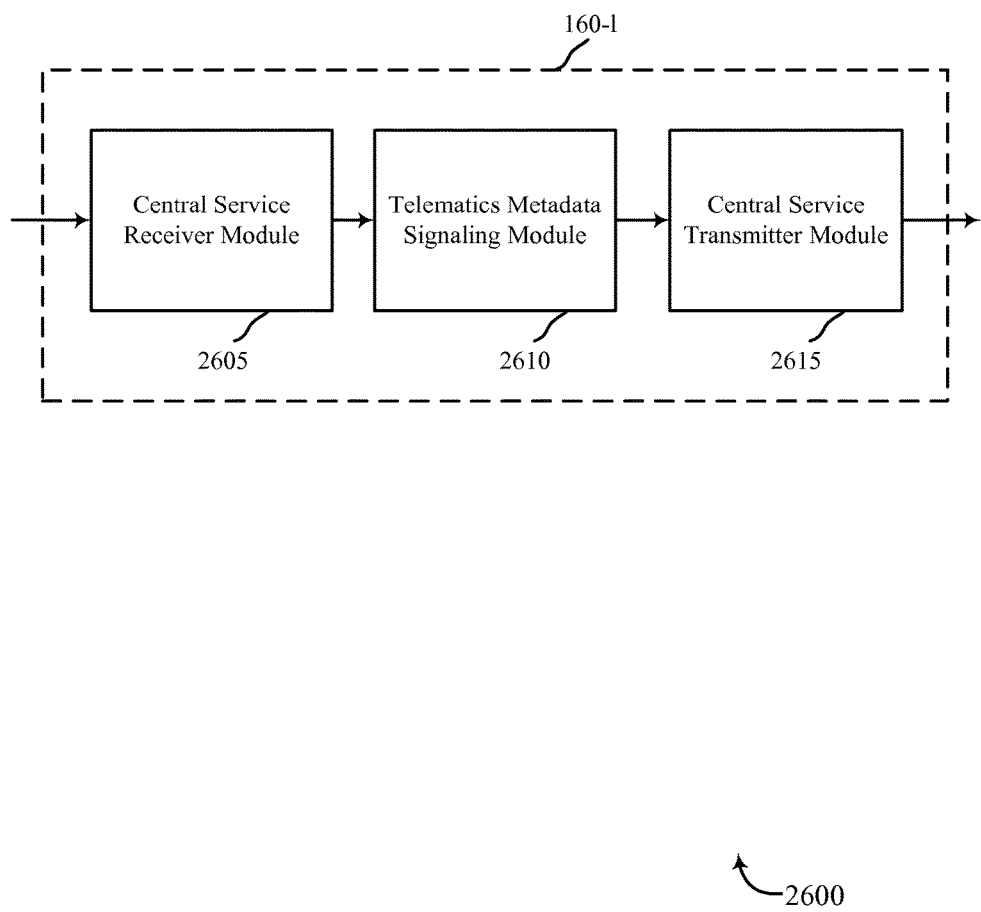
FIG. 26 is a block diagram illustrating an embodiment of a central station, in accordance with various aspects of the present disclosure.

FIG. 26 is a block diagram 2600 illustrating an embodiment of a central service 160-*l*, in accordance with the present disclosure. The central service 160-*l* may be an example of the central service 160 of FIGS. 1A and/or 1B. The central service 160-*l* may include a central service receiver module 2605, a telematics metadata signaling module 2610, and a central service transmitter module 2615. Each of these components may be in communication with each other.

These components of the central service 160-*l* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the central service receiver module 2605 may include a cellular receiver and/or a network interface card (NIC) and may receive communications via the Other IP Services and Networks 175 in FIG. 1B or any other IP connectivity service. In one example, the central service receiver module 2605 may receive a signaling message for a communication signaling protocol that has been adapted to include telematics data. The telematics metadata signaling module 2610 may extract the telematics data from the adapted signaling message. The telematics metadata signaling module 2610 may also adapt a signaling message for a communication signaling protocol to include telematics metadata (which may also include requests for a terminal to take some action). The adapted signaling message for the communication signaling protocol may be transmitted via the central service transmitter module 2615. In another configuration, the central service receiver module 2605 may support the receipt of packet data via wireline means—e.g. from ESRP 111 in FIG. 1B.

Figure 27:
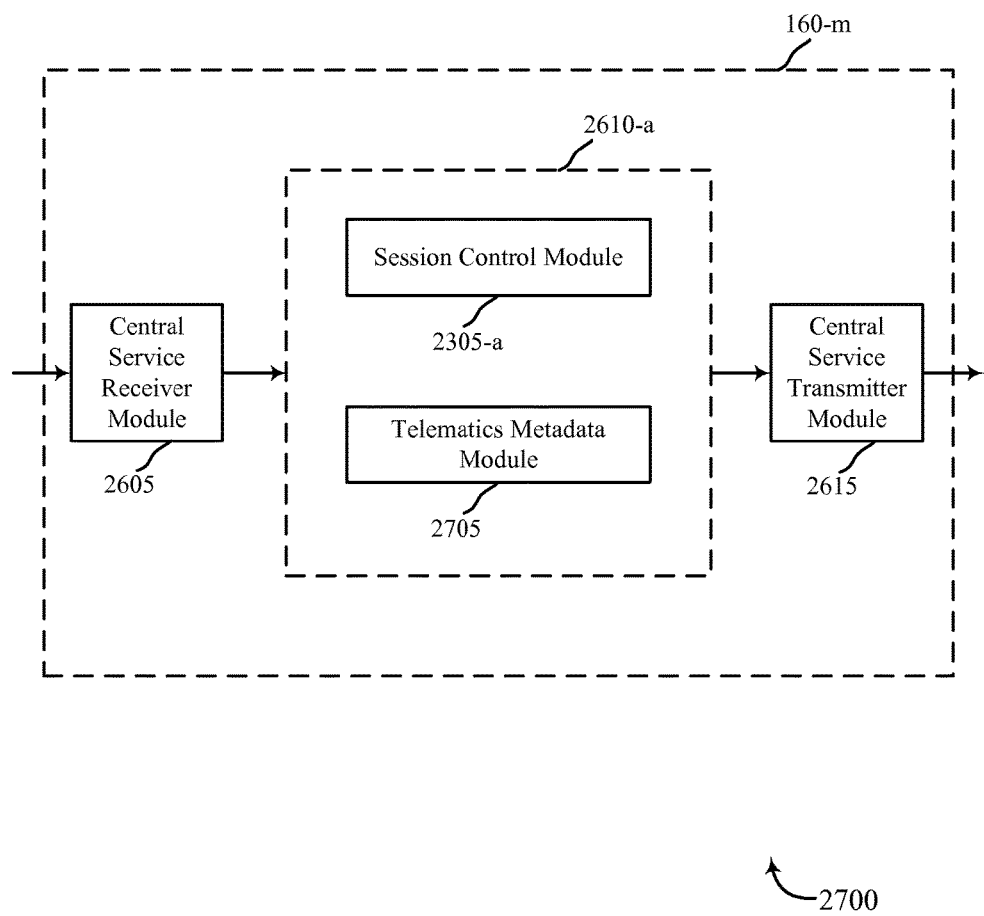
FIG. 27 is a block diagram illustrating an embodiment of a central station, in accordance with various aspects of the present disclosure.

FIG. 27 is a block diagram 2700 illustrating an embodiment to of a central service 160-*m* in accordance with the present disclosure. The central service 160-*m* may be an example of the central services 160 illustrated in FIGS. 1A, 1B, and/or 26. The central service 160-*m* may include a central service receiver module 2605, a telematics metadata signaling module 2610-*a*, and a central service transmitter module 2615, as previously described. Each of these components may be in communication with each other.

These components of the central service 160-*m* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the telematics metadata signaling module 2610-*a* may include a telematics metadata module 2705. The telematics metadata module 2705 may generate and/or obtain telematics metadata. The telematics metadata module 2705 may also receive telematics data. In certain examples, the telematics metadata module 2705 may generate telematics metadata based on received telematics data, and may generate requests to include in the metadata based on a received set of capabilities associated with a terminal.

The telematics metadata signaling module 2610-*a* may also include a session control module 2305-*a*. The session control module 2305-*a* may be an example of the session control module 2305 illustrated in FIGS. 23 and/or 24. In one example, the session control module 305-*a* may obtain a signaling message that includes a set of signal information. The session control module 2305-*a* may also generate a signaling message that includes a set of signal information (which may include requests generated by the telematics metadata module 2705). The session control module 2305-*a* may also be configured to receive a request from a terminal to establish an emergency call. In some embodiments, the set of capabilities corresponding to the terminal may be received together with the request to establish the emergency call. In other embodiments, the set of capabilities is not received together with the request to establish the emergency call, but instead the session control module 305-*a* may be configured to generate a request to be transmitted to the terminal for the terminal to transmit its set of telematics capabilities to the central service 160-*m*.

Figure 28:
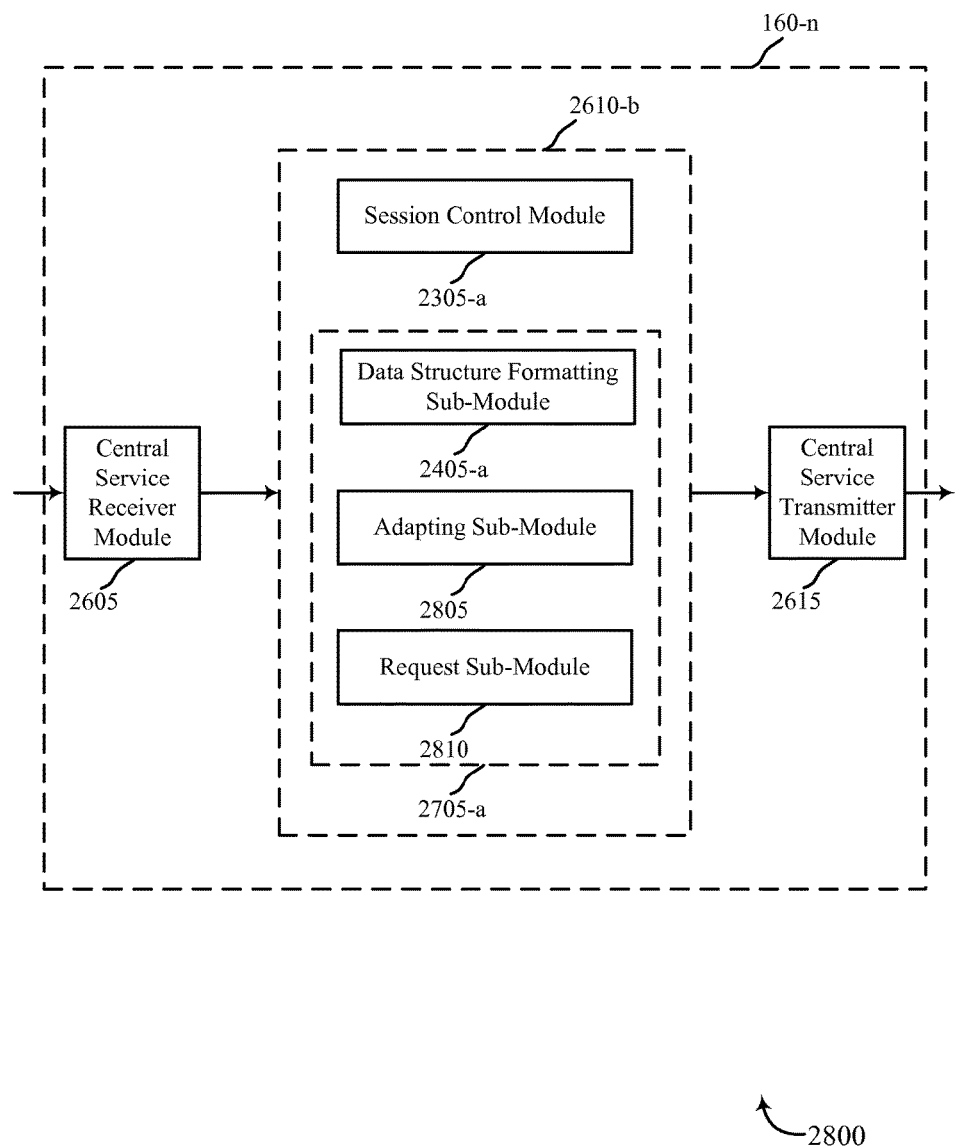
FIG. 28 is a block diagram illustrating an embodiment of a central station, in accordance with various aspects of the present disclosure.

FIG. 28 is a block diagram 2800 illustrating an embodiment of a central service 160-*n* in accordance with the present disclosure. The central service 160-*n* may be an example of the central services 160 illustrated in FIGS. 1A, 1B, 26, and/or 27. In one configuration, the central service 160-*n* may include a central service receiver module 2605, a telematics metadata signaling module 2610-*b*, and a central service transmitter module 2615. Each of these components may be in communication with each other.

These components of the central service 160-*n* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The telematics metadata signaling module 2610-*b* may include a session control module 2305-*a*, which may be an example of the session control module 2305 illustrated in FIG. 27. The session control module 2305-*a* may be configured to negotiate, set up, manage, and terminate communication sessions with the terminal, including generating SIP signaling message header content and SDP content to communicate session-related signaling data with the terminal. The session control module 2305-*a* may also be configured to receive media content (e.g., audio data for a voice call, audio and video data for a video call, text data for a text call), transmit the media content as a stream of packets to the terminal according to the negotiated session, and receive a stream of packets containing media content from the terminal according to the negotiated session.

The telematics metadata signaling module 2610-*b* may also include a telematics metadata module 2705-*a*, which may include a data structure formatting sub-module 2405-*a*, an adapting sub-module 2805, and a request sub-module 2810.

The data structure formatting sub-module 2405-*a* may receive the set of capabilities from the terminal and formulate appropriate requests (e.g., according to the format of the received set of capabilities) to send back to the terminal. For example, if the set of capabilities is received in a nested XML format (e.g., see FIG. 25C), the data structure formatting sub-module 2405-*a* may extract the request child XML elements from the capabilities XML element, and make the request data structures available for the central service 160-*n* to utilize in sending requests to the terminal. Alternatively, the data structure formatting sub-module 2405-*a* may receive the set of capabilities in one format (e.g., JSON) and reformat the set for the central service 160-*n* according to another format (e.g., XML).

The adapting sub-module 2805 may also receive the set of capabilities from the terminal, and may be configured to adapt which types of requests are sent to the terminal based on the received set of capabilities. For example, in one embodiment, if the set of capabilities indicates that the terminal is capable of displaying text, but not playing audio, the adapting sub-module 2805 may adapt what otherwise would have been sent as an audio file into a text file that can be displayed by the terminal. As another example, if no call taker is available at the central service 160-*n* to answer the emergency call, the adapting sub-module 2805 may be configured to send a default set of actions to the terminal including, for example, precautionary measures to increase safety. If, on the other hand, a call taker is available, the adapting sub-module 2805 may parse the received set of capabilities, and present each of the capabilities of the terminal (or an abstraction or generalization of one or a set of capabilities) to the call taker for the call taker to select which commands and which parameters for those commands to send to the terminal.

The request sub-module 2810 may generate requests for the terminal to take certain actions based on the received set of capabilities and/or the received telematics data, as informed by the data structure formatting sub-module 2405-*a*, the adapting sub-module 2805, a call taker, and so forth. The requests may be included in the telematics metadata transmitted to the terminal by the central service transmitter module 2615. The adapting sub-module 2805 or the request sub-module 2810 also may receive a request by a call taker for the vehicle to perform an action or a generalization of an action, and map the request to the specific capabilities of the vehicle. For example, if the respective module (2805/2810) receives a set of vehicle capabilities that includes the ability to flash various flights (perhaps head lamps, running lamps, turn signals, brake lamps, and hazard lamps), the module may generalize the request for presentation to the call taker as "flash vehicle lights," and upon receiving a request by the call taker for the vehicle to perform the generalized or abstracted action, the module may select which capabilities to invoke. So, for example, if the call taker requests the vehicle to flash its lights, the module may use a prioritized or ordered list of lights to select which of the matching capabilities to invoke, or may select without using a list (for example, may choose the first supported lights reported by the vehicle). So, when the caller requests the vehicle to flash lights, and the vehicle is capable of flashing, say, head lamps, running lamps, turn signals, brake lamps, and hazard lamps, the module selects head lamps and brake lamps to flash.

Figure 29A:
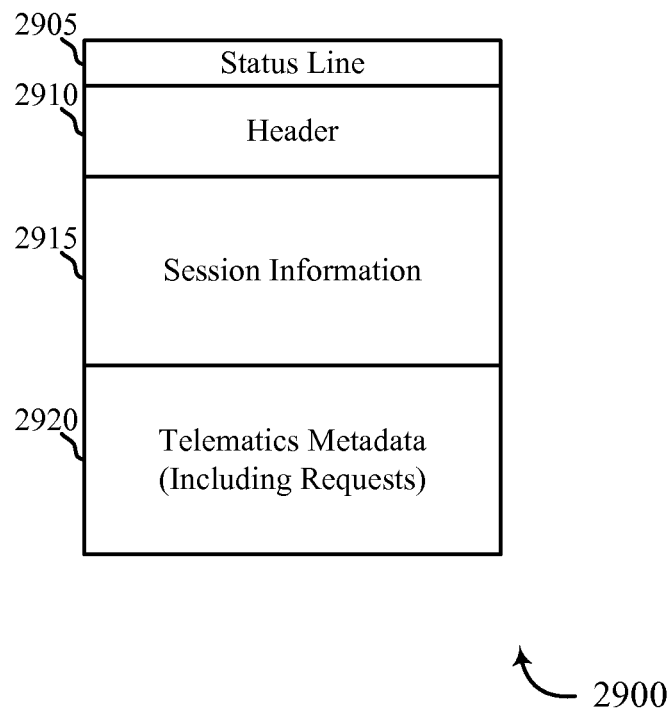
FIG. 29A shows a block diagram of an exemplary message according to a communication session signaling protocol, in accordance with various aspects of the present disclosure.
Figure 29B:
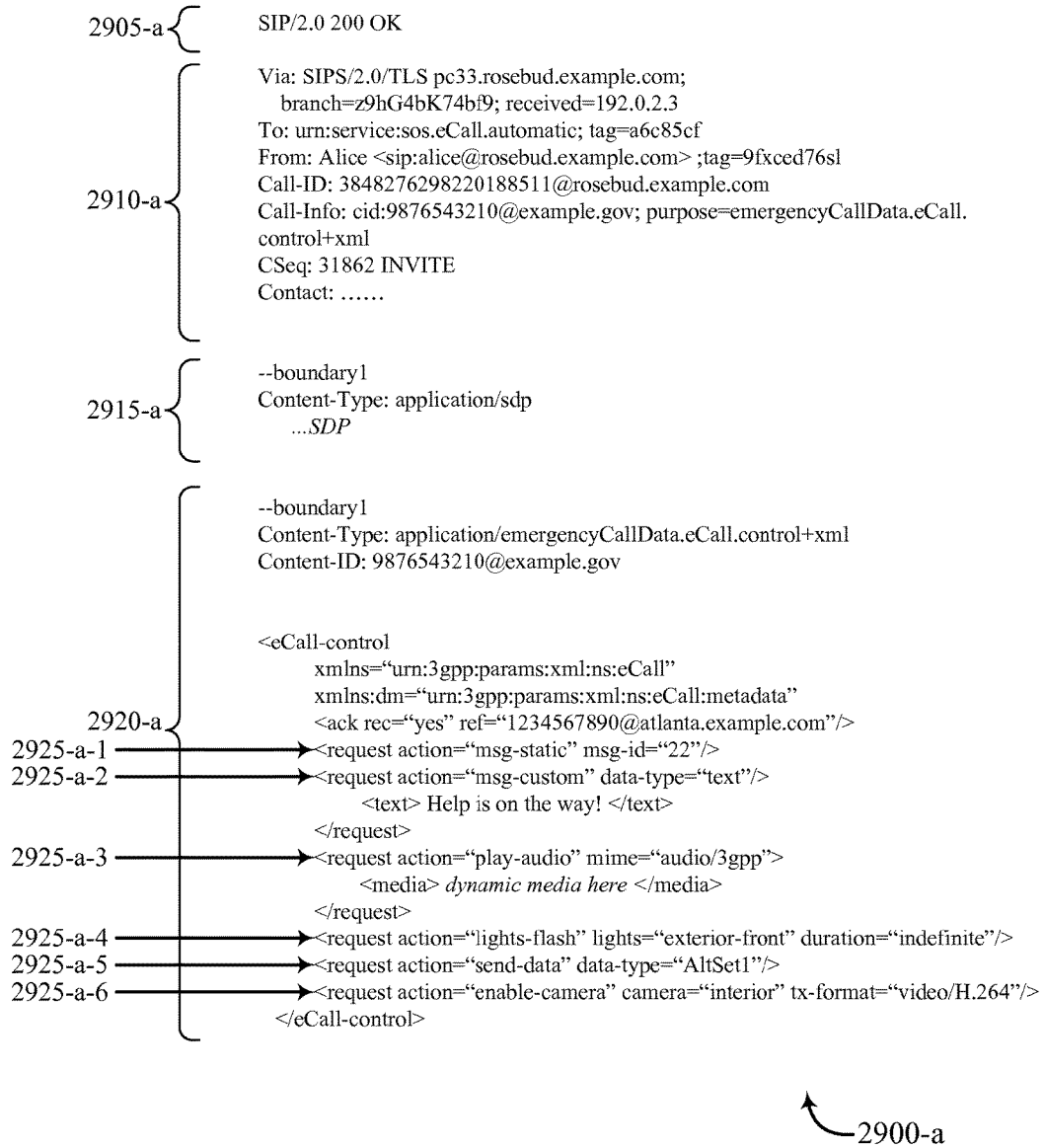
FIG. 29B shows an exemplary message according to a communication session signaling protocol, in accordance with various aspects of the present disclosure.

FIG. 29A and FIG. 29B illustrate examples of a session initiation protocol (SIP) response message that may carry both session data and telematics metadata (including requests for the terminal to take one or more actions). The SIP response message of FIGS. 29A-29B may be transmitted to a terminal 110 from a central service 160 in response to receiving a SIP request message according to the description of FIGS. 25A-25C.

FIG. 29A shows a diagram of an example format 2900 of the response message, and FIG. 29B show an example SIP response messages 2900-$a$ based on the format of FIG. 29A. While the examples of FIG. 29A and FIG. 29B are described with reference to a SIP protocol and an XML data structure, it will be understood that the principles of the present description may be used to modify or extend other communication session signaling protocols (e.g., XMPP, Google Talk, MSN, etc.) or as a basis for new communication session signaling protocols, and may be used to implement other data structures as well.

The SIP response message format 2900 may be used to generate signaling messages in response to SIP request messages. As shown in FIG. 29A, the SIP response message format 2900 may include a status line 2905, a header 2910, a set of session data 2915, and a set of telematics metadata 2920, with the set of telematics metadata 2920 including one or more requests for the terminal to take some action, such as sending telematics data, actuating an external system associated with the terminal, and so forth. The SIP protocol defines a number of response messages, provisional responses, successful responses, redirection responses, and client failure responses. The present format 2900 may be used for each of these message types and for other types of response messages.

In the example of FIG. 29B, a modified SIP 200 (OK) message 2900-$a$ based on the format of FIG. 29A may be used, for example, by a central service in response to receiving the modified SIP INVITE message 2500-$a$ of FIG. 25B to indicate that the central service accepts the proposed session. The SIP 200 (OK) message 2900-$a$ may further provide metadata to the terminal acknowledging receipt of the telematics data transmitted in the SIP INVITE message 2550. The SIP 200 (OK) message 2900-$a$ may also provide additional information (that emergency services have been notified and voice confirmation is pending, for example), metadata (including requests to be performed by the terminal), and so forth.

The status line 2905-$a$ of the example SIP 200 (OK) signaling message 2900-$a$ may identify the message 2900-$a$ as a SIP response and specify the type of response that is being made (e.g., OK). The header 2910-$a$ of the response message may provide the identity of the terminal and the central service, the call identifier, contact information for the terminal and the central service, the call sequence number, an indication of the type(s) of data in the body, and a length of the response message 2900-$a$ message. In the present example, the header 2910-$a$ may specify that the body contains mixed data with the character string "--boundary1" indicating the boundary between the different types of data in the body. In the present example, the body of the message includes both session data 2915-$a$ and telematics metadata 2920-$a$, with the telematics data including one or more requests for the terminal to perform an action.

The session data 2915-$a$ may include of list of agreed upon parameters for the proposed session between the terminal and the central service. These session parameters may be a set of Session Description Protocol (SDP) parameters for the VoIP audio call.

The telematics metadata 2920-$a$ may include information related to the telematics data received at the central service in the SIP INVITE signaling message 2500-$a$. As described previously, the telematics metadata 2920-$a$ may include an acknowledgement of whether the telematics data was received at the central service, a request to retransmit the telematics data, a request to transmit different telematics data, a request to take some other action, auxiliary data describing actions taken by the central service, and/or other relevant telematics metadata. Returning to the example of an emergency call made from a terminal associated with a vehicle to a PSAP service, the telematics metadata 2920-$a$ shown in FIG. 29B may include an acknowledgment that the telematics data was received, a status code or other indication indicating that emergency services have been notified, an indication that a voice call is pending, and so forth.

Turning specifically to the example in FIG. 29B, the telematics metadata 2920-$a$ includes a plurality of requests 2925-$a$-1, 2925-$a$-2, 2925-$a$-3, 2925-$a$-4, 2925-$a$-5, 2925-$a$-6. For illustration purposes, the requests 2925-$a$-1, 2925-$a$-2, 2925-$a$-3, 2925-$a$-4, 2925-$a$-5, 2925-$a$-6 shown in the metadata 2920-$a$ of FIG. 29B correspond to the request child XML elements 2535-$a$-1, 2535-$a$-2, 2535-$a$-3, 2535-$a$-4, 2535-$a$-5, 2535-$a$-6 of the capabilities XML element 2530-$a$- in FIG. 25C. The first request 2925-$a$-1 is a request for the terminal to display the static message with the message ID of 22. It will be appreciated that the format of the first request 2925-$a$-1 in FIG. 29B corresponds to the format of the first request child XML element 2535-$a$-1 in FIG. 25C—i.e., both are in a substantially identical XML format, with the only exception being that the first request 2925-$a$-1 is a child XML element within the eCall-request XML element in FIG. 29B instead of being a child XML element within the capabilities XML element 2530-$a$ in FIG. 5C. It will be appreciated, however, that the first request 2925-$a$-1 need not be included as a child element, but could be its own root element as well.

The second request 2925-$a$-2 in FIG. 29B corresponds to the second request child XML element 2535-$a$-2 in FIG. 25C, and is a request for the terminal to display a custom message, with the message being provided as a child XML element within the second request 2925-$a$-2 as a text format as specified by the second request child XML element 2535-$a$-2 in the set of capabilities transmitted to the central service from the terminal. Similarly, the third request 2925-$a$-3 in FIG. 29B corresponds to the third request child XML element 2535-$a$-3 in FIG. 25C, and is a request for the terminal to play an audio file, with the audio being provided as a child XML element within the third request 2925-$a$-3 in a 3gpp format as specified by the third request child XML element 2535-$a$-3 in the set of capabilities transmitted to the central service from the terminal.

The fourth request 2925-$a$-4 in FIG. 29B corresponds to the fourth request child XML element 2535-$a$-4 in FIG. 25C, and is a request for the terminal to flash the exterior and front lights of the vehicle for an indefinite duration, with the selection of lights and duration being provided as XML attributes within the fourth request 2925-$a$-4 as specified by the fourth request child XML element 2535-$a$-4 in the set of capabilities transmitted to the central service from the terminal. The fifth request 2925-$a$-5 in FIG. 29B corresponds to the fifth request child XML element 2535-$a$-5 in FIG.

25C, and is a request for the terminal to send an alternate set of data to the central service, type of data to be transmitted being provided as an XML attribute within the fifth request 2925-*a*-5 as specified by the fifth request child XML element 2535-*a*-5 in the set of capabilities transmitted to the central service from the terminal. The sixth request 2925-*a*-6 in FIG. 29B corresponds to the sixth request child XML element 2535-*a*-6 in FIG. 25C, and is a request for the terminal to enable an interior camera and transmit the video feed in an H.264 format, with the selection of the camera and transmission format being provided as XML attributes within the sixth request 2925-*a*-6 as specified by the sixth request child XML element 2535-*a*-6 in the set of capabilities transmitted to the central service from the terminal. The transmission of the video feed may be performed by using a SIP re-INVITE, in which case the transmission format may be negotiated using SDP attributes; the transmission format may be omitted from the request or the initial set of SDP attributes in the re-INVITE may be based on the transmission format indicated in the request.

While the examples of FIGS. 25A, 25B, 25C, 29A, and 29B illustrate examples of SIP request messages carrying telematics data and metadata using an XML data structure, it will be recognized by those skilled in the art that other communication session signaling protocols and other data structure formats may be used.

Figure 30:
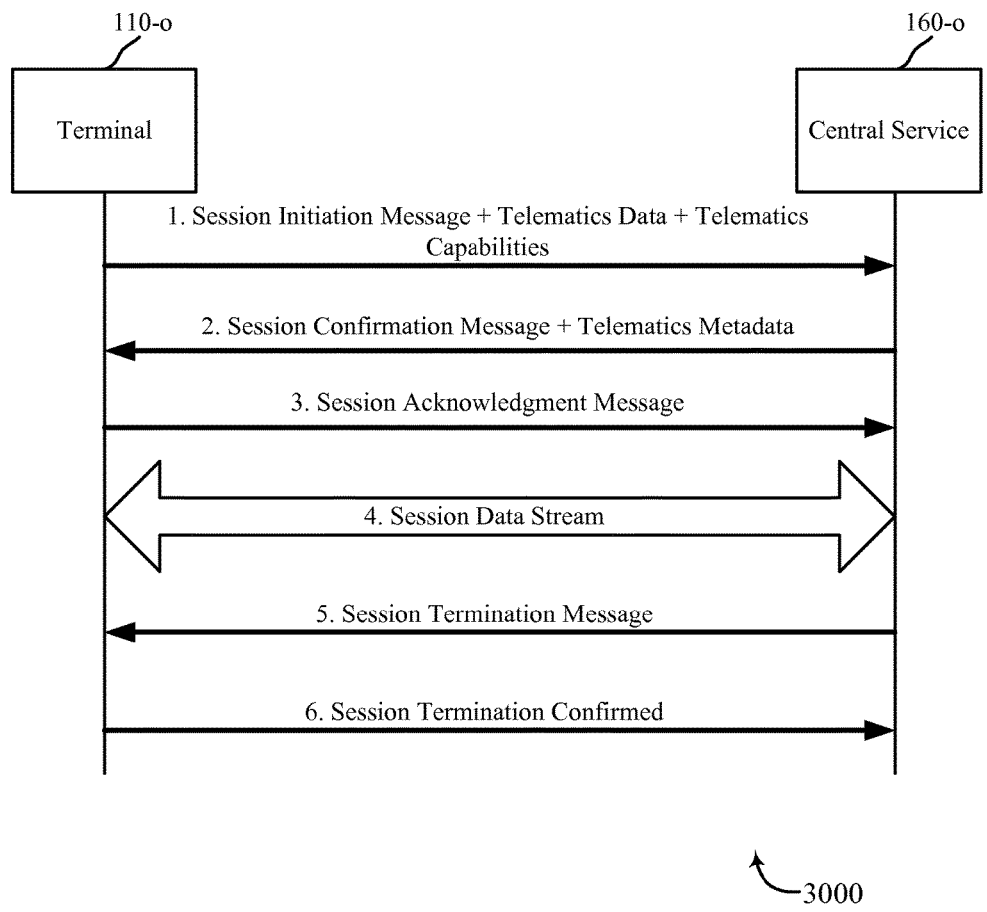
FIG. 30 shows a diagram of an exemplary communications exchange between a terminal and a server.

FIG. 30 is a diagram of one example of a communications exchange between a terminal 110-*o* and a central service 160-*o* for the exchange of telematics data, capabilities, and telematics metadata (including requests from the central service 160-*o* that the terminal 110-*o* take some action) using a communication session signaling protocol. Terminal 110-*o* may be an example of the terminals 110 described above, and central service 160-*o* may be an example of the central services 160 described above. In certain examples, central service 160-*o* may be implemented by one or more servers.

The communication session signaling protocol may be an application layer protocol designed to be independent of the underlying transport layer. As such, in certain examples the communication session signaling protocol may be compatible with a number of different transport layer protocols. In certain examples, one or more proxy servers may be disposed as intermediaries between terminal 110-*o* and central service 160-*o* such that initial signaling messages between terminal 110-*o* and central service 160-*o* may be forwarded between one or more of the proxy servers. For the sake of clarity, such proxy servers are not shown in the Figures associated with the present description. It is noted that there may be other (e.g., additional) entities that receive, forward, regenerate, alter, or are otherwise involved in the message exchange (for example, in the case of SIP messaging, back to back user agents, session border controllers, etc.). In FIG. 30 the communication session signaling protocol may be SIP, XMPP, Google Talk, Skype etc. and the underlying transport protocols may be User Datagram Protocol (UDP) over IP or Transmission Control Protocol (TCP) over IP or some other set of transport protocols.

The terminal 110-*o* may communicate with the central service over the communication session signaling protocol to set up and manage a communication session. The terminal 110-*o* and the central service 160-*o* may communicate to establish a session for an emergency call (carrying voice and/or other media) between a user associated with terminal 110-*o* and an operator associated with central service 160-*o* (which may be an automated operator or a human operator). As shown in FIG. 30, terminal 110-*o* may transmit a session initiation signaling message to central service 160-*o*. The session initiation signaling message may invite central service 160-*o* to participate in an emergency call session with terminal 110-*o*. Terminal 110-*o* may transmit the session initiation message in response to a manual request from a user associated with terminal 110-*o*. For example, an occupant of a vehicle associated with terminal 110-*o* may press an emergency call button in the vehicle that signals terminal 110-*o* to invite central service 160-*o* to the VoIP session. Additionally or alternatively, terminal 110-*o* may automatically transmit the session initiation message to central service 160-*o* in response to one or more detected or inferred conditions or events (e.g., airbags deployed, collision sensor, engine diagnostic data, engine fire, vehicle fire, rollover, or other situation, etc.).

The session initiation message may include details and parameters for the proposed session (e.g., network addresses, port numbers, type of media, timing, streaming protocols supported, bandwidth, etc.). In addition to this set of session data for the proposed session between terminal 110-*o* and central serviced 160-*o*, terminal device 110-*o* may append (e.g., add) telematics data to the session initiation message transmitted to central service 160-*o*. The telematics data may include readings from one or more sensors in communication with terminal 110-*o* and/or other data stored, determined, calculated, and/or received by terminal 110-*o*. In certain examples, the telematics data may include data typically transmitted to a PSAP during an eCall or other emergency call. For example, the telematics data may include at least one or more of: how the eCall was initiated, a vehicle type and vehicle identification number (VIN), a timestamp, a position estimate and position confidence flag, the direction of travel, the number of passengers (e.g., from seat occupancy sensors) and associated data (e.g., seats with fastened seatbelts), a service provider for the terminal (if any), a trigger type (e.g., deployed airbags, bumper sensors, fire indicators, rollover, or other situation detection, etc.), and/or other relevant information that may suit a particular application of the principles described herein.

The terminal 110-*o* may also transmit a set of telematics capabilities together with the session initiation message and telematics data in some examples. The telematics capabilities may include, for example, actions that the terminal 110-*o* is capable of performing, including sending (additional) telematics data or performing some physical action at the terminal 110-*o*, as described above.

Upon receiving the session initiation message with the appended telematics data, central service 160-*o* may determine whether to accept or reject the proposed session. In the present example, central service 160-*o* may transmit a session confirmation message over the communication session signaling protocol indicating that the proposed session is accepted in addition to providing further parameters and data for the session. Additionally, the session confirmation message transmitted to terminal 110-*o* may include a set of telematics metadata, which may include an acknowledgement of whether the telematics data was received at the central service 160-*o*, a request to retransmit the telematics data (e.g., the previous version and/or a current version) to the central service 160-*o*, a request to transmit different telematics data to the central service 160-*o*, a request to take some other action (e.g., actuating an external system), auxiliary data describing actions taken by the central service 160-*o*, and/or other relevant telematics metadata. In alternative examples, the central service 160-*o* may transmit the telematics metadata, including action requests, to the terminal 110-*o* in a separate message (e.g., in a communication session signaling protocol message specifically used to transmit the telematics metadata, appended to a different type of communication session signaling protocol message, etc.).

Terminal 110-o may receive the telematics metadata and take actions requested by the central service 160-o based on the received telematics metadata. In certain examples, the telematics metadata may simply confirm receipt of the telematics data, and terminal 110-o may take no action in response to the telematics metadata. In other examples, terminal 110-o may respond to a request in the telematics metadata from central service 160-o or consult a set of rules to identify an action to take based on the received telematics metadata.

Additionally, terminal 110-o may establish a data session (e.g., VoIP) with central service 160-o based on the session data and parameters in both the session initiation message and the session confirmation message. Terminal 110-o and central service 160-o may exchange streams of packets containing voice and/or other media data using Real-time Transport Protocol (RTP) or another streaming protocol to implement a call (carrying voice and/or other media) between the user of terminal 110-o and the operator of central service 160-o. The data session may carry any media including text, both message-at-a-time text (such as instant messaging) and character-at-a-time (streaming text, often called real-time text), and/or video. It is noted that while most media is streamed, the VoIP session may also carry non-streamed media either in addition to or instead of streamed media.

At any time while the data session is established between the central service 160-o and the terminal 110-o, additional requests may be provided by the central service 160-o to the terminal 110-o. However, it will be appreciated that the set of capabilities may not need to be transmitted again for the session illustrated in FIG. 30 because the central service 160-o may store the received set of capabilities associated with the terminal 110-o. Upon the termination of the data session, and the reestablishment of a new session, however, the terminal 110-o may again send a set of capabilities to the central service 160-o. In other embodiments, the terminal 110-o may send updated sets of capabilities (either the entire set or simply a set of changes in the capabilities) to the central service 160-o during the same or different data sessions.

Returning to FIG. 30, to conclude the VoIP session, central service 160-o may transmit a session termination signaling message to terminal 110-o over the communication session signaling protocol. Upon receiving the session termination signaling message, terminal 110-o may transmit a session termination confirmation signaling message to central service 160-o, and the session may terminate.

Figure 31:
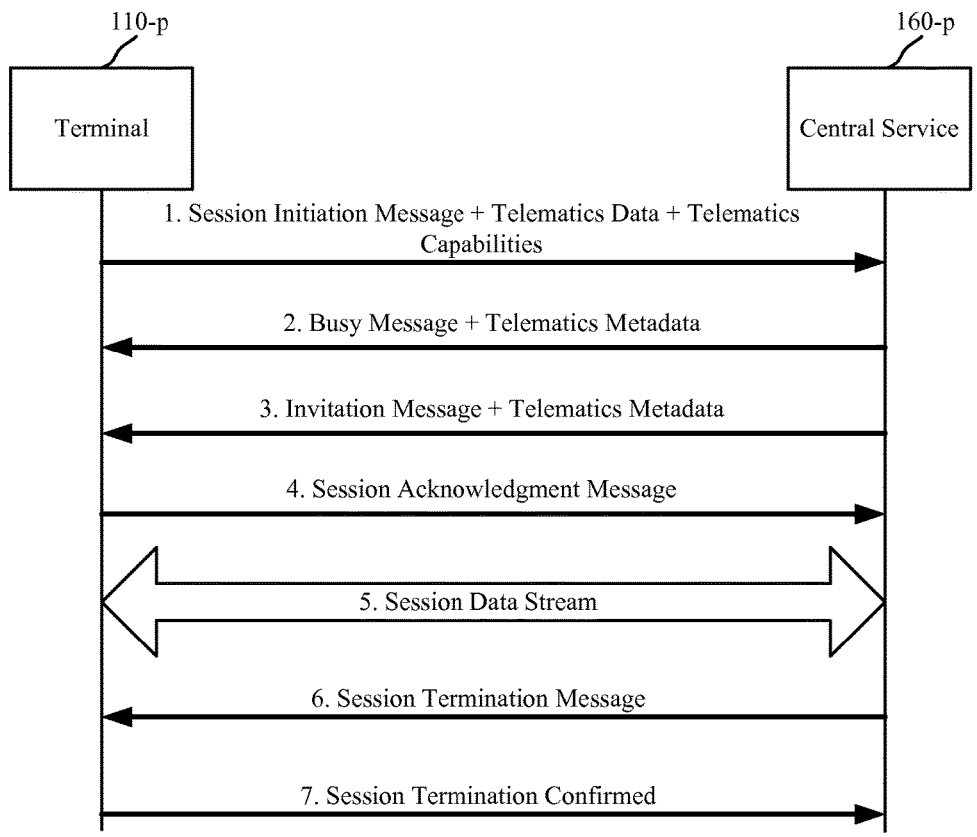
FIG. 31 shows a diagram of an exemplary communications exchange between a terminal and a server, in accordance with various aspects of the present disclosure.

FIG. 31 is a diagram of an example of a communications exchange 3100 between a terminal 110-p and a central service 160-p using a communication session signaling protocol to exchange telematics data, capabilities, and telematics metadata (including requests). Terminal 110-p may be an example of the terminal 110 of FIG. 1A or one of the other terminals 110 described above with reference to previous Figures. Central service 160-p may be an example of the central service (e.g., PSAP) 160 of FIG. 1A or one of the other central services 160 described above with reference to previous Figures.

The communications exchange 3100 shown in FIG. 31 is similar to the communications exchange 3000 shown in FIG. 30, except that in FIG. 31, in response to receiving the session initiation message, the telematics data, and the telematics capabilities, the central service 160-p responds with a busy message, optionally with some telematics metadata (e.g., requests to perform safety-related actions, display informative messages to the vehicle occupants, etc.). At some point later in time—e.g., when an operator is available to assist with the emergency call—the central service transmits an invitation message to the terminal 110-p, optionally with additional telematics metadata. The terminal 110-p may respond by transmitted a session acknowledgment message, but in at least some embodiments may not need to resend the telematics capabilities data because it has already been sent and received by the central service with the initial session initiation message. In other embodiments, the terminal 110-p may nonetheless retransmit the capabilities to the central service 160-p. In some situations, the central service may send intermediate messages (not associated with a session) to the terminal between when the central service responds with a busy message and when it transmits an invitation message.

Figure 32:
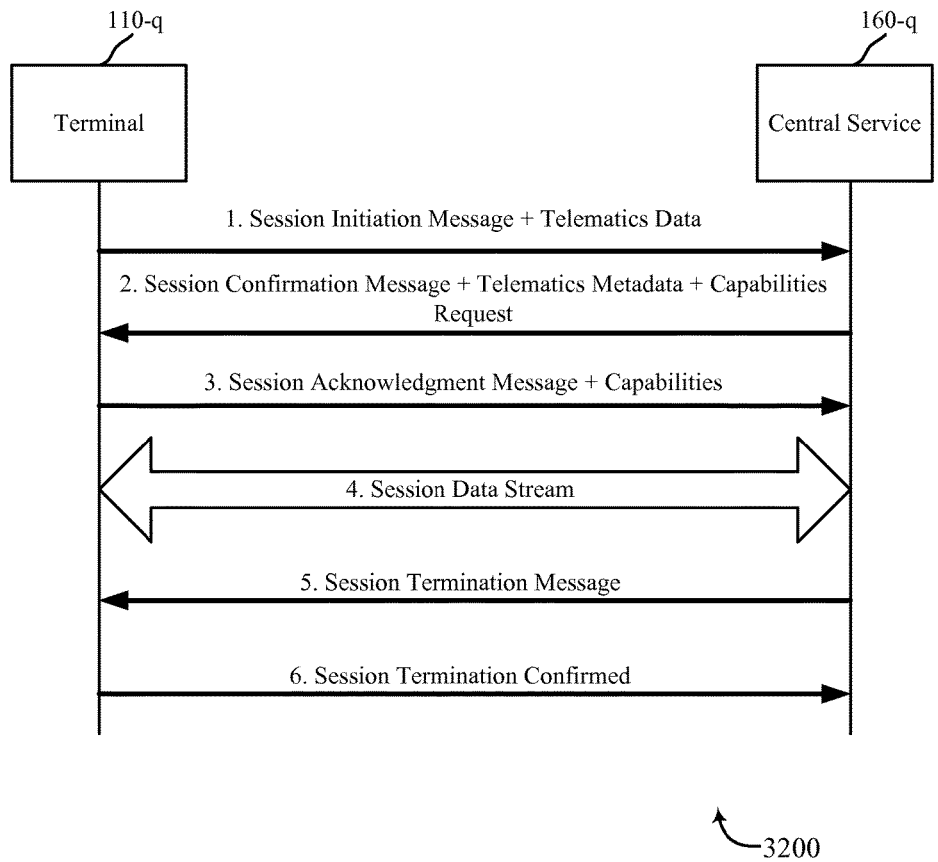
FIG. 32 shows a diagram of an exemplary communications exchange between a terminal and a server, in accordance with various aspects of the present disclosure.

FIG. 32 is a diagram of an example of a communications exchange 3200 between a terminal 110-q and a central service 160-q using a communication session signaling protocol to exchange telematics data, capabilities, and telematics metadata (including requests). Terminal 110-q may be an example of the terminal 110 of FIG. 1A or one of the other terminals 110 described above with reference to previous Figures. Central service 160-q may be an example of the central service (e.g., PSAP) 160 of FIG. 1A or one of the other central services 160 described above with reference to previous Figures.

The communications exchange 3200 shown in FIG. 32 is similar to the communications exchanges 3000, 3100 shown in FIGS. 30 and 31, except that in FIG. 32, the set of telematics capabilities is not transmitted to the central service 160-q with the initial session initiation message and telematics data, but is instead sent together with the session acknowledgment message in response to a request from the central service for the terminal to transmit its set of capabilities.

Figure 33:
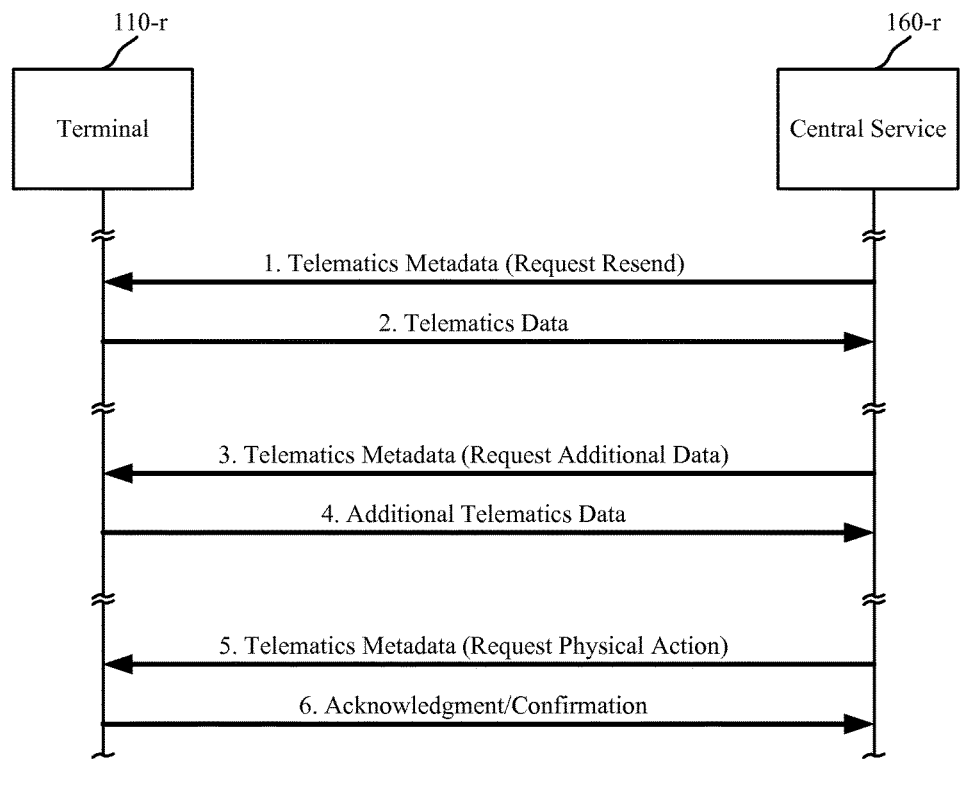
FIG. 33 shows a diagram of an exemplary communications exchange between a terminal and a server, in accordance with various aspects of the present disclosure.

FIG. 33 is a diagram of an example of a communications exchange 3300 between a terminal 110-r and a central service 160-r using a communication session signaling protocol to exchange telematics data, capabilities, and telematics metadata (including requests). Terminal 110-r may be an example of the terminal 110 of FIG. 1A or one of the other terminals 110 described above with reference to previous Figures. Central service 160-r may be an example of the central service (e.g., PSAP) 160 of FIG. 1A or one of the other central services 160 described above with reference to previous Figures.

The communications exchange 3300 shown in FIG. 33 illustrates several examples of the types of requests that the central service 160-r may send to the terminal 110-r, and the responses the terminal 110-r may send back to the central service. For example, if the telematics metadata sent from the central service 160-r to the terminal 110-r includes a request to resend certain telematics data, the terminal 110-r may respond by resending the requested telematics to the central service 160-r. If, on the other hand, the telematics metadata sent from the central service 160-r to the terminal 110-r includes a request to send additional or different telematics data, the terminal 110-r may response by sending the requested additional or different telematics data to the central service 160-r. If, as another example, the telematics data sent from the central service 160-r to the terminal 110-r includes a request to perform a physical action, the terminal 110-r may respond by performing that action and optionally sending an acknowledgment of receiving the request and/or a confirmation that the action was performed by the terminal 110-*r*, or if unable to perform the action, by sending a confirmation that the action was not performed by the terminal 110-*r*.

Figure 34:
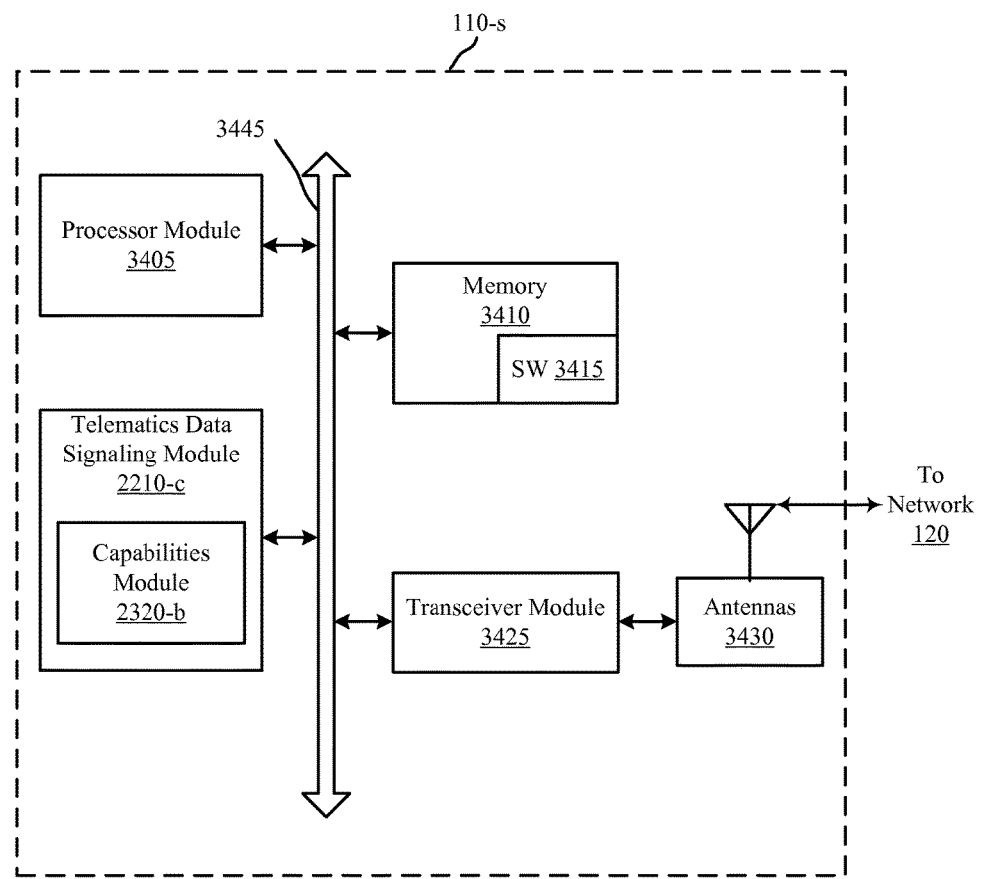
FIG. 34 shows a block diagram of an exemplary terminal in a wireless communications system, in accordance with various aspects of the present disclosure.

FIG. 34 shows a diagram of a terminal 110-*s* accordance with various embodiments. Terminal 110-*s* may be an example of one or more aspects of the terminals 110 describe above. The terminal 110-*s* shown in FIG. 34 includes antennas 3430, a transceiver module 3425, a processor module 3405, and memory 3410 (including software 3415), which each may communicate, directly or indirectly, with each other (e.g., via one or more buses 3445).

The transceiver module 3425 may be configured to communicate bi-directionally, via the antenna(s) 3430 and/or one or more wireless communication links, with the network 120 (which may provide a connection to the central service, as described above with reference to FIGS. 1A and 1B). The transceiver module 3425 may include a modem configured to modulate the packets and provide the modulated packets to the antenna(s) 3430 for transmission, and to demodulate packets received from the antenna(s) 3430. While the terminal 110-*s* may include a single antenna 3430 in some embodiments, the terminal 110-*s* may alternatively include multiple antennas 3430 capable of concurrently transmitting and/or receiving multiple wireless transmissions in other embodiments. The terminal 110-*s* may thus be capable of concurrently communicating with one or more network 120 entities.

The memory 3410 may include random access memory (RAM) and/or read-only memory (ROM). The memory 3410 may store computer-readable, computer-executable software/firmware code 3415 containing instructions that are configured to, when executed, cause the processor module 3405 to perform various functions described herein (e.g., transmitting a set of capabilities, receiving requests to perform actions, etc.). Alternatively, the software/firmware code 3415 may not be directly executable by the processor module 3405 but be configured to cause a computer (e.g., when compiled and executed) to perform functions described herein. The processor module 3405 may include an intelligent hardware device, e.g., a central processing unit (CPU), a microcontroller, an application-specific integrated circuit (ASIC), etc. may include random access memory (RAM) and read-only memory (ROM).

The terminal 110-*s* in FIG. 34 also includes telematics data signaling module 2210-*c*, which may be an example of the telematics data signaling modules 2210 described above. The telematics data signaling module 2210-*c* includes a capabilities module 2320-*b* which, again, may be an example of the capabilities modules 2320 described above.

Figure 35:
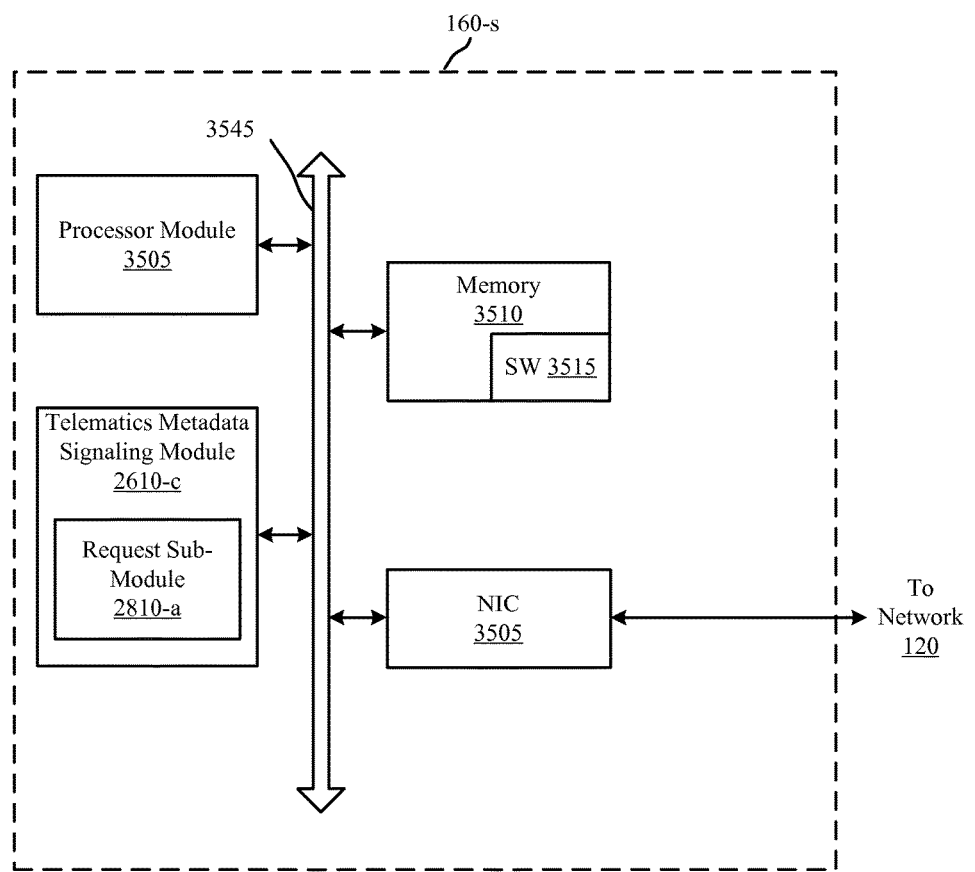
FIG. 35 shows a block diagram of an exemplary central service in a wireless communications system, in accordance with various aspects of the present disclosure.

FIG. 35 shows a diagram of a central service (e.g., PSAP) 160-*s* accordance with various embodiments. Central service 160-*s* may be an example of one or more aspects of the central services 160 describe above. The central service 160-*s* shown in FIG. 35 includes a network interface controller (NIC) 3505, a processor module 3505, and memory 3510 (including software 3515), which each may communicate, directly or indirectly, with each other (e.g., via one or more buses 3545).

The NIC 3505 may be configured to communicate bi-directionally with the network 120 (which may provide a connection to one or more terminals, as described above with reference to FIGS. 1A and 1B). The memory 3510 may include random access memory (RAM) and/or read-only memory (ROM). The memory 3510 may store computer-readable, computer-executable software/firmware code 3515 containing instructions that are configured to, when executed, cause the processor module 3505 to perform various functions described herein (e.g., receiving a set of capabilities, transmitting requests to perform actions, etc.). Alternatively, the software/firmware code 3515 may not be directly executable by the processor module 3505 but be configured to cause a computer (e.g., when compiled and executed) to perform functions described herein. The processor module 3505 may include an intelligent hardware device, e.g., a central processing unit (CPU), a microcontroller, an application-specific integrated circuit (ASIC), etc. may include random access memory (RAM) and read-only memory (ROM).

The central service 160-*s* in FIG. 15 also includes telematics metadata signaling module 2610-*c*, which may be an example of the telematics metadata signaling modules 2610 described above. The telematics metadata signaling module 2610-*c* includes a request sub-module 2810-*a* which, again, may be an example of the request sub-module 2810 described above.

Figure 36:
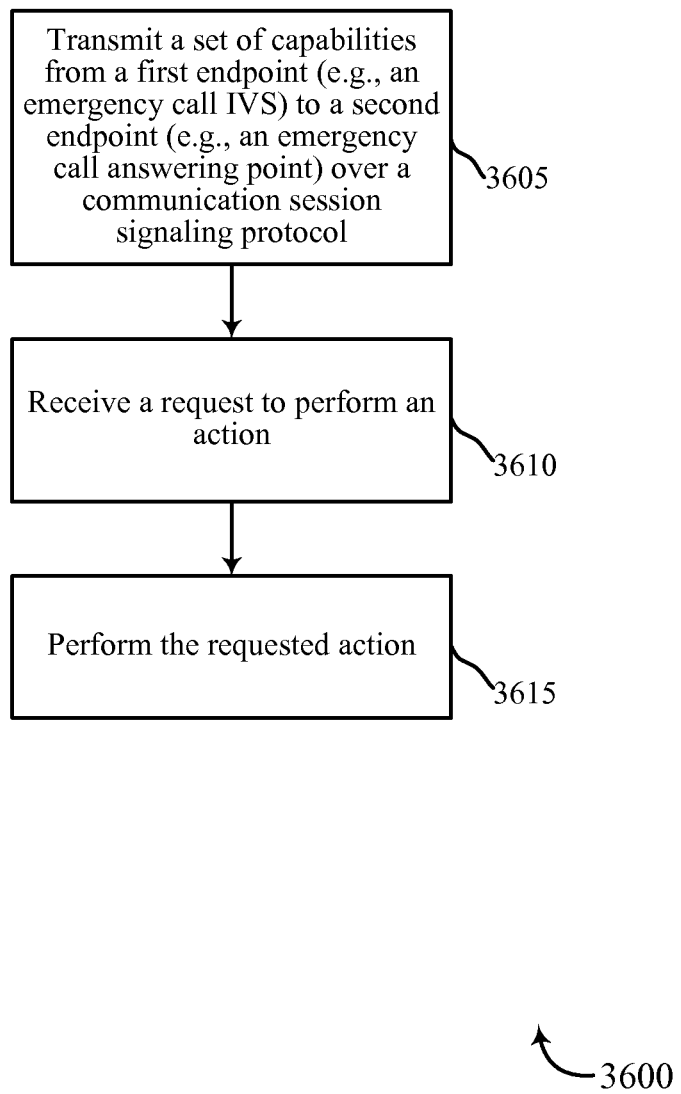
FIG. 36 is a flowchart of an exemplary method for asserting support for telematics capabilities in vehicle emergency call systems, in accordance with various aspects of the present disclosure.

FIG. 36 is a flow chart illustrating an example of a method 3600 for asserting support for telematics capabilities in vehicle emergency call systems, in accordance with various aspects of the present disclosure. For clarity, the method 3600 is described below with reference to aspects of one or more of the terminals 110 described above. In some examples, a terminal 110 may execute one or more sets of codes to perform the functions described below. Additionally or alternatively, the terminal 110 perform one or more of the functions described below using special-purpose hardware.

At block 3605, the method 3600 may include transmitting a set of capabilities from a first endpoint (e.g., an emergency call IVS) to a second endpoint (e.g., an emergency call answering point) over a communication session signaling protocol. In one embodiment, the set of capabilities may include one or more actions that a terminal (e.g., the emergency call IVS) can perform, and the communication session signaling protocol may be SIP, as described above. At block 3610, the method 3600 may include receiving a request to perform an action—for example, a request from the emergency call answering point to perform an action. At block 3615, the method 3600 may include performing the requested action. The operations at blocks 3605-3615 may be carried out by the telematics data signaling modules 2210 described above.

It should be noted that the method 3600 is just one implementation and that the operations of the method 3600 may be rearranged or otherwise modified such that other implementations are possible.

Figure 37:
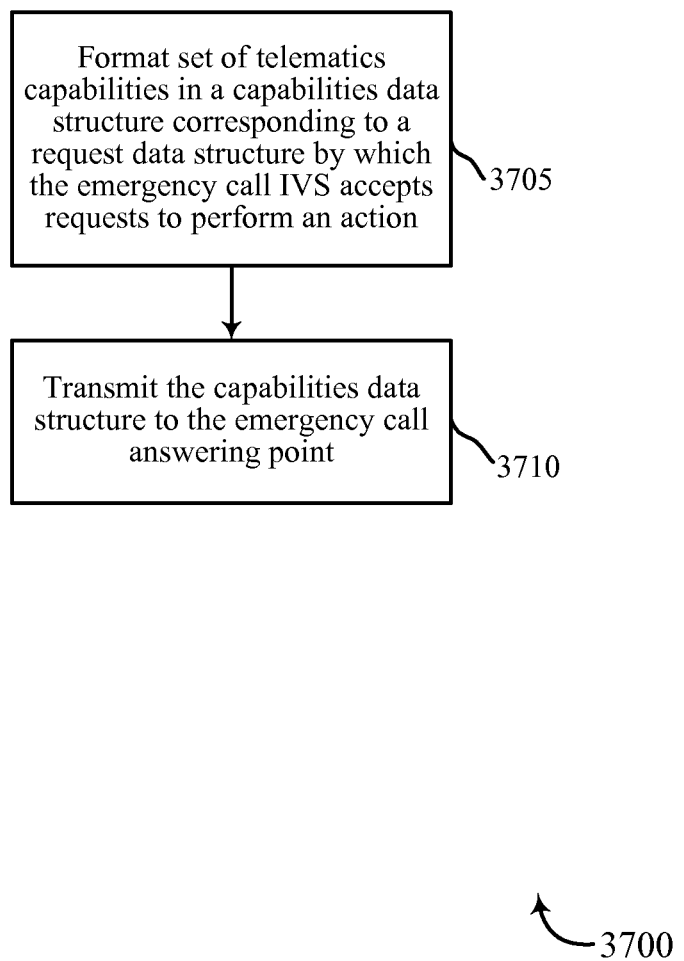
FIG. 37 is a flowchart of an exemplary method for asserting support for telematics capabilities in vehicle emergency call systems, in accordance with various aspects of the present disclosure.

FIG. 37 is a flow chart illustrating an example of a method 3700 for asserting support for telematics capabilities in vehicle emergency call systems, in accordance with various aspects of the present disclosure. For clarity, the method 3700 is described below with reference to aspects of one or more of the terminals 110 described above. In some examples, a terminal 110 may execute one or more sets of codes to perform the functions described below. Additionally or alternatively, the terminal 110 perform one or more of the functions described below using special-purpose hardware.

At block 3705, the method 3700 may include formatting a set of capabilities in a capabilities data structure corresponding to a request data structure by which an emergency call IVS of a terminal accepts requests to perform an action. At block 3710, the method 3700 may include transmitting the capabilities data structure to a central service such as an emergency call answering point. The operations at blocks 3705-3710 may be carried out by the telematics data signaling modules 2210 described above.

It should be noted that the method 3700 is just one implementation and that the operations of the method 3700 may be rearranged or otherwise modified such that other implementations are possible.

Figure 38:
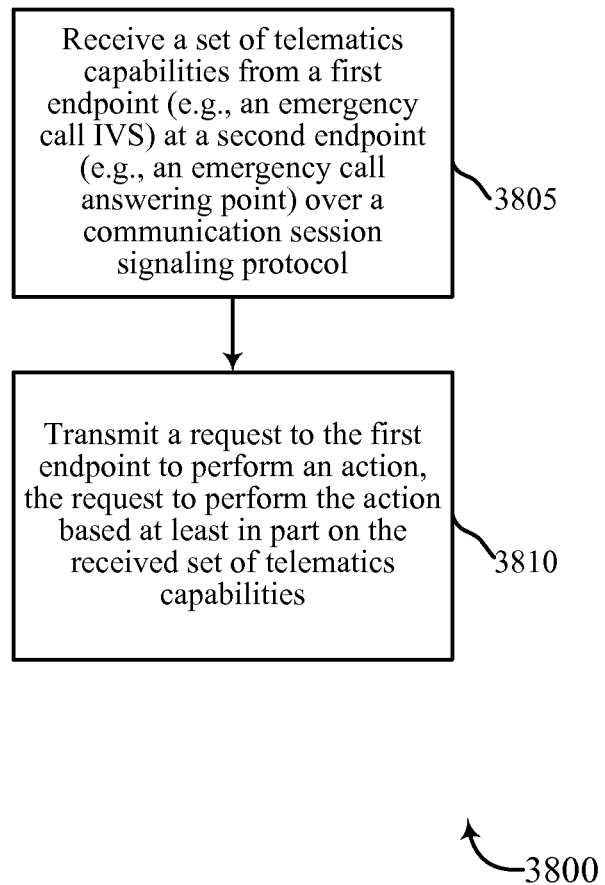
FIG. 38 is a flowchart of an exemplary method for asserting support for telematics capabilities in vehicle emergency call systems, in accordance with various aspects of the present disclosure.

FIG. 38 is a flow chart illustrating an example of a method 3800 for receiving and acting upon an assertion of telematics capabilities, in accordance with various aspects of the present disclosure. For clarity, the method 3800 is described below with reference to aspects of one or more of the central services 160 described above. In some examples, a central service 160 may execute one or more sets of codes to perform the functions described below. Additionally or alternatively, the central service 160 may perform one or more of the functions described below using special-purpose hardware.

At block 3805, the method 3800 may include receiving a set of capabilities from a first endpoint (e.g., an emergency call IVS) at a second endpoint (e.g., an emergency call answering point) over a communication session signaling protocol. In one embodiment, the set of capabilities may include one or more actions that a terminal (e.g., the emergency call IVS) can perform, and the communication session signaling protocol may be SIP, as described above. At block 3810, the method 3800 may include transmitting a request to perform an action—for example, a request from the emergency call answering point to perform an action. The operations at blocks 3805-3810 may be carried out by the telematics metadata signaling modules 2610 described above.

It should be noted that the method 3800 is just one implementation and that the operations of the method 3800 may be rearranged or otherwise modified such that other implementations are possible.

In some examples, aspects from two or more of the methods 3600, 3700, 3800 may be combined. It should be noted that the methods 3600, 3700, and 3800 are just example implementations, and that the operations of the methods 3600, 3700, and 3800 may be rearranged or otherwise modified such that other implementations are possible.

In some embodiments, IP-based emergency services mechanisms may be used to support emergency calls placed by vehicles (automatically in the event of a crash or serious incident, or manually invoked by a vehicle occupant) and to convey vehicle, sensor, and location data related to the crash or incident. Such calls may be referred to as "Automatic Crash Notification" (ACN), or "Advanced Automatic Crash Notification" (AACN), even in the case of manual trigger. The "Advanced" qualifier may refer to the ability to carry a richer set of data.

Also, a MIME Content Type and an Emergency Call Additional Data Block may be registered for the vehicle, sensor, and location data (which may be referred to as "crash data" even though there is not necessarily a crash). An example of an external specification for the data format, contents, and structure are also described herein.

In the present disclosure, the following abbreviations may be used: 3GPP: 3rd Generation Partnership Project; AACN: Advanced Automatic Crash Notification; ACN: Automatic Crash Notification; APCO: Association of Public-Safety Communications Officials; EENA: European Emergency Number Association; ESInet: Emergency Services IP network; GNSS: Global Satellite Navigation System (which includes the various such systems including the Global Positioning System or GPS); IVS: In-Vehicle System; MNO: Mobile Network Operator; NENA: National Emergency Number Association; TSP: Telematics Service Provider; VEDS: Vehicle Emergency Data Set Emergency calls made by in-vehicle systems (e.g., in the event of a crash) may assist in significantly reducing road deaths and injuries by allowing emergency services to respond quickly and often with better location.

Vehicle occupants may not know where they are, or may know only a general location, or may not be able to express or convey their location. This is, especially so during nighttime, when not in a major city, when the area does not have well-indicated street signs, or when in an unfamiliar area. In some vehicle crashes, fires, or other incidents, the occupants may not be able to initiate an emergency call because they have been injured, immobilized, or unable to reach their cell phones. A vehicle crash or incident may occur in an area where there are no observers, and in some cases there may be a lengthy period of time before an observer happens to be nearby.

Some vehicles may be equipped with telematics systems that, among other features, place an emergency call automatically in the event of a crash or manually in response to an emergency call button. Such systems may have on-board location determination systems that make use of satellite-based positioning technology, cellular-based positioning technology, inertial sensors, gyroscopes, etc., to provide position information for the vehicle. Such built-in systems may take advantage of the benefits of being integrated into a vehicle, such as more reliable power, ability to have larger or specialized antenna, ability to be engineered to avoid or minimize degradation by vehicle glass coatings, interference from other vehicle systems, etc. These advantages may permit the integrated system to estimate or determine its location more reliably, more accurately, or faster, and to more reliably establish and maintain a cellular communication call. Thus, the PSAP may be provided with a good estimate of where the vehicle is during an emergency. Vehicle manufacturers are increasingly adopting such systems, both for the safety benefits and for the additional features and services they enable (e.g., remote engine diagnostics, remote door unlock, stolen vehicle tracking and disabling, etc.).

The general term for such systems is Automatic Crash Notification (ACN) or "Advanced Automatic Crash Notification" (AACN). "ACN" is used herein as a general term. ACN systems may transmit some amount of data specific to the incident, referred to generally as "crash data" (the term is commonly used even though there might not have been a crash). While different systems transmit different amounts of crash data, standardized formats, structures, and mechanisms may be needed to provide interoperability among systems and PSAPs.

Some in-vehicle telematics systems may lack a standards-based ability to convey crash data directly to the PSAP (generally relying on either a human call taker or an automated system to provide the PSAP call taker with some crash data orally, or possibly a proprietary mechanism). The PSAP call taker may need to first realize that the call is related to a vehicle incident, and in most cases may then listen to the data and transcribe it. Such systems may not permit the PSAP call taker to simultaneously receive crash or other data and to communicate with the vehicle occupants or hear sounds from the vehicle.

The transition to next-generation calling in general, and emergency calling in particular, provides an opportunity to improve the scope, breadth, reliability and usefulness of crash data during an emergency by allowing it to be presented alongside the call, and to be automatically processed by the PSAP and made available to the call taker in an integrated, automated way. Such systems may allow the crash and location data to be presented to the PSAP call taker at the time the call is assigned or answered, saving significant time and permitting immediate communication with vehicle occupants. In addition, vehicle manufacturers are provided an opportunity to take advantage of the same standardized mechanisms for data transmission for internal use if they wish (such as telemetry between the vehicle and a service center for both emergency and non-emergency uses, including location based services, multi-media entertainment systems, and road-side assistance applications).

Next-generation ACN provides an opportunity for such calls to be recognized and processed as such during call set-up, and such calls may then be routed to a PSAP capable of processing the data, and where the vehicle data is available to assist the call taker in assessing and responding to the situation.

An ACN call may be either occupant-initiated or automatically triggered. (The "A" in "ACN" does stand for "Automatic," but the term may be used to refer to the class of calls that are placed by an in-vehicle system (IVS) and that carry incident-related data as well as voice.) Automatically triggered calls may indicate a car crash or some other serious incident (e.g., a rollover or fire) and may carry a greater presumption of risk of injury. Manually triggered calls may be reports of serious hazards (such as impaired drivers or roadway debris) and may require different responses depending on the situation. Manually triggered calls are also more likely to be false (e.g., accidental) calls and may thus be subject to different handling by the PSAP.

Described herein are mechanisms for IP-based emergency calls, to help provide the realization of next-generation ACN.

The Association of Public-Safety Communications Officials (APCO) and the National Emergency Number Association (NENA) have jointly developed a standardized set of incident-related vehicle data, called the Vehicle Emergency Data Set (VEDS). The European Committee for Standardization (CEN) has defined an eCall minimum set of data (MSD). Such data may be referred to as crash data although it is applicable in incidents other than crashes.

VEDS and the eCall MSD may provide standard data sets for the transmission, exchange, and interpretation of vehicle-related data. A standard data format may allow the data to be generated by an IVS, and interpreted by PSAPs, emergency responders, and medical facilities (including those capable of providing trauma level patient care). It may include incident related information such as airbag deployment, location of the vehicle, if the vehicle was involved in a rollover, various sensor data that can indicate the potential severity of the crash and the likelihood of severe injuries to the vehicle occupants, etc. This data may better inform the PSAP and emergency responders as to the type of response that may be needed. Such information was recently included in the federal guidelines for field triage of injured patients. These guidelines are designed to help responders at the accident scene identify the potential existence of severe internal injuries and to make critical decisions about how and where a patient needs to be transported.

The following description describes the 'application/EmergencyCallData.VEDS+xml' MIME content-type, and describes the 'VEDS' entry in the Emergency Call Additional Data registry.

VEDS may be an XML structure. The 'application/EmergencyCallData.VEDS+xml' MIME content-type may be used to identify it. The 'VEDS' entry in the Emergency Call Additional Data registry may be used to construct a 'purpose' parameter value for conveying VEDS data in a Call-Info header field within a SIP session or session set-up.

VEDS may be a versatile structure that can accommodate varied needs. However, if additional sets of data are determined to be needed, some example steps to enable the additional data blocks are very briefly summarized below:

A standardized format and encoding (such as XML) may be defined and published by a Standards Development Organization (SDO).

A MIME Content-Type may be registered for it (typically under the 'Application' media type and with a sub-type starting with 'EmergencyCallData.').

An entry for the block may be added to the Emergency Call Additional Data Blocks sub-registry; the registry entry may be the root of the MIME sub-type (not including the 'EmergencyCallData' prefix and any suffix such as '+xml').

A next-generation In-Vehicle System (IVS) may transmit crash data by encoding it in a standardized and registered format (such as VEDS or the additional blocks mentioned above) and attaching it to an INVITE or other message as a MIME body part. The body part may be identified by its MIME content-type (such as 'application/EmergencyCallData.VEDS+xml') in the Content-Type header field of the body part. The body part may be assigned a unique identifier which may be listed in a Content-ID header field in the body part. The INVITE or other message may be marked as containing the crash data by adding (or appending to) a Call-Info header field at the top level of the INVITE or other message. The Call-Info header field may contain a CID URL referencing the body part's unique identifier, and a 'purpose' parameter identifying the data as the crash data per the registry entry; the 'purpose' parameter's value may be 'EmergencyCallData.' and the root of the MIME type (not including the 'EmergencyCallData' prefix and any suffix such as '+xml' (e.g., 'purpose=EmergencyCallData.VEDS').

The mechanisms described herein may be used to place emergency calls that are identifiable as ACN calls and that carry one or more standardized crash data objects in an interoperable way.

Current (circuit-switched or legacy) systems for placing emergency calls by in-vehicle systems, including automatic crash notification systems, may have a limited ability to convey location and in some cases telematics data to the PSAP. Most such systems use one of three architectural models, which are described herein as: "Telematics Service Provider" (TSP), "direct", and "paired handset". These three models are illustrated below.

Figure 39:
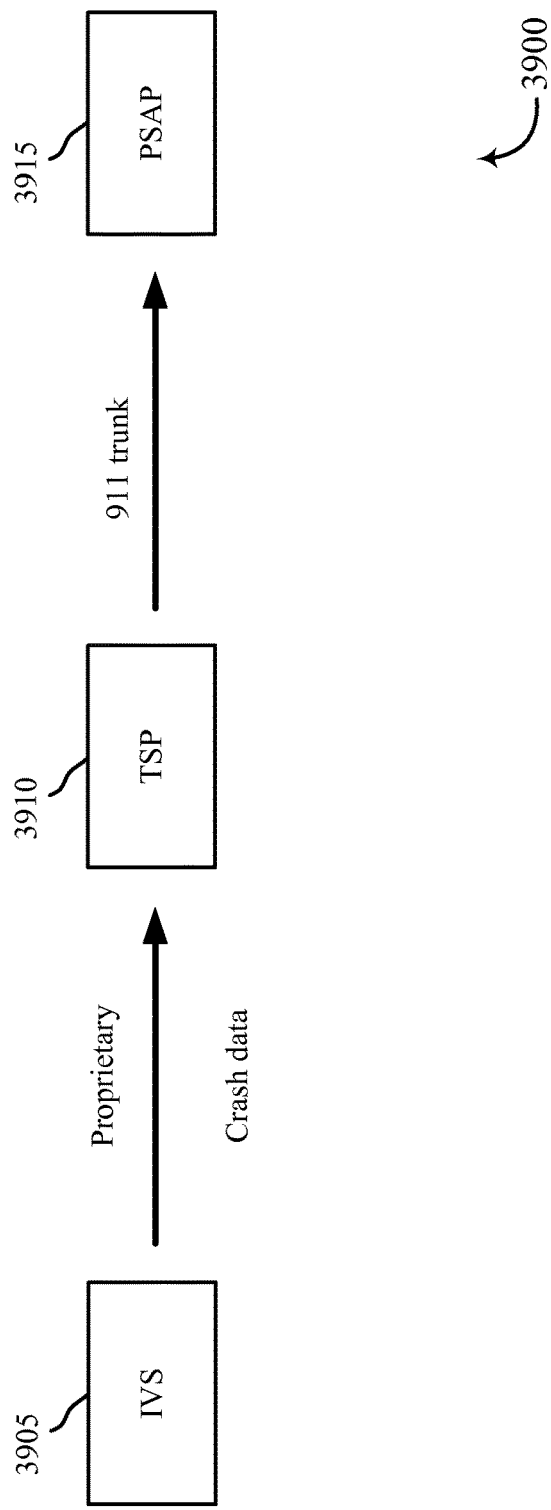
FIG. 39 is a diagram illustrating an example of a system architecture for placing emergency calls, in accordance with various aspects of the present disclosure.

In the TSP model (see the diagram 3900 illustrated in FIG. 39), both emergency and non-emergency calls may be placed to a Telematics Service Provider (TSP) 3910; a proprietary technique may be used for data transfer (such as proprietary in-band modems) to the TSP 3910.

In an emergency, the TSP call taker may bridge in the PSAP 3915 and communicate location, crash data (such as impact severity and trauma prediction), and other data (such as the vehicle description) to the PSAP call taker verbally, or may transmit location data using similar facilities as for cellular emergency calls and communicate crash and other data verbally. Typically, a three-way voice call may be established between the vehicle IVS 3905, the TSP 3910, and the PSAP 3915, allowing communication between the PSAP call taker, the TSP call taker, and the vehicle occupants (who might be unconscious).

Figure 40:
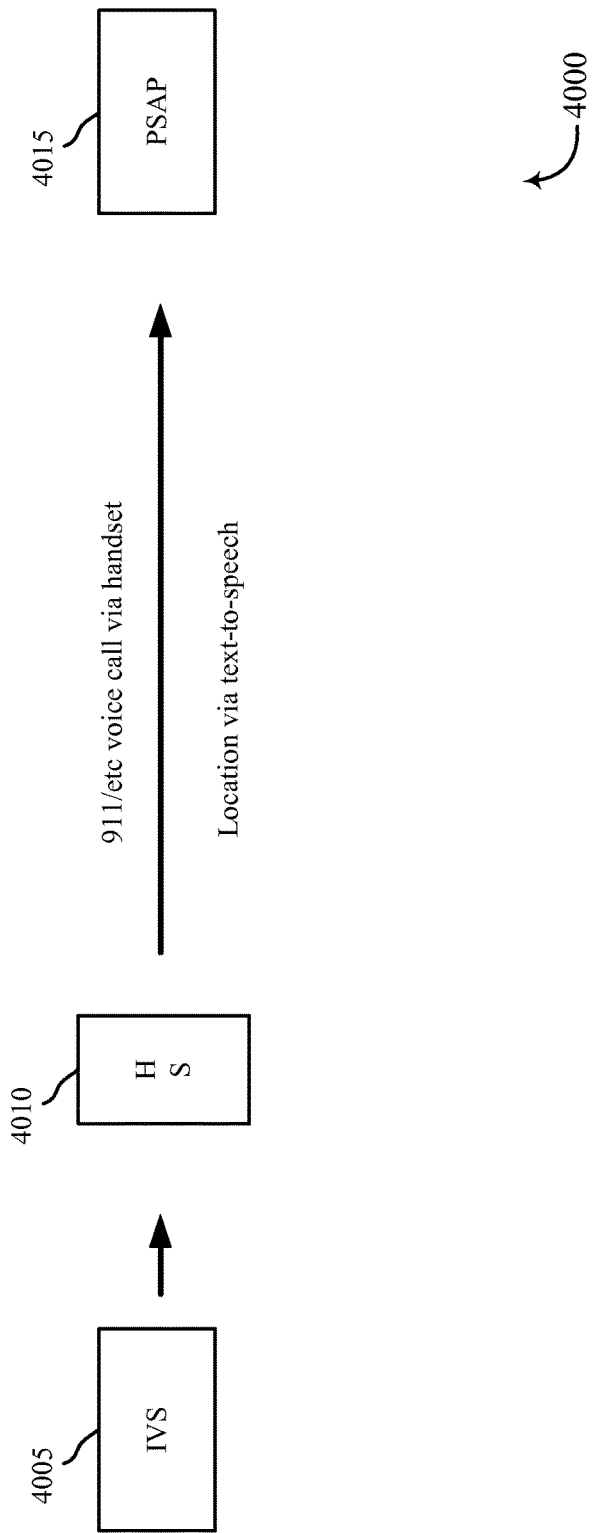
FIG. 40 is a diagram illustrating an example of a system architecture for placing emergency calls, in accordance with various aspects of the present disclosure.

In the paired model (see the diagram 4000 illustrated in FIG. 40), the IVS 4005 may use a Bluetooth link with a previously-paired handset 4010 to establish an emergency call with the PSAP 4015 (e.g., by dialing a standard emergency number such as 9-1-1), and then communicate location data to the PSAP 4015 via text-to-speech; crash data may not be conveyed. Some such systems may use an automated voice prompt menu (e.g., "this is an automatic emergency call from a vehicle; press 1 to open a voice path to the vehicle; press 2 to hear the location read out") to allow the call taker to request location data via text-to-speech.

Figure 41:
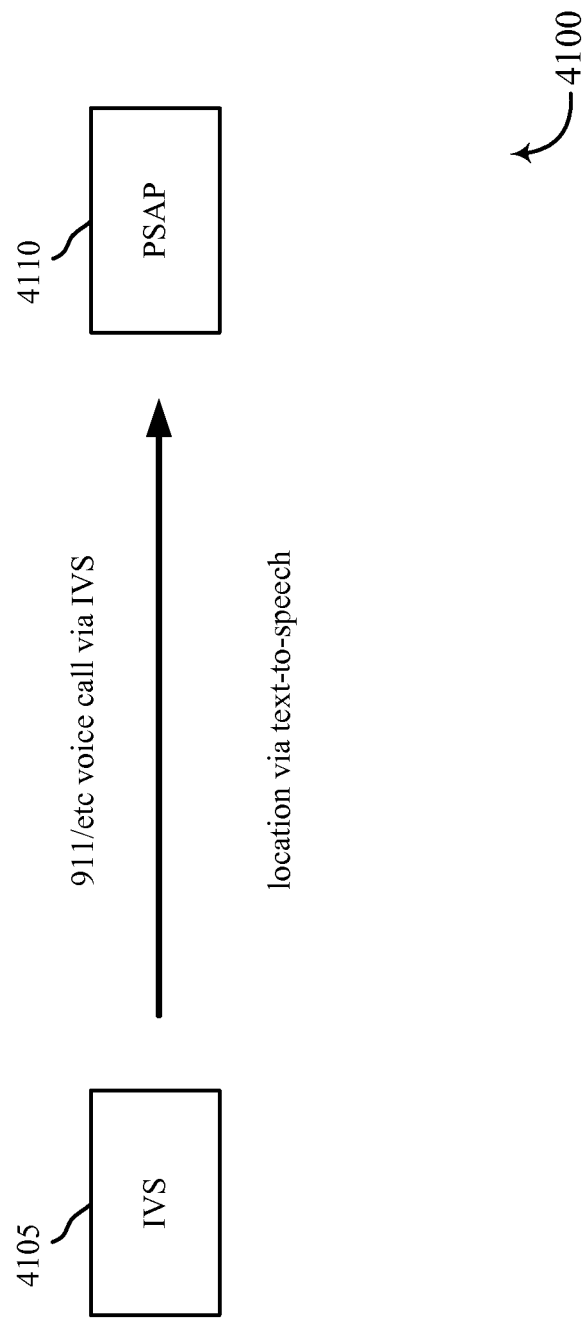
FIG. 41 is a diagram illustrating an example of a system architecture for placing emergency calls, in accordance with various aspects of the present disclosure.

In the direct model (see the diagram 4100 illustrated in FIG. 41), the IVS 4105 may directly place an emergency call with the PSAP 4110 by dialing a standard emergency number such as 9-1-1. Such systems may communicate location data to the PSAP 4110 via text-to speech; crash data may not be conveyed.

This present disclosure describes an example interface to the PSAP, that is, how an ACN emergency call may be setup and incident-related data (including vehicle, sensor, and location data) may be transmitted to the PSAP. (In order to, for example, re-use specifications.) For the direct model, this may be the end-to-end description (between the vehicle and the PSAP). For the TSP model, this may describe the right-hand side (between the TSP and the PSAP), leaving the left-hand side (between the vehicle and the TSP) up to the entities involved (i.e., IVS and TSP vendors) who may then use the same mechanism as for the right-hand side (or not).

Note that while ACN systems in the U.S. and other regions are not currently mandated, Europe has a mandated and standardized system for emergency calls by in-vehicle systems. This pan-European system is known as "eCall". Vehicles designed to operate in multiple regions may support eCall as well as other ACN systems. If other regions devise their own specifications or data formats, a multi-region vehicle may support those as well. Both the eCall and generalized ACN mechanisms may be compatible in most respects, but may differ in the Request-URI, the specific data block(s) that are sent, or other differences. Other difference may include, for example, the amount of support for requests by the PSAP to send data or take other actions, or to process acknowledgements by the PSAP of the data sent, or for the vehicle to express capabilities, and so forth.

Migration of emergency calls placed by in-vehicle systems to next-generation (all-IP) technology may provide a standardized mechanism to identify such calls and to present crash data with the call. This may allow ACN calls and crash data to be automatically processed by the PSAP and made available to the call taker in an integrated, automated way.

Vehicle manufacturers using the TSP model may choose to take advantage of the same mechanism to carry telematics data between the vehicle and the TSP for both emergency and non-emergency calls.

A next-generation IVS may establish an emergency call using the 3GPP IMS solution with a Request-URI indicating an ACN type of emergency call with vehicle data attached; the MNO may recognize the call as an emergency call and route it to an ESInet; the ESInet may recognize the call as an ACN with vehicle data and may route the call to an NG-ACN capable PSAP; such a PSAP may interpret the vehicle data sent with the call and make it available to the call taker. In regions without an ESInet, the MNO may route the call to an ACN capable PSAP. In areas with an ESInet, the ESInet may route such calls differently than other emergency calls.

Because of the need to identify and specially process Next-Generation ACN calls (as discussed above), new service URN children may be registered within the "sos" subservice. These URNs may provide the mechanism by which an NG-ACN call is identified, and may differentiate between manually and automatically triggered NG-ACN calls (which may be subject to different treatment, depending on policy). Examples of such service URNs may be: 'urn: service: sos.vehicle.automatic', 'urn:service:sos.vehicle.manual', urn:service:sos.eCall.automatic', and 'urn:service:sos.eCall.manual'.

Note that in North America, routing queries performed by clients outside of an ESInet may treat all sub-services of "sos" identically to "sos" with no sub-service. However, the Request-URI header field may retain the full sub-service; route and handling decisions within an ESInet or PSAP may take the sub-service into account. For example, in a region with multiple cooperating PSAPs, an NG-ACN call may be routed to a PSAP that is NG-ACN capable, or one that specializes in vehicle-related incidents.

The present disclosure discusses how the three architectural models may be migrated to next-generation (all-IP).

Figure 42:
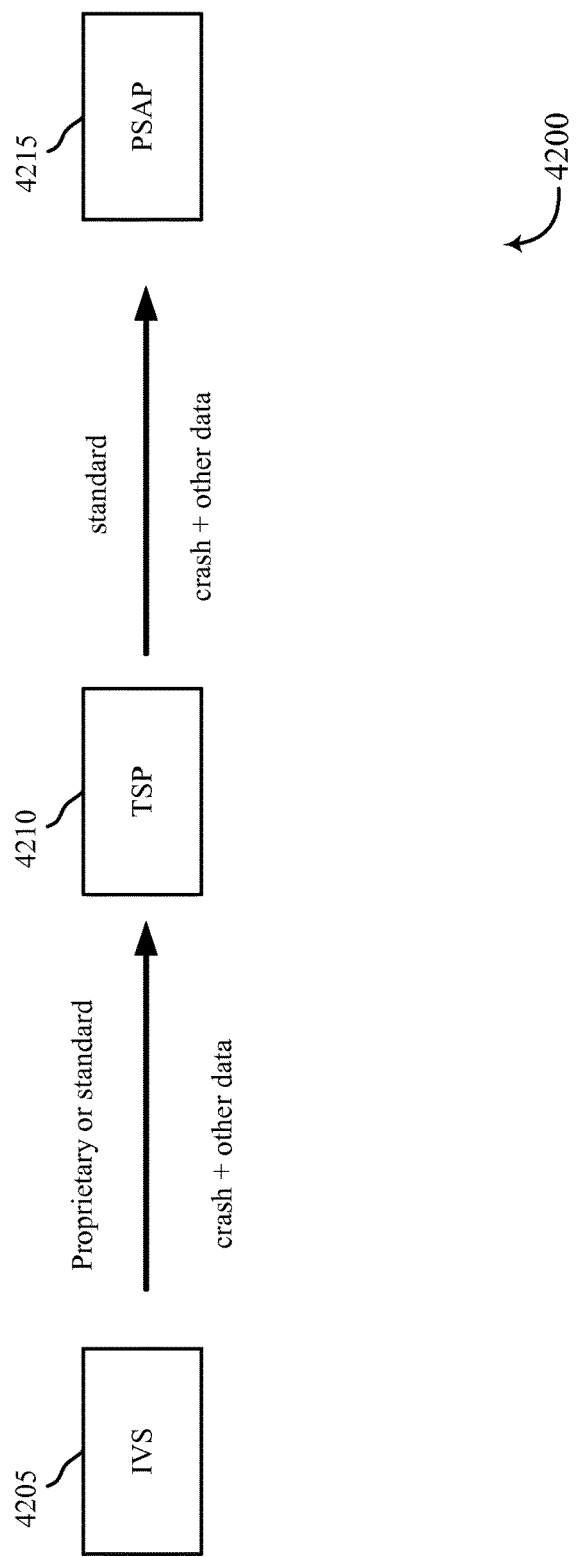
FIG. 42 is a diagram illustrating an example of a system architecture for placing emergency calls, in accordance with various aspects of the present disclosure.

In the TSP model (see the diagram 4200 illustrated in FIG. 42), the IVS 2205 may transmit crash and location data to the TSP 4210 using either a protocol that is based on a proprietary design or one that re-uses industry or other specifications, such as IETF. In an emergency, the TSP call taker may bridge in the PSAP 4215 and transmit crash and other data to the PSAP 4215 (e.g., using IETF specifications). There may be a three-way call between the vehicle IVS 4205, the TSP 4210, and the PSAP 4215, allowing communication between the PSAP call taker, the TSP call taker, and the vehicle occupants (who might be unconscious).

The vehicle manufacturer and the TSP may choose to use the same specifications (e.g., IETF) to transmit crash and location data from the vehicle to the TSP as is described herein to transmit such data from the TSP to the PSAP.

Figure 43:
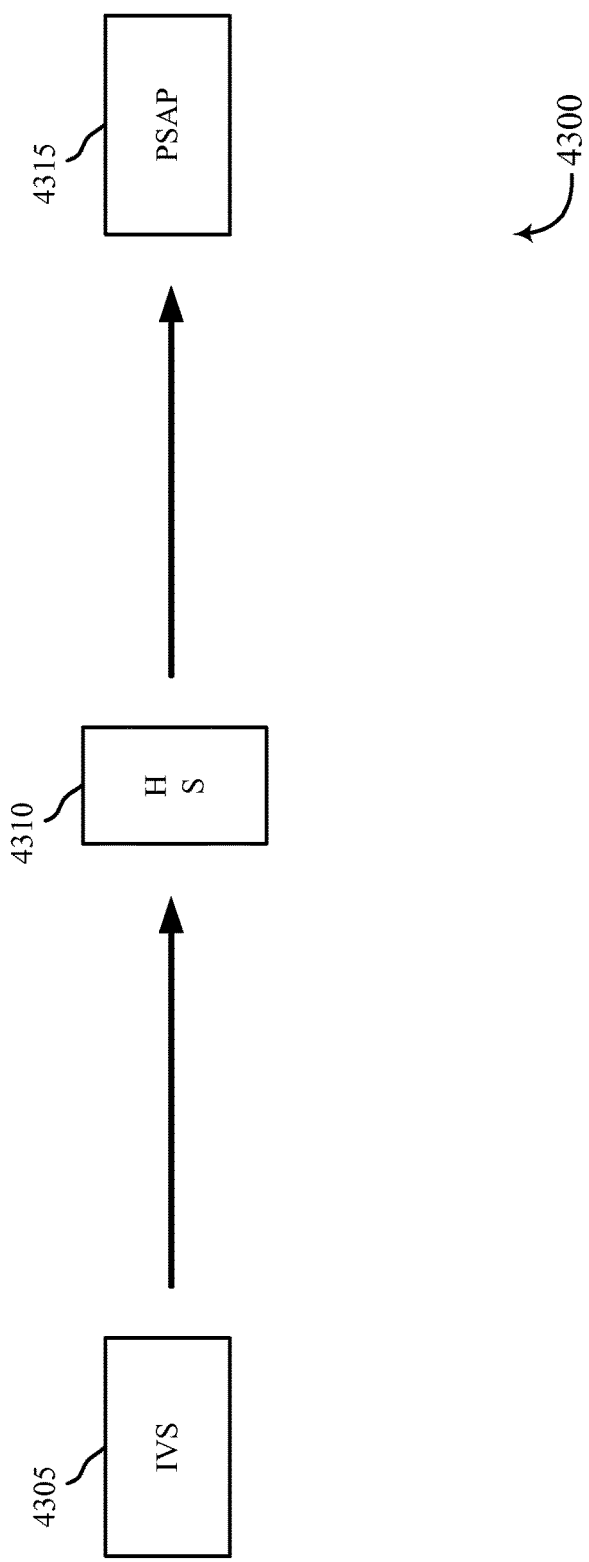
FIG. 43 is a diagram illustrating an example of a system architecture for placing emergency calls, in accordance with various aspects of the present disclosure.

In the paired model (see the diagram 4300 illustrated in FIG. 43), the IVS 4305 may use a Bluetooth link to a previously-paired handset 4310 to establish an emergency call with the PSAP 4315 and may convey location, crash, or other data to the handset which may then transmit such data to the PSAP as is described herein.

Figure 44:
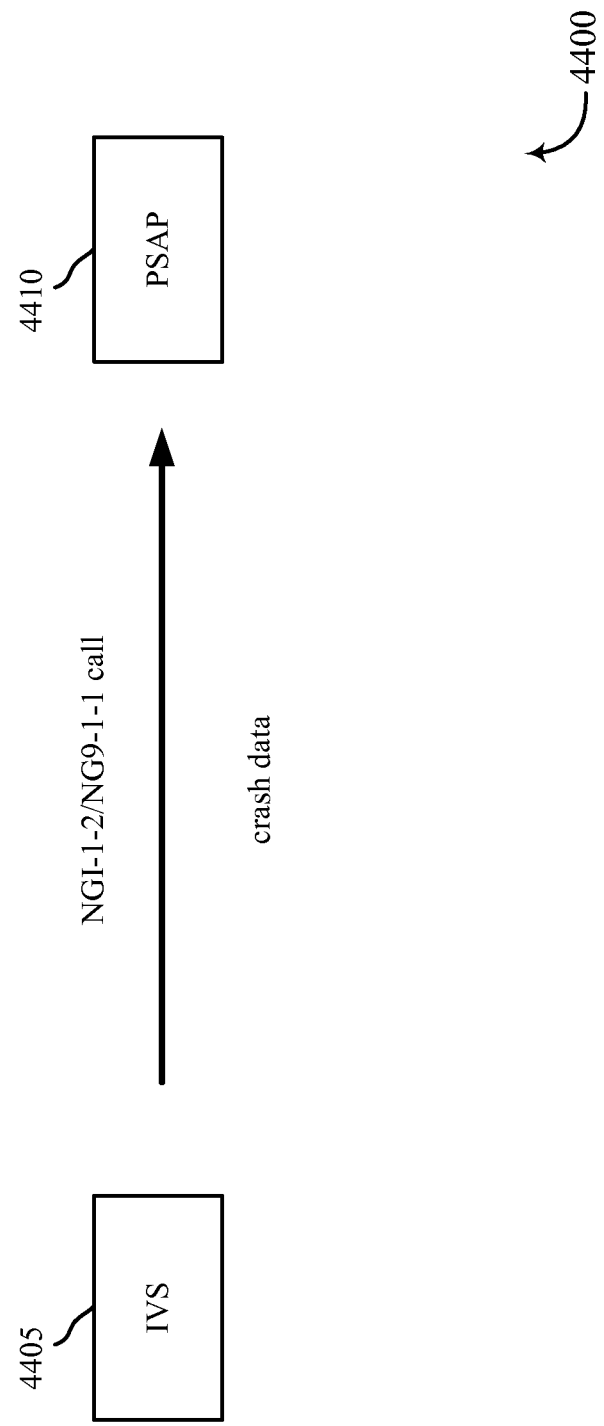
FIG. 44 is a diagram illustrating an example of a system architecture for placing emergency calls, in accordance with various aspects of the present disclosure.

In the direct model (see the diagram 4400 illustrated in FIG. 44), the IVS 4405 may communicate crash data to the PSAP 4410 directly using, for example, IETF specifications.

In the context of emergency calls placed by an in-vehicle system the car may be equipped with a built-in GNSS receiver. Further, vehicles are by nature mobile and not tied to a fixed address. For these reasons, the location information that may be sent within an emergency call may be only geodetic. The following location shapes may be implemented: 2-D and 3-D Point, Circle, and Ellipsoid. A coordinate reference systems (CRS) may also be used. A <direction> element which may indicate the direction of travel of the vehicle, may be useful for dispatch and hence it may be included. A <heading> element may be implemented and may be included.

Calls by in-vehicle systems may be placed via cellular networks, which may ignore location sent by an originating device in an emergency call INVITE, instead attaching their own location (often determined in cooperation with the originating device). The IVS may attach location data to the call INVITE. Standardized crash data structures may include location as determined by the vehicle. This may allow the PSAP to see both the location as determined by the cellular network (often in cooperation with the IVS) and the location as determined by the vehicle.

The present disclosure may be able to utilize test call functionality. Such test calls may be identical to real emergency calls in some, all, or most respects but be distinguishable from a real emergency call.

ACN calls may be easily identifiable as such at all stages of call handling, and automatic versus manual triggering may be known. ACN calls differ from general emergency calls in several aspects, including the presence of standardized crash data, the fact that the call may be known to be placed by an in-vehicle system (which may have implications for PSAP operational processes), and, especially for automatic calls, information that may indicate a likelihood of severe injury and hence need for trauma services. Knowledge that a call is an ACN and further that it was automatically or manually invoked may carry a range of implications about the call, the circumstances, and the vehicle occupants. Calls by in-vehicle systems may be considered a specific sub-class of general emergency calls and may need to be handled by a PSAP with the technical and operational capabilities to serve such calls. (This may especially be so in environments such as the U.S. where there are many PSAPs and where individual PSAPs have a range of capabilities and where PSAPs may cooperate with each other in providing service.) Technical capabilities may include the ability to recognize and process standardized crash data. Operational capabilities may include training and processes for assessing severe injury likelihood and responding appropriately (e.g., dispatching trauma-capable medical responders or responders trained and equipped to extract occupants from crashed vehicles and handle gasoline or other hazardous materials, transporting victims to a trauma center, alerting the receiving facility, etc.).

Because ACN calls may differ in significant ways from general emergency calls, and because such calls may need to be handled by specialized PSAPs (equipped technically to interpret and make use of crash data, and operationally to handle emergency calls placed by in-vehicle systems), the present disclosure describes an SOS sub-service for ACN/car crash, such as, "SOS.vehicle". Using a sub-service may indicate that the call is an ACN; a further child element is discussed herein to distinguish calls automatically placed due to a crash or other serious incident (such as a fire) from those manually invoked by a vehicle occupant (e.g., "SOS.vehicle.automatic" and "SOS.vehicle.manual"). The distinction between automatic and manual invocation is also discussed; automatically triggered calls may indicate a car crash or some other serious incident (e.g., a fire) and may thus carry a greater presumption of risk of injury and hence need for specific responders (such as trauma or fire). Manually triggered calls may be reports of serious hazards (such as impaired drivers or roadway debris) and may require different responses depending on the situation. Manually triggered calls may also be more likely to be false (e.g., accidental) calls and may thus be subject to different handling by the PSAP.

A next-generation In-Vehicle System (IVS) may transmit crash data by encoding it in a standardized and registered format and attaching it to an INVITE or other message as an additional data block. The block may be identified by its MIME content-type, and pointed to by a CID URL in a Call-Info header with a 'purpose' parameter value corresponding to the block.

The steps for implementing this may include: A set of crash data may be standardized by an SDO or appropriate organization; A MIME Content-Type for the crash data set may be registered with an appropriate registrar such as IRNA. If the data is specifically for use in emergency calling, the MIME type may be under the 'application' or other type with a subtype starting with 'EmergencyCallData.' If the data format is XML, then the name may have a suffix of '+xml'; The item may be registered in the Emergency Call Additional Data registry. For emergency-call-specific formats, the registered name may be the root of the MIME Content-Type (not including the 'EmergencyCallData' prefix and any suffix such as '+xml').

When placing an emergency call: The crash data set may be created and encoded; The crash data set may be attached to the emergency call INVITE or other message as a MIME body part identified by its MIME Content-Type in the body part's Content-Type header field; The body part may be assigned a unique identifier label in a Content-ID header field of the body part; A Call-Info header field at the top level of the INVITE or other message may reference the crash data and identify it by its MIME root (as registered in the Emergency Call Additional Data registry); The crash data may be referenced in the Call-Info header field by a CID URL that contains the unique Content ID assigned to the crash data body part; The crash data may be identified in the Call-Info header field by a 'purpose' parameter whose value is 'EmergencyCallData.' concatenated with the specific crash data entry in the Emergency Call Additional Data registry.

The Call-Info header field may be either solely to reference the crash data (and hence have only the one URL) or may also contain other URLs referencing other data.

Additional crash data sets may be included by following the same steps.

The Vehicle Emergency Data Set (VEDS) may be an XML structure defined by the Association of Public-Safety Communications Officials (APCO) and the National Emergency Number Association (NENA) [VEDS]. The 'application/EmergencyCallData.VEDS+xml' MIME content-type may be used to identify it. A 'VEDS' entry in the Emergency Call Additional Data registry may be used to construct a 'purpose' parameter value for conveying VEDS data in a Call-Info header. The European Committee for Standardization (CEN) has defined an eCall minimum set of data (MSD) which includes an XML representation. The 'application/EmergencyCallData.eCall.MSD+xml' MIME content-type may be used to identify the MSD. An "eCall.MSD" entry in the Emergency Call Additional Data registry may be used to construct a 'purpose' parameter value for conveying eCall MSD data in a Call-Info header.

The VEDS data or MSD may be attached as a body part with MIME content type 'application/EmergencyCallData.VEDS+xml' or 'application/EmergencyCallData.eCall.MSD+xml' which may be pointed at by a Call-Info URL of type CID with a 'purpose' parameter of 'EmergencyCallData.VEDS' or 'EmergencyCallData.eCall.MSD'.

Entities along the path between the vehicle and the PSAP may be able to identify the call as an ACN call and handle it appropriately. The PSAP may be able to identify the crash data as well as any other additional data attached to the INVITE or other message by examining the Call-Info header fields for 'purpose' parameters whose values start with 'EmergencyCallData.' The PSAP may be able to access the data it is capable of handling and is interested in (e.g., based on policy or capabilities) by checking the 'purpose' parameter values.

An Emergency Services IP Network (ESInet) may be a network operated by or on behalf of emergency services authorities. It may handle emergency call routing and processing before delivery to a PSAP. In the NG9-1-1 architecture adopted by NENA as well as the NG1-1-2 architecture adopted by EENA, each PSAP may be connected to one or more ESInets. Each originating network may also be connected to one or more ESInets. The ESInets may maintain policy-based routing rules which may control the routing and processing of emergency calls. The centralization of such rules within ESInets may provide for a cleaner separation between the responsibilities of the originating network and that of the emergency services network, and provide greater flexibility and control over processing of emergency calls by the emergency services authorities. This may make it easier to react quickly to unusual situations that require changes in how emergency calls are routed or handled (e.g., a natural disaster closes a PSAP), as well as ease in making long-term changes that affect such routing (e.g., cooperative agreements to specially handle calls requiring translation or relay services or to designate certain PSAPs in a region as handling next-generation emergency calls placed by in-vehicle systems).

In an environment that uses ESInets, the originating network may only need to detect that the service URN of an emergency call is or starts with "sos", passing all types of emergency calls to an ESInet. The ESInet may then be responsible for routing such calls to an appropriate PSAP. In an environment without an ESInet, the emergency services authorities and the originating carriers may need to determine how such calls are routed.

The embodiments described herein may be able to utilize test call functionality.

A service URN starting with "test." may indicate a request for an automated test. For example, "urn:service:test.sos.vehicle.automatic" may indicate such a test feature.

Note that since test calls may be placed using "test" as the parent service URN and "sos" as a child, such calls may not be treated as an emergency call and so some functionality may not apply (such as preemption or service availability for devices lacking service ("non-service-initialized" or "NSI") if those are available for emergency calls). MNOs and PSAPs may recognize test calls and treat them in a way that tests as much functionality as desired. For example, a test ACN call may be routed to the same PSAP as would an emergency ACN call, the IVS may transmit telematics data and/or capabilities data to the PSAP, the PSAP may transmit acknowledgments and/or requests to the IVS. A test call may enable voice communications between the vehicle occupants and automated equipment at the PSAP. The PSAP may record audio transmitted from the vehicle, and may transmit the recorded audio back to the vehicle, or may transmit other audio before, instead of, or after recorded audio from the vehicle.

Figure 45:
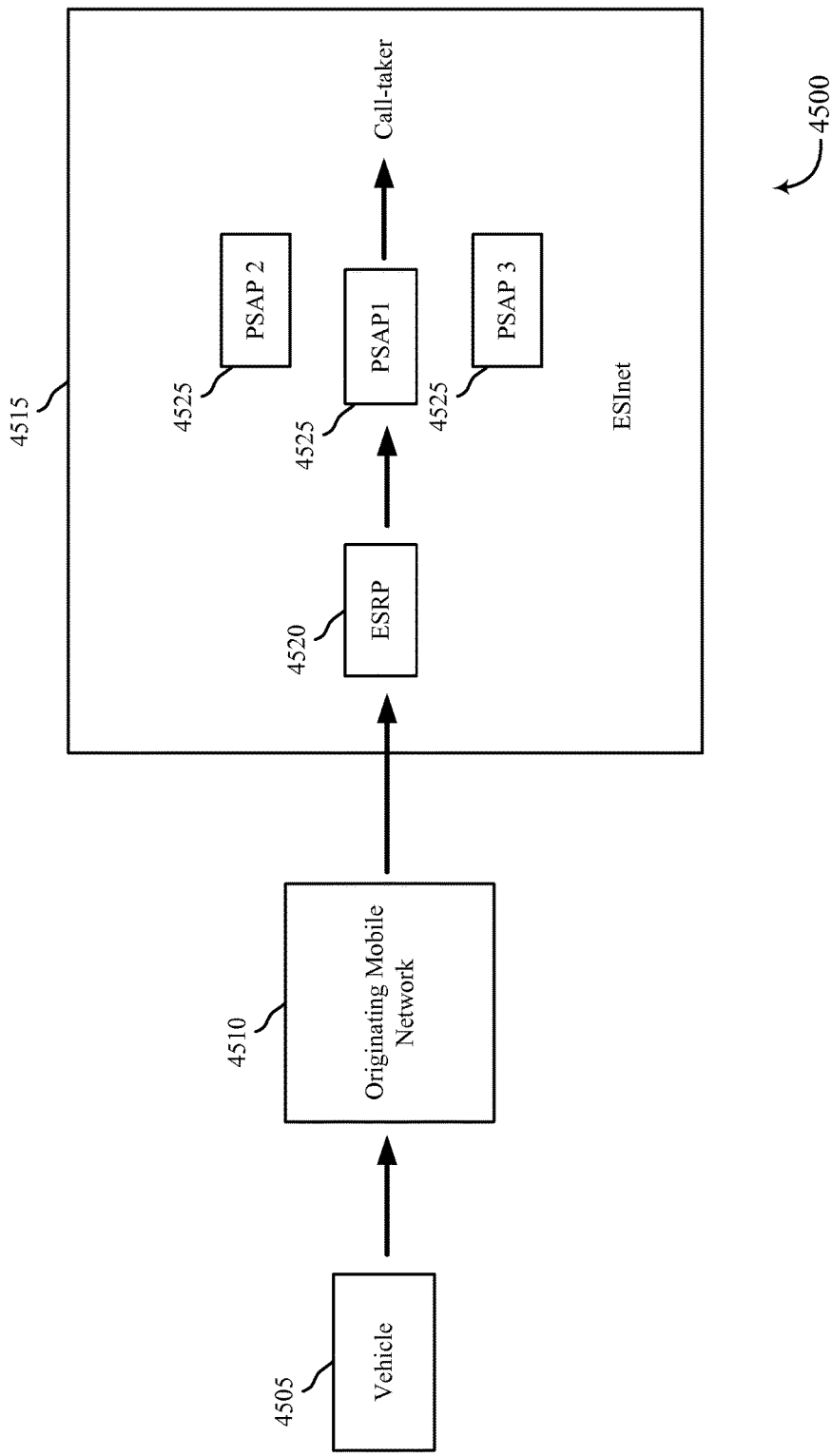
FIG. 45 is a diagram illustrating an example of a system architecture for placing emergency calls, in accordance with various aspects of the present disclosure.

FIG. 45 shows an emergency call placed by a vehicle 4505 in which location information and crash data (such as VEDS data) may both be attached to the SIP INVITE message. The INVITE may have a request URI containing the 'urn:service:sos.vehicle.automatic' or other service URN and may thus be recognized as an ACN type of emergency call, and may also be recognized as a type of emergency call because the request URI starts with 'urn:service:sos'. The mobile network operator (MNO) 2510 may route the call to an Emergency Services IP Network (ESInet) 4515, as for any emergency call. The ESInet 4515 may process the call as an ACN and route the call to an appropriate ACN-capable PSAP 4525 (using location information and the fact that that it is an ACN). (In deployments where there is no ESInet, the MNO 4510 itself may need to route directly to an appropriate ACN capable PSAP 4525.) The call may be processed by an Emergency Services Routing Proxy (ESRP) 4520, as an entry point to the ESInet 4515. The ESRP 4520 may route the call to an appropriate ACN-capable PSAP 4525, where the call may be received by a call taker.

The example shown in the diagram 4600 of FIG. 46 illustrates a SIP emergency call INVITE that is being conveyed with location information (a PIDF-LO) and crash data (as VEDS data).

As with emergency service systems with location information provided by the originating device, there is the possibility that the location is incorrect, either intentionally (e.g., in case of a denial of service attack against the emergency services infrastructure) or due to malfunctioning devices.

In accordance with the present disclosure, the URN 'urn:service:sos.vehicle' or 'urn:service:sos.eCall' may be registered under the sub-services 'sos' registry.

This service identifier may reach a public safety answering point (PSAP), which in turn may dispatch aid appropriate to the emergency related to accidents of vehicles. The following sub-services may also be registered.

urn:service:sos.vehicle.manual—This service URN may indicate that an emergency call carrying vehicle sensor ("crash") data has been placed by an in-vehicle system (IVS) based on the manual interaction of the driver or a passenger.

urn:service:sos.vehicle.automatic—This service URN may indicate that an emergency call carrying vehicle sensor ("crash") data has been placed by an in-vehicle system (IVS) triggered automatically, for example, due to a crash.

Further similar sub-services may also be registered for various types of ACN calls, such as urn:service:sos.ecall.manual and urn:service:sos.ecall.automatic for the eCall service.

Also in accordance with the present disclosure, a new MIME type may be registered, as shown in the diagram 4700 of FIG. 47. Also in accordance with the present disclosure, the 'VEDS' entry may be added to the Emergency Call Additional Data registry In some embodiments described herein, IP-based emergency services mechanisms may be used to support the next generation of the Pan European in-vehicle emergency call service defined under the eSafety initiative of the European Commission (generally referred to as "eCall"). eCall is a standardized and mandated system for a special form of emergency calls placed by vehicles. eCall deployment is required in the near future in European Union member states, and eCall (and eCall-compatible systems) are also being deployed in other regions. eCall provides an integrated voice path and a standardized set of vehicle, sensor (e.g., crash related), and location data. An eCall may be recognized and handled as a specialized form of emergency call and may be routed to a specialized eCall-capable Public Safety Answering Point (PSAP) capable of processing the vehicle data and trained in handling emergency calls from vehicles.

eCall may function over circuit-switched cellular telephony in some embodiments, but next-generation eCall (NG-eCall, sometimes called packet switched eCall or PS-eCall) may also be used, and the present disclosure may assists in that work by describing exemplary methods of how to support eCall within the IP-based emergency services infrastructure. A MIME Content Type and an Emergency Call Additional Data may also be registered.

In the present disclosure, the following abbreviations may be used: 3GPP: 3rd Generation Partnership Project; CEN: European Committee for Standardization; EENA: European Emergency Number Association; ESInet: Emergency Services IP network; IMS: Internet Multimedia Subsystem; IVS: In-Vehicle System; MNO: Mobile Network Operator; MSD: Minimum Set of Data; PSAP: Public Safety Answering Point.

The present disclosure may describe the signaling, data exchange, and protocol needs of next-generation eCall (NG-eCall, also referred to as packet-switched eCall (PS-eCall) and all-IP eCall) within the framework for emergency calls, such as described in standards RFC 6443 and RFC 6881. eCall may be specified by the 3GPP and CEN these specifications. The eCall service operates over cellular wireless communication, but the present disclosure does not address cellular-specific details, nor client domain selection (e.g., circuit-switched versus packet-switched). The scope of this disclosure may thus include describing eCall operating within a SIP-based environment, such as 3GPP IMS Emergency Calling. It should be understood, however, that the techniques described herein may be suitable for other vehicle-initiated emergency call systems as well.

Vehicles designed for multiple regions may support eCall and other Advanced Automatic Crash Notification systems. Such systems may be compatible with eCall, but may differ in the Request-URL and the specific data set that is sent, or in other ways.

Emergency calls made from vehicles (e.g., in the event of a crash) may assist in reducing road deaths and injuries by allowing emergency services to be aware of the incident, the state of the vehicle, the location of the vehicle, and to have a voice channel with the vehicle occupants. This may enable a quick and appropriate response.

The European Commission initiative of eCall was conceived in the late 1990s, and has evolved to a European Parliament decision requiring the implementation of compliant in-vehicle systems (IVS) in new vehicles and the deployment of eCall in the European Member States in the near future. eCall (and eCall-compatible systems) are also being adopted in other regions.

The pan-European eCall system provides a standardized and mandated mechanism for emergency calls by vehicles. eCall establishes procedures for such calls to be placed by in-vehicle systems, recognized and processed by the network, and routed to a specialized PSAP where the vehicle data may be made available to assist the call taker in assessing and responding to the situation. eCall may thus provide a standard set of vehicle, sensor (e.g., crash related), and location data.

An eCall may be either user-initiated or automatically triggered. Automatically triggered eCalls may indicate a car crash or some other serious incident (e.g., a fire) and carry a greater presumption of risk of injury. Manually triggered eCalls may be reports of serious hazards and may require a different response than an automatically triggered eCall. Manually triggered eCalls are also more likely to be false (e.g., accidental) calls and may thus be subject to different handling by the PSAP.

eCall may be standardized (by 3GPP and CEN) as a 3GPP circuit-switched call over GSM (2G) or UMTS (3G). One or more flags (e.g., eCall flags) in the call setup may mark the call as an eCall, and may further indicate if the call was automatically or manually triggered. The call may be routed to an eCall-capable PSAP, a voice channel may be established between the vehicle and the PSAP, and an eCall in-band modem may be used to carry a defined set of vehicle, sensor (e.g., crash related), and location data (the Minimum Set of Data or MSD) within the voice channel. The same in-band mechanism may be used for the PSAP to acknowledge successful receipt of the MSD, and optionally to request the vehicle to send a new MSD (e.g., to check if the state of or location of the vehicle or its occupants has changed). Work on next-generation eCall (NG-eCall, also referred to as packet-switched eCall or PS eCall) is now in process. As part of this work, the European Telecommunications Standards Institute (ETSI) has published a Technical Report with findings and recommendations regarding support for eCall in an all-IP environment. NG-eCall may be all-IP, and may carry the vehicle data and other eCall-specific data as additional data associated with the call.

The MSG Technical Report recommendation for NG-eCall is to use 3GPP IMS emergency calling with additional elements identifying the call as an eCall and as carrying eCall data and with mechanisms for carrying the data. 3GPP IMS emergency services may support multimedia, providing the ability to carry voice, text, and video. This capability may be referred to as Multimedia Emergency Services (MMES). A transition period may exist during which time various entities involved in initiating and handling an eCall might support next generation eCall, legacy eCall, or both. This transition period might last several years or longer.

Overall eCall requirements may be specified by CEN and by 3GPP. Requirements specific to vehicle data may also be specified. For convenience, some of the requirements are summarized very briefly below.

eCall may require the following: The call be recognized as an eCall (which is inherently an emergency call); The call setup indicates if the call was manually or automatically triggered; A voice channel between the vehicle and the PSAP; Carrying the MSD intrinsically with the call (the MSD needs to be available to the same call-taker as the voice); The ability for the PSAP to acknowledge receipt of the MSD; The ability for the PSAP to request that the vehicle generate and transmit a new MSD; The ability of the PSAP to be able to re-contact the occupants of vehicle after the initial eCall is concluded; and/or The ability to perform a test call (which may be routed to a PSAP but is not treated as an emergency call and not handled by a call taker).

NG-eCall may offer many potential enhancements, although these may not be required by current EU regulations. The enhancements that NG-eCall may offer include: The ability to carry more data (e.g., an enhanced MSD or an MSD plus additional sets of data); The ability to handle video; The ability to handle text; The ability for the PSAP to access vehicle components (e.g., an onboard camera (such as rear facing or blind-spot cameras) for a visual assessment of the crash site situation); The ability for the PSAP to request the vehicle to take actions (e.g., sound the horn, disable the ignition, lock/unlock doors); and/or The ability to avoid audio muting of the voice channel (because the MSD is not transferred using an in-band modem).

Pan-European eCall may provide a standardized and mandated set of vehicle related data, which may be referred to as the Minimum Set of Data (MSD). The European Committee for Standardization (CEN) may specify this data. Circuit-switched eCall may use ASN.1 encoding. The XML encoding, however, may be better suited for use in SIP messages and is thus described herein.

A general mechanism for attaching blocks of data to a SIP emergency call may also be established. The present disclosure makes use of that mechanism to carry the eCall MSD in a SIP emergency call.

This present disclosure describes a 'application/emergencyCallData.eCall.MSD+xml' MIME Content-Type, which may enable the MSD to be carried in SIP. This document also describes a 'eCall.MSD' entry to the Emergency Call Additional Data Blocks registry, which may enable the MSD to be recognized as such in a SIP-based eCall emergency call. If additional data sets are defined (e.g., in the future or in other regions) and transmitted using the mechanisms described herein, the size and/or frequency of transmission during a call should be evaluated to be sure that use of the signaling channel is appropriate.

Figure 48:
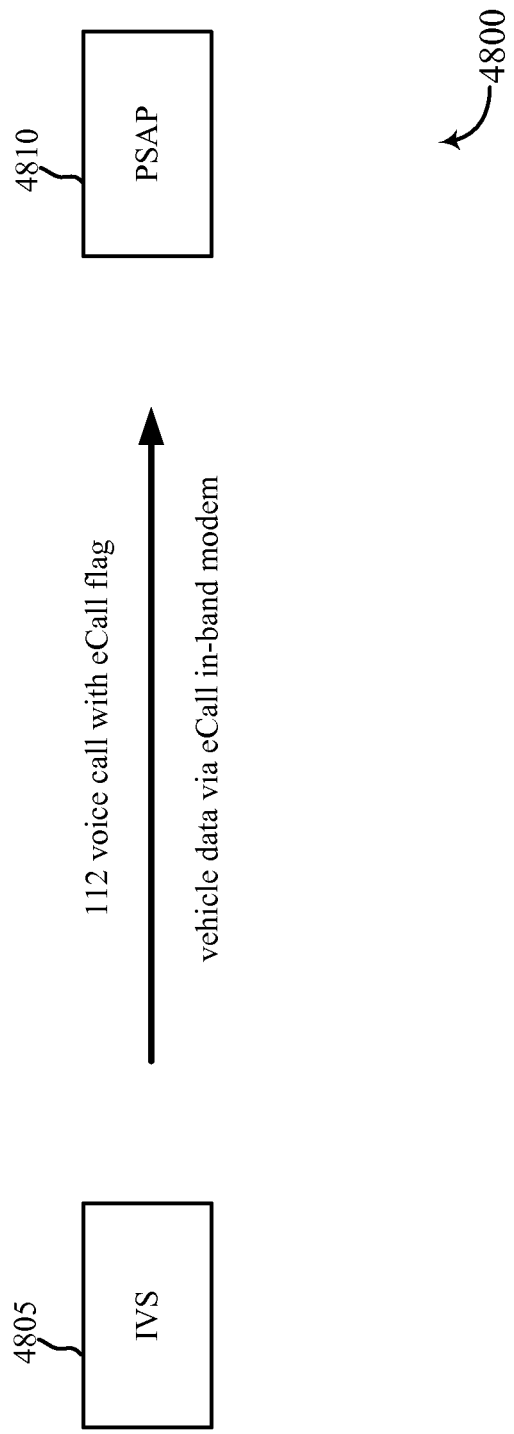
FIG. 48 is a diagram illustrating an example of a system architecture for placing emergency calls, in accordance with various aspects of the present disclosure.

In circuit-switched eCall (see the diagram 4800 illustrated in FIG. 48), the IVS 4805 may place a special form of a 112 emergency call which carries an eCall flag (which may indicate that the call is an eCall and also if the call was manually or automatically triggered); the mobile network operator (MNO) may recognize the eCall flag and route the call to an eCall-capable PSAP 4810; vehicle data may be transmitted to the PSAP 4810 via the eCall in-band modem (in the voice channel).

An In-Vehicle System (IVS) which supports NG-eCall may transmit the MSD by encoding it as specified and attaching it to an INVITE as a MIME body part. The body part may be identified by its MIME content-type ('application/emergencyCallData.eCall.MSD+xml') in the Content-Type header field of the body part. The body part may be assigned a unique identifier which is listed in a Content-ID header field in the body part. The INVITE may be marked as containing the MSD by adding (or appending to) a Call-Info header field at the top level of the INVITE. This Call-Info header field may contain a CID URL referencing the body part's unique identifier, and a 'purpose' parameter identifying the data as the eCall MSD per the registry entry; the 'purpose' parameter's value may be 'emergencyCallData.' and the root of the MIME type (not including the 'emergencyCallData' prefix and any suffix such as '+xml' (e.g., 'purpose=emergencyCallData.eCall.MSD').

Figure 49:
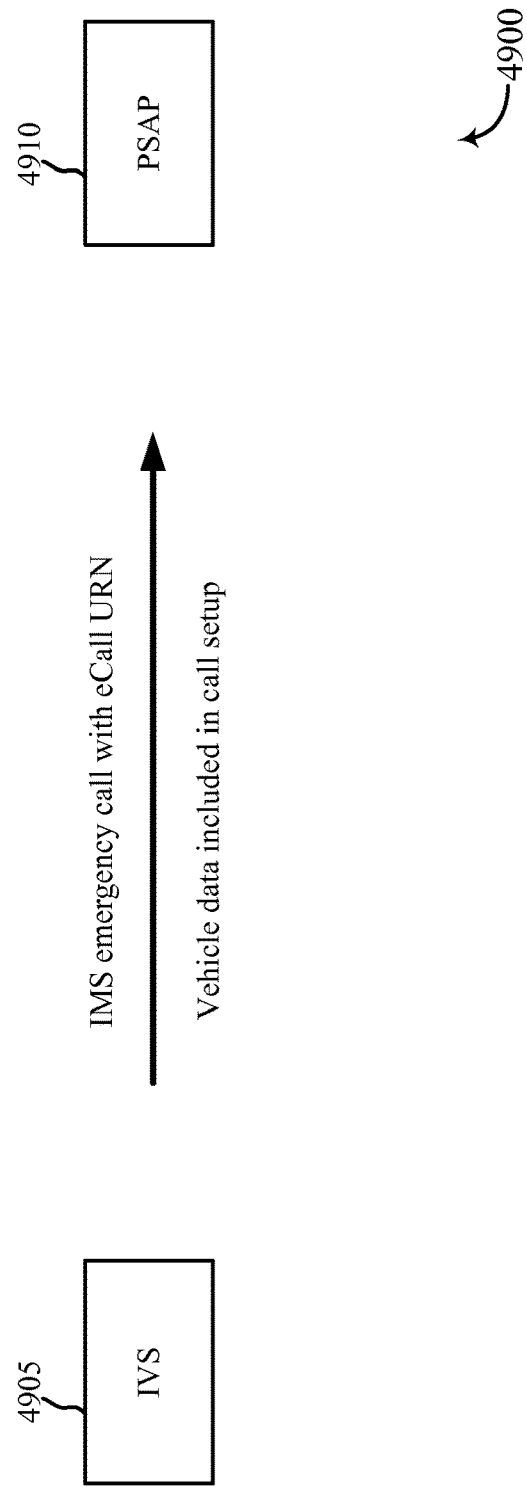
FIG. 49 is a diagram illustrating an example of a system architecture for placing emergency calls, in accordance with various aspects of the present disclosure.

For NG-eCall (see the diagram 4900 illustrated in FIG. 49), the IVS 4905 may establish an emergency call using the 3GPP IMS solution with a Request-URI indicating an eCall type of emergency call and with vehicle data attached; the MNO or ESInet may recognize the eCall URN and route the call to a NG-eCall capable PSAP 4910; the PSAP 4910 may interpret the vehicle data sent with the call and makes it available to the call taker.

The present disclosure may describe new service URN children within the "sos" subservice. These URNs may provide the mechanism by which an eCall may be identified, and may differentiate between manually and automatically triggered eCalls (which may be subject to different treatment, depending on policy). Two such service URNs are: urn:service:sos.ecall.automatic and urn:service:sos.ecall.manual The routing rules for eCalls may differ from those of other emergency calls because eCalls are special types of emergency calls (with implications for the types of response required) and may need to be handled by specially designated PSAPs. In an environment that uses ESInets, the originating network may pass all types of emergency calls to an ESInet (which may have a request URI containing the "SOS" service URN). The ESInet may then be responsible for routing such calls to the appropriate PSAP. In an environment without an ESInet, the emergency services authorities and the originating network may jointly determine how such calls are routed.

An Emergency Services IP Network (ESInet) as described herein may be a network operated by emergency services authorities. It may handle emergency call routing and processing before delivery to a PSAP. In the NG1-1-2 architecture adopted by EENA, each PSAP may be connected to one or more ESInets. Each originating network may also be connected to one or more ESInets. The ESInets may maintain policy-based routing rules which control the routing and processing of emergency calls. The centralization of such rules within ESInets may provide for a separation between the responsibilities of the originating network and that of the emergency services network, and may provide greater flexibility and control over processing of emergency calls by the emergency services authorities. This may make it easier to react quickly to unusual situations that require changes in how emergency calls are routed or handled (e.g., a natural disaster closes a PSAP), as well as ease in making long-term changes that affect such routing (e.g., cooperative agreements to specially handle calls requiring translation or relay services). ESInets may support the ability to interwork NG-eCall to legacy eCall to handle eCall-capable PSAPs that are not IP PSAPs (similar to the ability to interwork IP emergency calls to legacy non-IP PSAPs). Note that in order to support legacy eCall-capable PSAPs that are not IP PSAPs and are not attached to an ESInet, an originating network may need the ability to route an eCall itself (e.g., to an interworking facility with interconnection to a suitable legacy eCall capable PSAP) based on the eCall and manual or automatic indications.

eCall may include the ability to place test calls. These are calls that are recognized and treated to some extent as eCalls but may not be given emergency call treatment and may not be handled by call takers. The test call facility allows the IVS or user to verify that an eCall can be successfully established with voice communication. The IVS can also verify that the MSD was successfully received.

A service URN starting with "test." may indicate a test call. For eCall, "urn:service:test.sos.ecall" may indicate such a test feature. The present disclosure describes "urn:service:test.sos.ecall" for eCall test calls.

The current eCall test call facility may be a non-emergency number and so may not get treated as an emergency call. MNOs may treat a vehicle call in the "test" service URN in a way that tests as much functionality as desired.

PSAPs that have the ability to process NG-eCalls may accept test calls and send an acknowledgment if the MSD was successfully received. Such PSAPs may also play an audio clip (for example, saying that the call reached a PSAP) in addition to supporting media loopback.

eCall may include the ability for the PSAP to acknowledge successful receipt of an MSD sent by the IVS, and for the PSAP to request that the IVS send an MSD (e.g., the call taker may initiate a request for a new MSD to see if the vehicle's state or location has changed). The PSAP may also send other requests to the vehicle, such as locking or unlocking doors, sounding the horn, flashing the lights, starting a video stream from on-board cameras (such as rear focus or blind-spot), etc.

The mechanism for carrying the MSD from the IVS to the PSAP may also be used to carry a block of control data from the PSAP to the IVS. This eCall control block (also referred to as eCall metadata) may be an XML structure containing eCall-specific elements. When the PSAP needs to send an eCall control block that is in response to the MSD or other data sent by the IVS in a SIP request, the control block may be sent in the SIP response to that request (e.g., the INVITE). When the PSAP needs to send an eCall control block that is not an immediate response to an MSD or other data sent by the IVS, the control block may be transmitted from the PSAP to the IVS in a SIP INFO message within the established session. The IVS may send any requested data (such as a new MSD) in the reply to the INFO message. This mechanism may allow the PSAP to send eCall-specific data to the IVS and the IVS to respond. If control data sent in a response message requests the IVS to send a new MSD or other data block, or to perform an action other than sending, the IVS may send the requested data or acknowledgement regarding the action in an INFO message within the session (it could also use re-INVITE but that is unnecessary when no aspect of the session or media is changing).

This mechanism may include: an XML definition of the eCall control object; an extension mechanism by which new elements can be added to the control object definition (e.g., permitting additional elements to be included by adding their namespace); a MIME type registration for the control object (so it can be carried in SIP messages and responses); an entry in the Emergency Call Additional Data Blocks sub-registry so that the control block can be recognized as emergency call specific data within the SIP messages; and/or an Info-Package registration permitting the control block within Info messages.

The eCall control block may be an XML data structure that may allow for acknowledgments, requests, and capabilities information to be transmitted. It may be carried in a SIP body part with a specific MIME content type. Various top-level elements may be defined for use within an eCall control block, with examples described below.

ack: may be used in a control block sent by either side. The PSAP may use this to acknowledge receipt of a data set sent by the IVS. The IVS may use this to acknowledge receipt of a request by the PSAP when that request would not otherwise be acknowledged (if the PSAP requests the vehicle to send data and the vehicle does so, the data may serve as a success acknowledgement).

capabilities: may be used in a control block sent from the IVS to the PSAP (in the initial INVITE or subsequently if desired) to inform the PSAP of the vehicle capabilities. Child elements may contain all or a plurality or subset of the actions and data types supported by the vehicle, and may also include all or some of the available cameras, lamps, other equipment, etc., in some embodiments.

request: may be used in a control block sent by the PSAP to the IVS and may request the vehicle to perform an action.

The IVS and the PSAP may support various actions such as the following examples: transmit data object; play and/or display static (pre-defined) message; speak/display dynamic text (text supplied in action); play dynamic audio (media supplied in SIP body part or in action); and/or flash lights, honk horn, lock/unlock doors, lock/unlock/open/close windows, enable/disable fuel pump.

The 'ack' element may indicate the object being acknowledged, and may report success or failure. The 'capabilities' element may have child 'request' elements to indicate the actions supported by the IVS.

The 'request' element may contain attributes to indicate the request, which may supply any needed information, and may contain a 'text' child element, which may contain the text for a dynamic message. An 'action' attribute may indicate a specific action. An IRNA registry, or other appropriate registrar's registry, may be established to contain the allowed values.

New elements, child elements, and attributes may be defined with their own sub-namespaces. IRNA or other suitable registries may be used to specify the permitted values of several elements and attributes. These mechanisms may allow for extension.

The control block may not contain a 'request' action to play media (such as a pre-recorded audio message). In such case, the SIP-INVITE mechanism may be used to establish a one-way media stream for this purpose.

The 'ack' element may be transmitted by the PSAP to acknowledge receipt of an eCall data object. An 'ack' element may be sent by a PSAP and may reference the unique ID of the data object that was sent by the IVS, and may further indicate if the PSAP considers the receipt successful or not. The 'ack' element may also be transmitted by the IVS to the PSAP which may acknowledge receipt of a 'request' element that requested the IVS to perform an action that may be other than transmitting a data object (e.g., a request to display a message may be acknowledged, but a request to transmit a data object may not result in a separate 'ack' element being sent, since the data object itself may serve as acknowledgment.) An 'ack' element may be sent by an IVS and may reference the unique ID of a request being acknowledged, and may further indicate whether the request was successfully performed.

The 'ack' element may include attributes as shown in the diagram 5000 in FIG. 50, and may further include child elements as shown in the diagram 5100 in FIG. 51.

The 'capabilities' element may be transmitted by the IVS to indicate to the PSAP its capabilities. Example child elements that may be used for the capabilities element are shown in the diagram 5200 in FIG. 52:

A 'request' element may appear one or more times on its own or as a child of a 'capabilities' element. Example attributes and child elements that may be used in a 'request' element are shown in the diagrams 5300 and 5305 of FIGS. 53A and 53B respectively. The 'request' element may have child elements as shown in the diagrams 5400 and 5405 in FIGS. 54A and 54B respectively. The diagram 5500 of FIG. 55 further includes specifications that may be used in accordance with the present disclosure.

An 'emergencyCallData.eCall' INFO package is described herein. Both endpoints (the IVS and the PSAP equipment) may set the Recv-Info header field to 'emergencyCallData.eCall' to indicate ability to receive INFO messages carrying eCall data or control blocks.

Support for the 'emergencyCallData.eCall' INFO package may indicate the ability to receive eCall data and control blocks, which may be carried in a body part whose subtype may start with 'emergencyCallData.eCall.'. There may be various data blocks defined, such as an eCall data block, which has the 'application/emergencyCallData.eCall.MSD+xml' MIME type, and/or various control blocks, such as an eCall control block, which has the 'application/emergencyCallData.eCall.control+xml'MIME type, and additional blocks may further be defined. The eCall control block may include the ability for the IVS to indicate its capabilities, so in the event additional eCall or other data blocks are defined, the IVS may indicate which it supports.

The use of INFO may be based on an analysis of the requirements against the intent and effects of INFO versus other approaches (such as SIP MESSAGE, media plane, or non-SIP protocols). In particular, the transport of eCall data and control blocks may be done during an emergency session established with SIP, and may normally be carried in the initial INVITE and its response; the use of INFO may occur when a data block or request needs to be sent subsequently during the call. While MESSAGE may be used, it may not be tied to a SIP session as INFO may be. Re-INVITE may also be used, but is normally used to modify the session. SUBSCRIBE/NOTIFY may be used. However, in other embodiments, INFO may be used.

An INFO request message carrying an eCall data or control block may have an Info-Package header field set to 'emergencyCallData.eCall'. The INFO request message may be marked as containing the eCall data or control block by a Call-Info header field containing a CID URL referencing the unique identifier of the body part containing the eCall data or control, and a 'purpose' parameter identifying the block. Because the eCall data or control block may be carried in an INFO request message, the body part may also carry a Content-Disposition header field set to "Info-Package".

Emergency call related additional data may be included in any SIP request or response message in which a body may appear. Hence, INFO response messages may contain eCall data or control blocks (e.g., with a Call-Info header field containing a CID URL referencing the unique identifier of the body part, and a 'purpose' parameter identifying the block). When eCall data or control blocks are included in an INFO response message, they may be included as emergency call additional data, rather than as an INFO package associated data.

Figure 56:
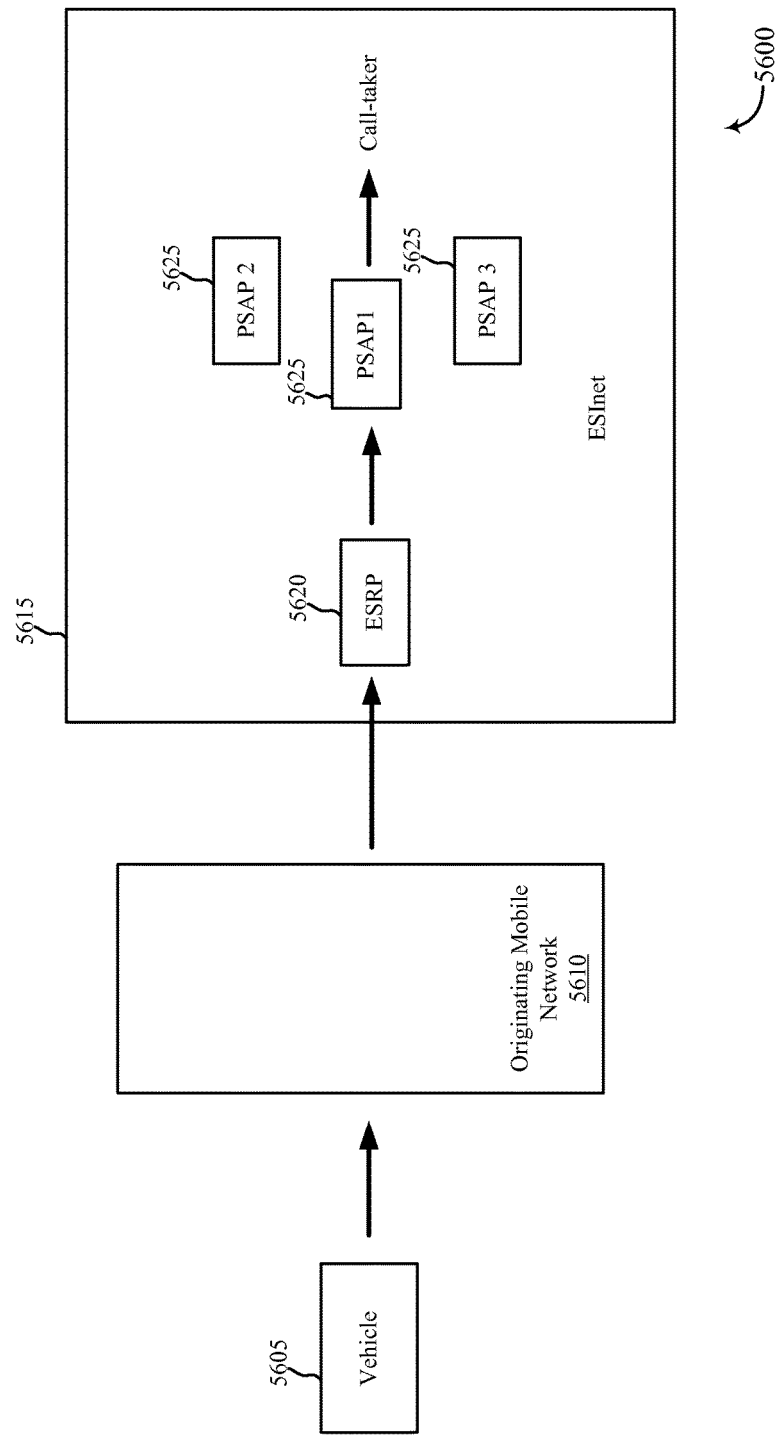
FIG. 56 is a diagram illustrating an example of an eCall, in accordance with various aspects of the present disclosure.

FIG. 56 illustrates a diagram 5600 with one example of an eCall. The call may use the request URI 'urn:service:sos.ecall.automatic' service URN and may thus be recognized as an eCall, and further as one that was invoked automatically by the IVS 5605 due to a crash or other serious incident. In this example, the originating network 5610 may route the call to an ESInet 5615 (as for any emergency call in an environment with an ESInet). The ESInet 5615 may route the call to the appropriate NG-eCall capable PSAP 5625. The emergency call may be received by the ESInet's Emergency Services Routing Proxy (ESRP) 5620, as the entry point into the ESInet 5615. The ESRP 5620 may route the call to a PSAP 5625, where it may be received by a call taker. In deployments where there is no ESInet, the originating network 5610 may route the call directly to the appropriate NG-eCall capable PSAP 5625.

FIG. 57 shows a diagram 5700 illustrating an example of a SIP eCall INVITE that contains an MSD. Various security considerations described elsewhere may apply here.

An ACN call, such as an eCall, may carry two forms of location data: the network-provided location that is inherently part of IMS emergency calls (which might be determined solely by the network, or in cooperation with or possibly entirely by the originating device), and the IVS-supplied location within the MSD. This may be useful to the PSAP, especially when the two locations are independently determined. Even in situations where the network-supplied location is limited to the cell site, this may be useful as a sanity check on the device-supplied location contained in the MSD.

Trust issues regarding location provided by or determined in cooperation with end devices may further be considered.

The mechanism by which the PSAP sends acknowledgments and requests to the vehicle may need authenticity considerations; when the PSAP request is received within a session initiated by the vehicle as an eCall emergency call placed over a cellular network, there may be a higher degree of trust that the source is indeed a PSAP. If the PSAP request is received in other situations, such as a call-back, the trust issues in verifying that a call-back is indeed from a PSAP may be more complex. A further safeguard (applicable regardless of which end initiated the call and the means of the call) may be for the PSAP or emergency service provider to sign the body part using a certificate issued by a known emergency services certificate authority and for which the IVS can verify the root certificate.

An example of an XML schemas of an eCall control block is now described. FIG. 58 shows a diagram 5800 illustrating one example. The URN 'urn:service:sos.ecall' may be registered under the sub-services 'sos' registry.

This service may identify a type of emergency call (placed by a specialized in-vehicle system and a carrying standardized set of data related to the vehicle and crash or incident, and may be needed to direct the call to a specialized public safety answering point (PSAP) with technical and operational capabilities to handle such calls. Two sub-services may also be registered, such as the following. urn:service:sos.ecall.manual: This service URN may indicate that an eCall had been triggered based on the manual interaction of the driver or a passenger. urn:service:sos.ecall.automatic: This service URN may indicate that an eCall had been triggered automatically, for example, due to a crash or other serious incident (e.g., fire).

The URN 'urn:service:test.sos.ecall' may also be registered under the sub-service 'test' registry. Also, in accordance with the present disclosure, application/emergencyCallData.eCall.MSD+xml may be added as a MIME content type, as shown in the diagram 5900 of FIG. 59. Also, in accordance with the present disclosure, application/emergencyCallData.eCall.control+xml may be added as a MIME content type, as shown in the diagram 6000 of FIG. 60.

An 'eCall.MSD' entry may also be added to the Emergency Call Additional Data Blocks registry. Also, the 'eCall.control' entry may be added to the Emergency Call Additional Data Blocks registry. Also, emergencyCallData.eCall may be added to the Info Packages Registry under "Session Initiation Protocol (SIP) Parameters."

FIG. 61 shows a diagram 6100 that may be used to register a new XML namespace. Similarly, FIG. 62 shows a diagram 6200 that may be used to register a new XML namespace. A new registry called 'eCall Control Data' may also be established, and sub-registries may be created for this registry as described below.

In accordance with the present disclosure, a sub-registry called "eCall Control Action Registry" may be created. This registry may operate under "Expert Review" rules. The expert may determine that the proposed action is within the purview of a vehicle, is sufficiently distinguishable from other actions, and that the action is clearly and fully described. A published and stable document may be referenced for the description of the action.

Figure 63:
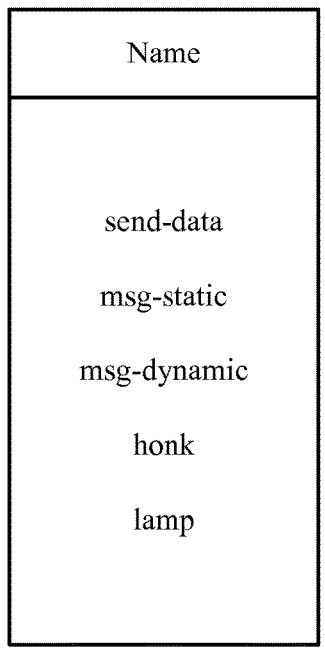
FIG. 63 is a diagram illustrating an exemplary set of eCall control actions, in accordance with various aspects of the present disclosure.

The content of this registry may include a name, which may be an identifier to be used in the 'action' attribute of an eCall control 'request' element. The registry may also include a description of the action. This may be a reference to a published and stable document. The description may specify if any attributes or child elements are optional or mandatory, and may describe the action to be taken by the vehicle. An exemplary set of eCall control actions is shown in the table 6300 in FIG. 63.

Also in accordance with the present disclosure, a new sub-registry called "eCall Static Message Registry" may be created. Because compliant vehicles may be expected to support static messages translated into the languages supported by the vehicle, it may be important to limit the number of such messages. This registry may operate under "Publication Required" rules, which may require a stable, public document and may imply expert review of the publication. The expert may determine that the document has been published by an appropriate emergency services organization (e.g., NENA, EENA, APCO) and that the proposed message is sufficiently distinguishable from other messages.

The content of this registry may include ID, which may be an integer identifier to be used in the 'msgid' attribute of an eCall control 'request' element. The content of the registry may also include message, which may be the text of the message. Messages may be listed in the registry in English; vehicles may be expected to implement translations into languages supported by the vehicle.

When new messages are added to the registry, the message text may be determined by the registrant; IRNA or another appropriate registrar may assign the IDs. Each message may be assigned a consecutive integer value as its ID. This may allow an IVS to indicate by a single integer value that it supports all messages with that value or lower. An example of an initial set of values is shown in the table 6400 in FIG. 64.

Also, a new sub-registry called "eCall Reason Registry" may be created, which may contain values for the 'reason' attribute of the 'ActionResult' element. This registry may operate under "Expert Review" rules. The expert may determine that the proposed reason is sufficiently distinguishable from other reasons and that the proposed description is understandable and correctly worded.

The content of this registry may include ID, which may be a short string identifying the reason, for use in the 'reason' attribute of an 'ActionResult' element. The content of the registry may also include Description, which may be a description of the reason. An example of an initial set of values is shown in the table 6500 in FIG. 65.

Also, a new sub-registry called "eCall Lamp-ID Registry" may be created in order to, for example, standardize the names of automotive lamps (lights). This registry may operate under "Expert Review" rules. The expert may determine that the proposed lamp name is clearly understandable and is sufficiently distinguishable from other lamp names.

The content of this registry may include Name, which may be an identifier to be used in the 'lamp-ID' attribute of an eCall control 'request' element. The content of the registry may also include Description, which may be a description of the lamp (light). An example of an initial set of values is shown in the table 6600 in FIG. 66.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication in a vehicle emergency call system, comprising:
   identifying, by an emergency call in-vehicle system (IVS) of the vehicle emergency call system, a set of actions capable of being performed by the emergency call IVS;
   identifying a set of telematics capabilities comprising at least one action of the set of actions;
   including, in a capabilities data structure that corresponds to a request data structure supported by the emergency call IVS, a parameter corresponding to the at least one action in the set of telematics capabilities that defines a supported aspect of the at least one action;
   transmitting, over a communication session signaling protocol to an emergency call answering point of the vehicle emergency call system, the set of telematics capabilities comprising the at least one action of the set of actions in the capabilities data structure that corresponds to the request data structure supported by the emergency call IVS; and
   receiving, from the emergency call answering point, a request to perform an action of the at least one action in a format that corresponds to the request data structure.

2. The method of claim 1, wherein the at least one action comprises one or more of:
   gathering telematics data, transmitting telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, disconnecting a primary or other battery or other power source, connecting a primary or other battery or other power source, unlocking a door, locking a door, activating a horn of a vehicle, activating an externally audible sound, activating lights of a vehicle, activating flashers of a vehicle, actuating a power window, playing a recorded message, rendering media, displaying a text message, activating a camera, deactivating a camera, or a combination thereof.

3. The method of claim 1, further comprising:
   formatting the capabilities data structure substantially identical to a format of the request data structure.

4. The method of claim 1, further comprising:
   formatting the capabilities data structure as an Extensible Markup Language (XML) element.

5. The method of claim 4, further comprising:
   including at least one child XML element in the capabilities XML element data structure defining the at least one action.

6. The method of claim 1, further comprising:
   transmitting the set of telematics capabilities as a capabilities Extensible Markup Language (XML) element, the capabilities XML element comprising at least one child XML element defining the at least one action, wherein the parameter corresponding to the at least one action is included as an XML attribute within the at least one child XML element corresponding to the at least one action.

7. The method of claim 1, further comprising:
   transmitting the set of telematics capabilities as a capabilities Extensible Markup Language (XML) element, the capabilities XML element comprising at least one child XML element defining the at least one action, wherein the parameter corresponding to the at least one action is included as a further child XML element within the at least one child XML element corresponding to the at least one action.

8. The method of claim 1, further comprising:
   dynamically reconfiguring the set of telematics capabilities transmitted by the emergency call IVS based at least on part on an operational condition of vehicle components associated with the at least one action.

9. The method of claim 1, wherein the set of telematics capabilities is dynamically configurable by one or more of a manufacturer of the emergency call IVS, a manufacturer of the vehicle, a telematics service provider, or another authorized entity.

10. The method of claim 1, further comprising:
    including a plurality of emergency call related actions that the emergency call IVS is capable of performing in the set of telematics capabilities.

11. The method of claim 1, further comprising:
    transmitting an indication to the emergency call answering point regarding whether the IVS performed the requested action.

12. The method of claim 1, further comprising:
    including a subset of emergency call related actions that the emergency call IVS is capable of performing in the set of telematics capabilities, the subset being determined based at least in part on at least one of: a category of assistance needed by a user of the emergency call IVS or a state of the vehicle.

13. The method of claim 1, further comprising:
    performing, by the emergency call IVS, the action based at least in part on the request.

14. The method of claim 1, further comprising:
    transmitting an invitation and a set of data to establish an emergency call with the emergency call answering point, wherein the set of telematics capabilities is transmitted together with the invitation and the set of data.

15. The method of claim 14, wherein the set of data is a minimum set of telematics data.

16. The method of claim 1, further comprising:
    transmitting an invitation and a set of data to establish an emergency call with the emergency call answering point;
    receiving, from the emergency call answering point and in a response to the invitation, a request to send the set of telematics capabilities; and
    transmitting, based at least in part on the request to send the set of telematics capabilities, the set of telematics capabilities together with an acknowledgment of the response to the invitation.

17. The method of claim 1, wherein the set of telematics capabilities is transmitted during or following establishment of an emergency call.

18. The method of claim 1, further comprising:
    transmitting an invitation and a set of data to establish an emergency call with the emergency call answering point;
    transmitting the set of telematics capabilities after the emergency call is established and in response to a request by the emergency call answering point to transmit the set of telematics capabilities.

19. An apparatus for wireless communication in a vehicle emergency call system, comprising:
a processor;
memory in electronic communication with the processor; and
instructions stored in the memory, the instructions being executable by the processor to:
identify, by an emergency call in-vehicle system (IVS) of the vehicle emergency call system, a set of actions capable of being performed by the emergency call IVS;
identify a set of telematics capabilities comprising at least one action of the set of actions;
include, in a capabilities data structure that corresponds to a request data structure supported by the emergency call IVS, a parameter corresponding to the at least one action in the set of telematics capabilities that defines a supported aspect of the at least one action;
transmit, over a communication session signaling protocol to an emergency call answering point of the vehicle emergency call system, the set of telematics capabilities comprising the at least one action of the set of actions in the capabilities data structure that corresponds to the request data structure supported by the emergency call IVS; and
receive, from the emergency call answering point, a request to perform an action of the at least one action in a format that corresponds to the request data structure.

20. The apparatus of claim 19, wherein the at least one action comprises one or more of:
gathering telematics data, transmitting telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, disconnecting a primary or other battery or other power source, connecting a primary or other battery or other power source, unlocking a door, locking a door, activating a horn of a vehicle, activating an externally audible sound, activating lights of a vehicle, activating flashers of a vehicle, actuating a power window, playing a recorded message, rendering media, displaying a text message, activating a camera, deactivating a camera, or a combination thereof.

21. The apparatus of claim 19, wherein the memory further comprises instructions being executable by the processor to:
include a subset of emergency call related actions that the emergency call IVS is capable of performing in the set of telematics capabilities, the subset being determined based at least in part on at least one of: a category of assistance needed by a user of the emergency call IVS or a state of the vehicle.

22. The apparatus of claim 19, wherein the memory further comprises instructions being executable by the processor to:
perform, by the emergency call IVS, the action based at least in part on the request.

23. The apparatus of claim 19, wherein the memory further comprises instructions being executable by the processor to:
transmit an invitation and a set of data to establish an emergency call with the emergency call answering point;
receive, from the emergency call answering point and in a response to the invitation, a request to send the set of telematics capabilities; and
transmit, based at least in part on the request to send the set of telematics capabilities, the set of telematics capabilities together with an acknowledgment of the response to the invitation.

24. A method for communicating telematics data in a vehicle emergency call system, comprising:
receiving, over a communication session signaling protocol from an emergency call in-vehicle system (IVS) of the vehicle emergency call system, a set of telematics capabilities comprising at least one action of a set of actions capable of being performed by the emergency call IVS, the set of telematics capabilities received in a capabilities data structure that corresponds to a request data structure supported by the emergency call IVS, wherein the capabilities data structures includes a parameter corresponding to the at least one action in the set of telematics capabilities, the parameter defining a supported aspect of the at least one action; and
transmitting, by an emergency call answering point, a request to perform an action of the at least one action in a format that corresponds to the request data structure.

25. The method of claim 24, further comprising:
receiving a request from the emergency call IVS to establish an emergency call; and
transmitting a request by the emergency call answering point to the emergency call IVS for transmission of the set of telematics capabilities.

26. An apparatus for communicating telematics data in a vehicle emergency call system, comprising:
a processor;
memory in electronic communication with the processor; and
instructions stored in the memory, the instructions being executable by the processor to:
receive, over a communication session signaling protocol from an emergency call in-vehicle system (IVS) of the vehicle emergency call system, a set of telematics capabilities comprising at least one action of a set of actions capable of being performed by the emergency call IVS, the set of telematics capabilities transmitted in a capabilities data structure that corresponds to a request data structure supported by the emergency call IVS, wherein the capabilities data structures includes a parameter corresponding to the at least one action in the set of telematics capabilities, the parameter defining a supported aspect of the at least one action; and
transmit, by an emergency call answering point, a request to perform an action of the at least one action in a format that corresponds to the request data structure.

* * * * *